(12) United States Patent
Herbeck et al.

(10) Patent No.: US 12,473,120 B2
(45) Date of Patent: Nov. 18, 2025

(54) METHOD FOR ASSEMBLING A FOLDABLY CONSTRUCTED PALLET

(71) Applicant: GREEN OX PALLET TECHNOLOGY, LLC, Oklahoma City, OK (US)

(72) Inventors: Joshua Daniel Herbeck, Oklahoma City, OK (US); Gregory D. Van De Mark, Oklahoma City, OK (US)

(73) Assignee: GREEN OX PALLET TECHNOLOGY, LLC, Oklahoma City, OK (US)

( * ) Notice: Subject to any disclaimer, the term of this patent is extended or adjusted under 35 U.S.C. 154(b) by 70 days.

(21) Appl. No.: 18/491,345

(22) Filed: Oct. 20, 2023

(65) Prior Publication Data

US 2024/0043169 A1   Feb. 8, 2024

Related U.S. Application Data

(63) Continuation of application No. 17/578,909, filed on Jan. 19, 2022, now Pat. No. 11,866,226, which is a
(Continued)

(51) Int. Cl.
*B65D 19/20* (2006.01)
*B65B 9/13* (2006.01)
(Continued)

(52) U.S. Cl.
CPC ............. *B65D 19/20* (2013.01); *B65B 9/135* (2013.01); *B65D 19/0016* (2013.01);
(Continued)

(58) Field of Classification Search
CPC .......... B65D 19/20; B65D 2519/00621; Y10S 229/93
See application file for complete search history.

(56) References Cited

U.S. PATENT DOCUMENTS

| | | | |
|---|---|---|---|
| 2,446,914 A | 8/1948 | Fallert et al. | |
| 2,493,562 A | 1/1950 | Yarman | |

(Continued)

FOREIGN PATENT DOCUMENTS

| | | |
|---|---|---|
| CA | 2247655 A1 | 6/1999 |
| CN | 2349145 Y | 11/1999 |

(Continued)

OTHER PUBLICATIONS

Communication Pursuant to Article 94(3) EPC issued in corresponding European Patent Application No. 20170934.2 on Jul. 26, 2021 (5 pages).
(Continued)

*Primary Examiner* — Daniel Jeremy Leeds
(74) *Attorney, Agent, or Firm* — Dorsey & Whitney LLP

(57) ABSTRACT

A method of assembling a pallet using a machine includes folding a first portion of a pallet support column to define a vertical support structure. The method further includes folding a second portion of the pallet support column to engage the vertical support structure. The method further includes gluing at least a portion of the second portion to the first portion. The method further includes coupling the pallet support column to at least one of a bottom member or a top member of the pallet.

20 Claims, 43 Drawing Sheets

Related U.S. Application Data continuation of application No. 16/093,831, filed as application No. PCT/US2017/027903 on Apr. 17, 2017, now Pat. No. 11,254,469.

(60) Provisional application No. 62/443,360, filed on Jan. 6, 2017, provisional application No. 62/422,254, filed on Nov. 15, 2016, provisional application No. 62/409,762, filed on Oct. 18, 2016, provisional application No. 62/323,486, filed on Apr. 15, 2016.

(51) Int. Cl.
*B65D 19/00* (2006.01)
*B65D 19/06* (2006.01)

(52) U.S. Cl.
CPC .... *B65D 19/06* (2013.01); *B65D 2519/00019* (2013.01); *B65D 2519/00054* (2013.01); *B65D 2519/00089* (2013.01); *B65D 2519/00124* (2013.01); *B65D 2519/00129* (2013.01); *B65D 2519/00139* (2013.01); *B65D 2519/00159* (2013.01); *B65D 2519/00194* (2013.01); *B65D 2519/00228* (2013.01); *B65D 2519/00273* (2013.01); *B65D 2519/00288* (2013.01); *B65D 2519/00318* (2013.01); *B65D 2519/00323* (2013.01); *B65D 2519/00333* (2013.01); *B65D 2519/00373* (2013.01); *B65D 2519/00378* (2013.01); *B65D 2519/00402* (2013.01); *B65D 2519/00437* (2013.01); *B65D 2519/00497* (2013.01); *B65D 2519/00562* (2013.01); *B65D 2519/00567* (2013.01); *B65D 2519/00572* (2013.01); *B65D 2519/00606* (2013.01); *B65D 2519/00641* (2013.01); *B65D 2519/00676* (2013.01); *B65D 2519/00711* (2013.01)

(56) References Cited

U.S. PATENT DOCUMENTS

| | | | |
|---|---|---|---|
| 2,908,464 A | 10/1959 | Traudt et al. | |
| 3,302,593 A | 2/1967 | Roberts | |
| 3,683,823 A | 8/1972 | Schmid | |
| 3,911,834 A | 10/1975 | Quaintance | |
| 4,085,847 A | 4/1978 | Jacalone | |
| 4,673,087 A | 6/1987 | Webb | |
| 4,875,419 A | 10/1989 | Helton et al. | |
| 4,898,321 A | 2/1990 | Delany | |
| 5,176,090 A | 1/1993 | Roberts et al. | |
| 5,285,731 A | 2/1994 | McIntyre | |
| 5,285,732 A | 2/1994 | Gottlieb | |
| 5,377,600 A | 1/1995 | Speese et al. | |
| 5,441,154 A | 8/1995 | Youell | |
| 5,452,667 A | 9/1995 | Lim | |
| 5,465,672 A | 11/1995 | Boyse et al. | |
| 5,483,875 A | 1/1996 | Turecek et al. | |
| 5,517,926 A | 5/1996 | Young | |
| 5,528,995 A | 6/1996 | Lim | |
| 5,531,165 A | 7/1996 | Taravella et al. | |
| 5,535,668 A | 7/1996 | Besaw et al. | |
| 5,537,937 A | 7/1996 | Juvik-Woods | |
| 5,592,885 A | 1/1997 | Young et al. | |
| 5,597,084 A | 1/1997 | Parasin | |
| 5,809,903 A | 9/1998 | Young | |
| 5,881,652 A | 3/1999 | Besaw | |
| 5,934,202 A | 8/1999 | Lai | |
| 6,041,718 A | 3/2000 | Brandes et al. | |
| 6,070,726 A | 6/2000 | Graham | |
| 6,135,030 A * | 10/2000 | Besaw | B65D 19/0012 108/51.3 |
| 6,612,247 B1 | 9/2003 | Pistner et al. | |
| 7,007,613 B2 | 3/2006 | Sketo | |
| 7,234,402 B2 | 6/2007 | Olvey et al. | |
| 7,426,890 B2 | 9/2008 | Olvey | |
| 8,161,893 B2 | 4/2012 | Kindellan | |
| 2005/0073280 A1 | 4/2005 | Yoshinaga et al. | |
| 2006/0225626 A1 | 10/2006 | Olvey et al. | |
| 2007/0289504 A1 | 12/2007 | Harp et al. | |
| 2008/0210140 A1 | 9/2008 | Valentinsson | |
| 2011/0259249 A1 | 10/2011 | Ogburn et al. | |
| 2014/0246353 A1 | 9/2014 | Campagna et al. | |
| 2015/0027917 A1 | 1/2015 | Goddard | |
| 2015/0239609 A1 | 8/2015 | Olvey et al. | |
| 2016/0304240 A1 | 10/2016 | Olvey et al. | |
| 2018/0141703 A1 | 5/2018 | Herbeck et al. | |

FOREIGN PATENT DOCUMENTS

| | | |
|---|---|---|
| CN | 101823585 A | 9/2010 |
| CN | 109311563 A | 2/2019 |
| DE | 202004001606 U1 | 4/2004 |
| FR | 2317176 A1 | 2/1977 |
| FR | 2693432 A1 | 1/1994 |
| FR | 2737700 A1 | 2/1997 |
| GB | 2094260 A | 9/1982 |
| GB | 2348688 A | 10/2000 |
| JP | S61205935 A | 9/1986 |
| JP | H086824 U | 2/1996 |
| JP | H11100030 A | 4/1999 |
| JP | 2004276996 A | 10/2004 |
| KR | 20060129943 A | 12/2006 |
| WO | 2011003126 A1 | 1/2011 |
| WO | 2017181172 A1 | 10/2017 |

OTHER PUBLICATIONS

Fedex, "The freight box: It's really, really easy", https://smallbusiness.fedex.com/content/dam/SMB/general/pdf/freightbox_customer_leave_behind.pdf, May 2016, 2 Pages.

Extended European Search Report issued in European Patent Application No. 20170934.2 on Jul. 3, 2020 (8 pages).

EPO, "Extended European Search Report", Application No. 17783354.8, Sep. 26, 2019, 8 pages.

Office Action received in Canadian Patent Application No. 3,020,466 on Jul. 7, 2021 (5 pages).

Office Action received in Japanese Patent Application No. 2020-078676 on Jul. 29, 2021 (18 pages).

Second Office Action issued in Chinese Patent Application No. 201911278590.3 on Sep. 28, 2021 (20 pages).

* cited by examiner

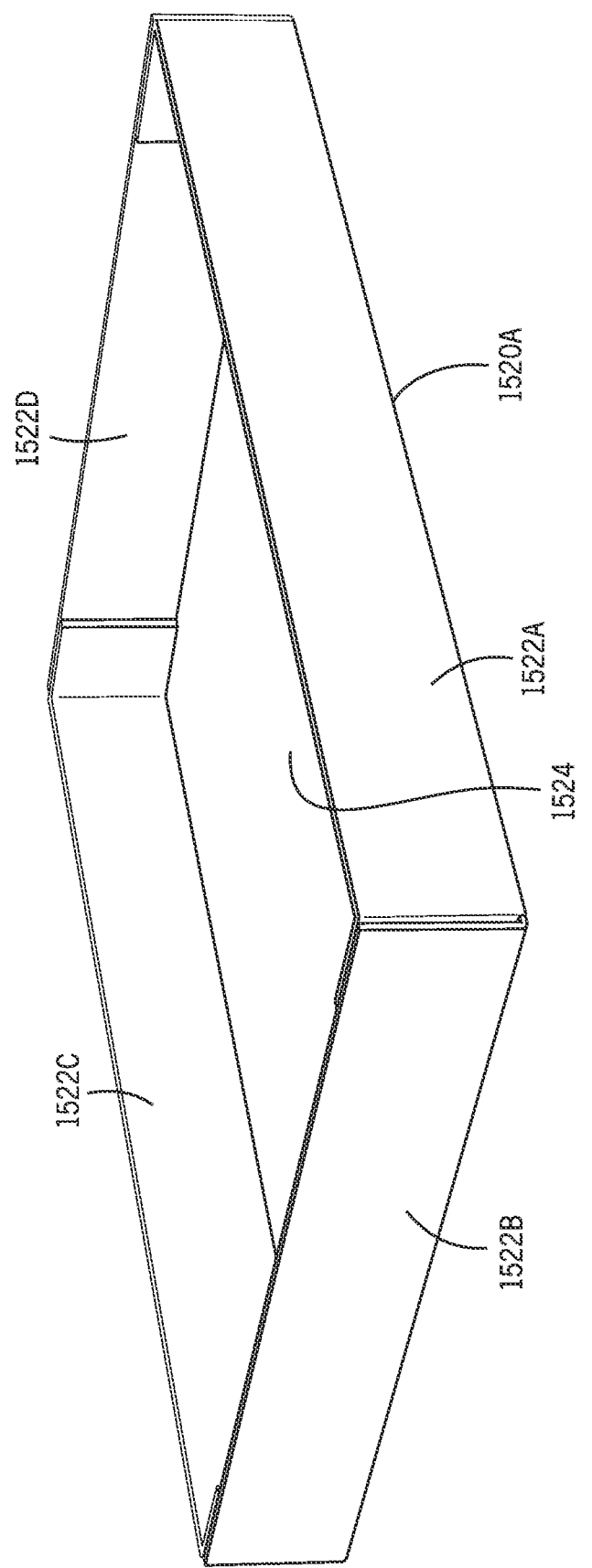

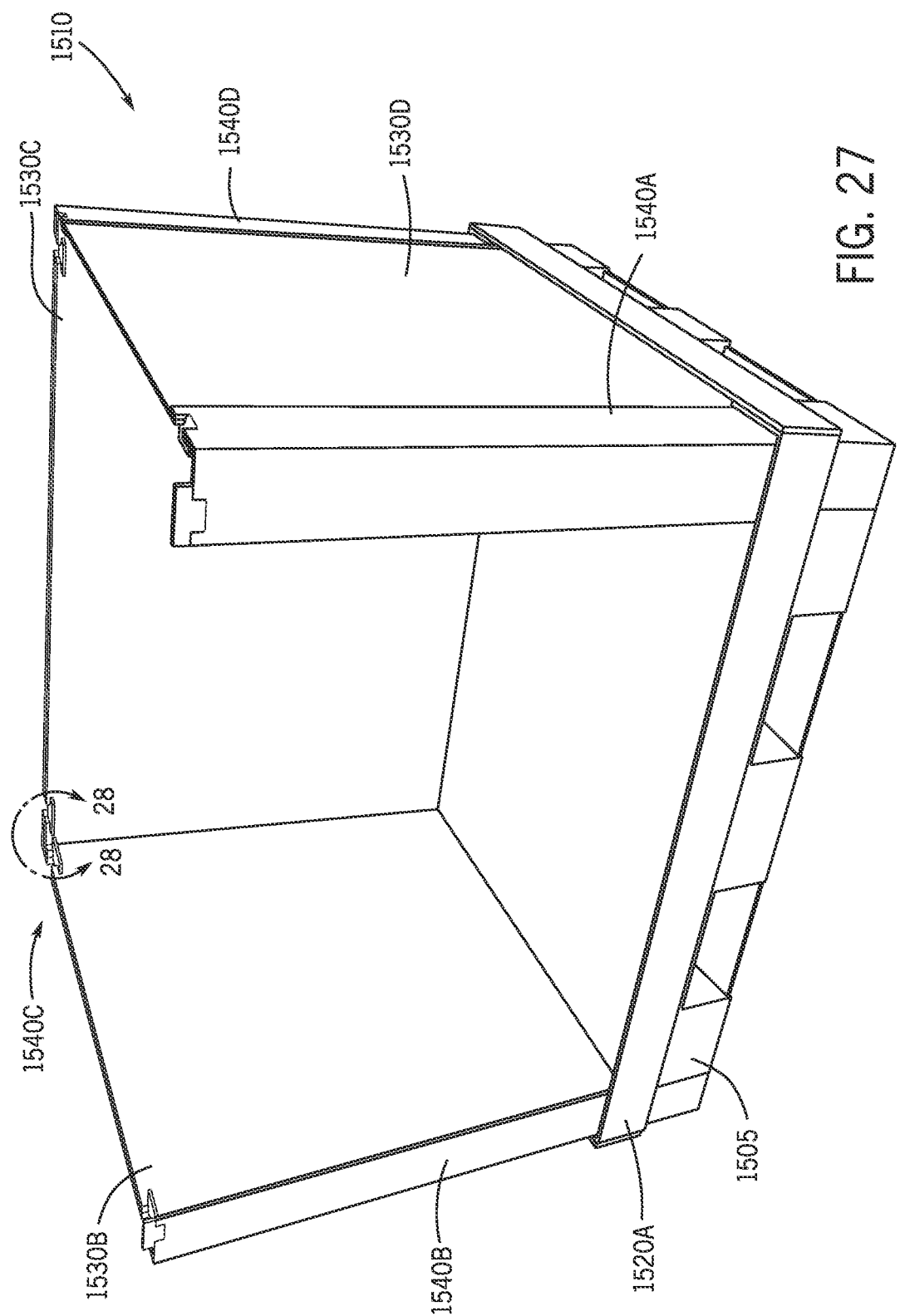

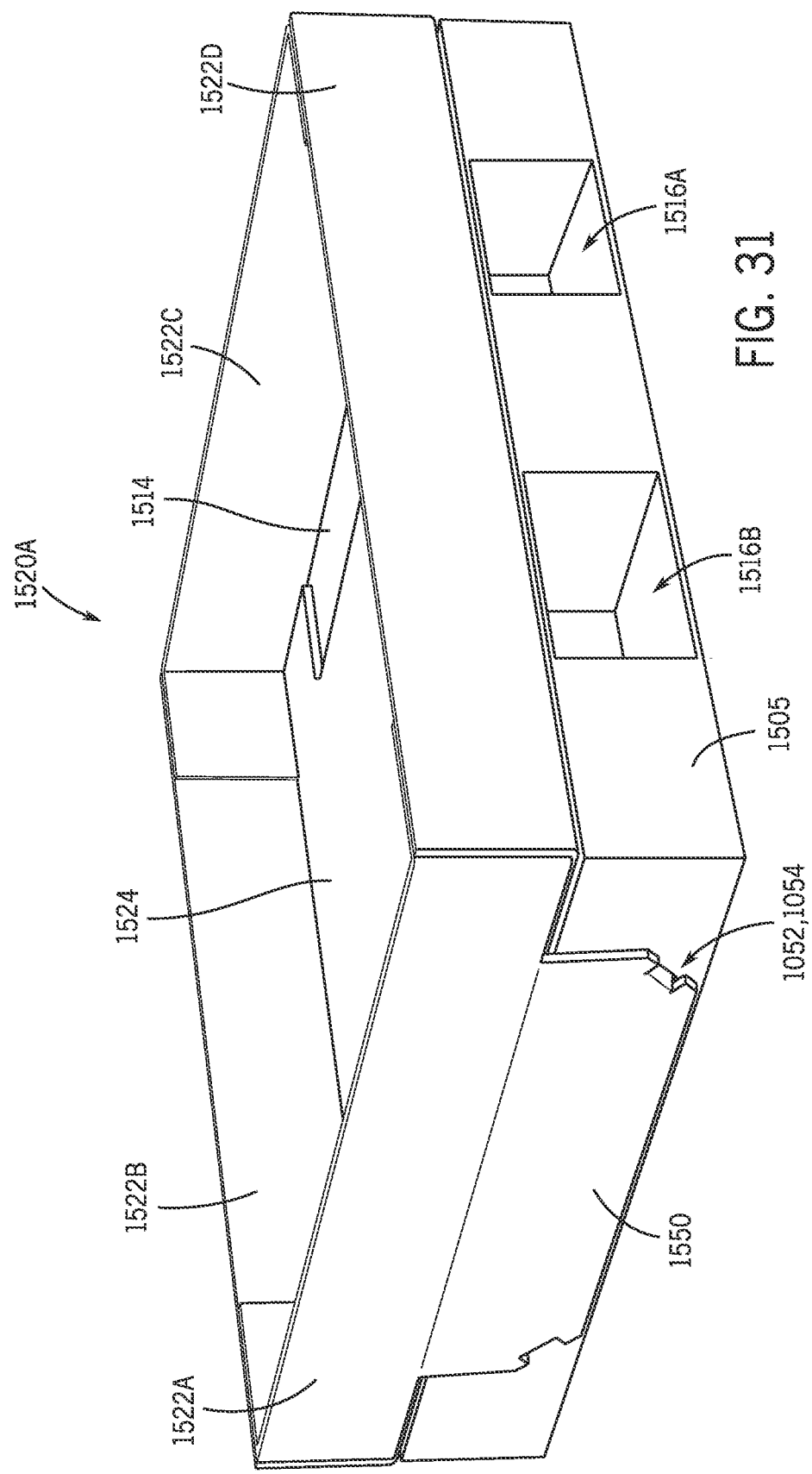

METHOD FOR ASSEMBLING A FOLDABLY CONSTRUCTED PALLET

CROSS-REFERENCE TO RELATED APPLICATIONS

This application is a continuation of U.S. patent application Ser. No. 17/578,909 filed on Jan. 19, 2022, which is a continuation of U.S. patent application Ser. No. 16/093,831 filed on Oct. 15, 2018, now U.S. Pat. No. 11,254,469 issued on Feb. 22, 2022, which is the national stage application of International Patent Application No. PCT/US2017/027903 filed on Apr. 17, 2017, which claims the benefit of priority under 35 U.S.C. § 119(e) of U.S. Provisional Patent Application No. 62/323,486 filed Apr. 15, 2016, U.S. Provisional Patent Application No. 62/409,762 filed Oct. 18, 2016, U.S. Provisional Patent Application No. 62/422,254 filed Nov. 15, 2016, and U.S. Provisional Patent Application No. 62/443,360 filed Jan. 6, 2017, all of which are hereby incorporated herein in their entireties.

TECHNICAL FIELD

This disclosure relates to force resisting structures or supports, and more particularly to a foldably constructed pallet constructed from one or more foldable blanks.

BACKGROUND

Pallets are primarily used to accommodate the bulk handling and transport of products and materials. Typically, a pallet comprises a flat, elevated top surface for supporting a load, such as goods, containers, or packages, a sufficient distance above the ground or floor so that the fork of a forklift can be inserted under the top surface in order to move the pallet with the entire load thereon from place to place. Traditionally, most pallets have been made from pieces of wood, specifically soft wood, assembled with metal fasteners such as nails or screws. However, a number of problems face present day users of conventional wooden pallets. The rising cost of making and repairing wooden pallets has detracted from the overall cost effectiveness of palletized shipments. Wooden pallets are heavy, bulky and cumbersome, and empty wooden pallets require substantial storage space. It is especially costly to transport empty wooden pallets by rail or truck for reuse. Pallets and the containers they support are typically sourced separately and are not generally suitable to be shipped in a collapsed form together. Typical solutions increase storage space and costs.

Accordingly, a pallet constructed from a readily recyclable material, such as corrugated paperboard, is especially desirable. In warehouses and retail stores, separate receptacles are commonly provided for collecting, compacting and/or storing recyclable materials, such as paperboard and plastics. The recyclable materials can then be retrieved, and oftentimes sold, and recycled into new materials and/or products. However, conventional recyclable materials are typically less rigid than wood and pallets made of these materials may have reduced load capacity as compared to conventional wood pallets.

Current recyclable pallets require intricate fold lines and tabs and therefore are assembled by hand. However, the assembly process can be time consuming and labor intensive, increasing the cost of recyclable pallets. Therefore, there is a need for a recyclable pallet that not only has increased structural strength, but also can be assembled through an automated process.

SUMMARY

In one embodiment, a force resisting structure including a top blank and a bottom blank is disclosed. As disclosed herein, the force resisting structure may be suited for use as a pallet, a skid, a shipping or storage platform, or the like. In this embodiment, the top blank and the bottom blank are secured together, such as through adhesive applied to a substantial portion of one or more interfacing surfaces between the two blanks.

In another embodiment, a method for assembling a pallet is disclosed. The method includes applying adhesive to one or more surfaces of a top blank, applying adhesive to one or more surfaces of a bottom blank, folding the bottom blank to define one or more support pillars and securing the support pillars together via the adhesive, positioning the top blank on top of the bottom blank, folding one or more portions of the top blank around at least a portion of the support pillars of the bottom blank, and securing the one or more portions of the top blank to the portion of the support pillars via the adhesive. The method can be performed automatically by a machine.

In another embodiment, a packaging kit is disclosed. The kit includes a pallet having a top support surface and fork lift apertures. The kit also includes a base or base support having an enclosed volume sized so the pallet fits within the enclosed volume of the base. The kit also includes side walls each including an area smaller than the top support surface of the pallet. The kit includes a plurality of joint supports with each of the plurality of joint supports configured to couple at least two side walls together providing support across the joints between the side walls. A coupler (e.g., an adhesive) is provided that is configured to attach the base to the pallet. A cap is provided that is configured to slide down over the top of the base substantially enclosing the enclosed volume between the base and the cap. The pallet, plurality of side walls, plurality of joint supports and the coupler (adhesive) fit within the enclosed volume.

In another embodiment, a packaging system is disclosed. In various embodiments, the packaging kit is expandable to be assembled as the packaging system with a container positioned on the pallet. In accordance with various embodiments, the base is attached to the pallet with a coupler (e.g., an adhesive) such that the pallet supports a bottom surface of the base. The base may receive a bottom portion of each of a plurality of side walls. At least two side walls of the plurality of side walls are coupled together with at least one of the joint supports at the joint between the sidewalls. In various embodiments, the plurality of side walls forms a container. The plurality of side walls may be separate elements forming a rectangular box with adjacent side walls being coupled to one another with one of four joint supports. The joint supports constrain the adjacent side walls in a substantially perpendicular configuration relative to one another. An interior of the enclosed base is approximately the same size as the rectangular box formed by the side walls. The cap forms an interior enclosure which receives the top of the side walls such that the base, side walls, and cap form outer walls of the container.

In another embodiment, a foldably constructed pallet is disclosed. The foldably constructed pallet includes a top member forming a top surface of the foldably constructed pallet. The foldably constructed pallet further includes a bottom member forming a bottom surface of the foldably constructed pallet. The bottom member includes, extending from the bottom surface, a plurality of outer sidewalls, and a plurality of internal sidewalls. Further, an outer sidewall of the plurality of outer sidewalls and an internal sidewall of the plurality of internal sidewalls cooperate to define a cradle configured to hold a structural insert such that folded panels of the structural insert are engaged with each of the outer sidewall and the internal sidewall. The top member may be connected to the bottom member and covering the cradle.

In another embodiment, a foldably constructed pallet is disclosed. The foldably constructed pallet includes a top member forming a top surface and a plurality of upper edge supports extending from and folded relative to the top surface. The foldably constructed pallet further includes a bottom member forming a bottom surface and a plurality of outer sidewalls extending from and folded relative to the bottom surface. An outer sidewall of the plurality of outer sidewalls is configured to receive a structural insert and define a position of the structural insert in the foldably constructed pallet. The structural insert includes a column or pillar of folded material. The top member covers the bottom member with an upper edge support of the plurality of upper edge supports connected to the outer sidewall opposite the folded panel of the structural insert.

In another embodiment, a method of assembling a pallet is disclosed. The method includes folding a top member to define a top surface of the pallet, and a plurality of upper edge supports extending folded from the top surface. The method further includes folding a bottom member to define a bottom surface of the pallet, and a plurality of outer sidewalls extending folded from the bottom surface. The method further includes defining, using an outer sidewall of the plurality of outer sidewalls, a cradle configured to hold a structural insert therein such that multiple folded sides of the structural insert are engaged with the outer sidewall. The method further includes connecting the top member to the bottom member and covering the cradle.

In another embodiment, a method of assembling a pallet using a machine is disclosed. The method includes folding a first portion of a pallet support column to define a vertical support structure. The method further includes folding a second portion of the pallet support column to engage the vertical support structure. The method further includes gluing at least a portion of the second portion to the first portion. The method further includes coupling the pallet support column to at least one of a bottom member or a top member of the pallet.

In another embodiment, a method of defining a support column for a pallet using a machine is disclosed. The method includes folding at least one first flap of a material blank to define a vertical support structure. The method further includes folding at least one second flap of the material blank to engage the vertical support structure. The method further includes gluing the at least one second flap to the at least one first flap.

In another embodiment, a method of assembling a pallet using a machine is disclosed. The method includes defining a support column from a first blank. The defining the support column includes folding a first portion of the first blank to define a vertical support structure. The defining the support column further includes folding a second portion of the first blank to engage the vertical support structure. The defining the support column further includes gluing at least a portion of the second portion to the first portion. The method further includes coupling the support column to at least one of a bottom member or a top member of the pallet.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

Various objects, features and advantages of the present invention will become apparent from the following description of the preferred embodiments taken in conjunction with the accompanying drawings wherein like reference numerals refer to like or similar parts.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 26C illustrates a perspective view of a container base;

FIG. 27 illustrates a perspective view of a packaging system in a loading configuration;

FIG. 31 illustrates a perspective view of a pallet coupled to the container base of FIG. 30;

DETAILED DESCRIPTION

Figure 1A:
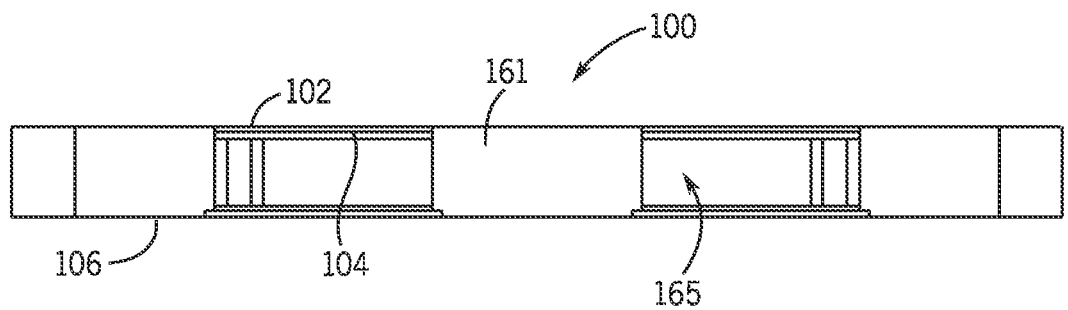
FIGS. 1A-1D illustrate various views of a pallet.
Figure 1B:
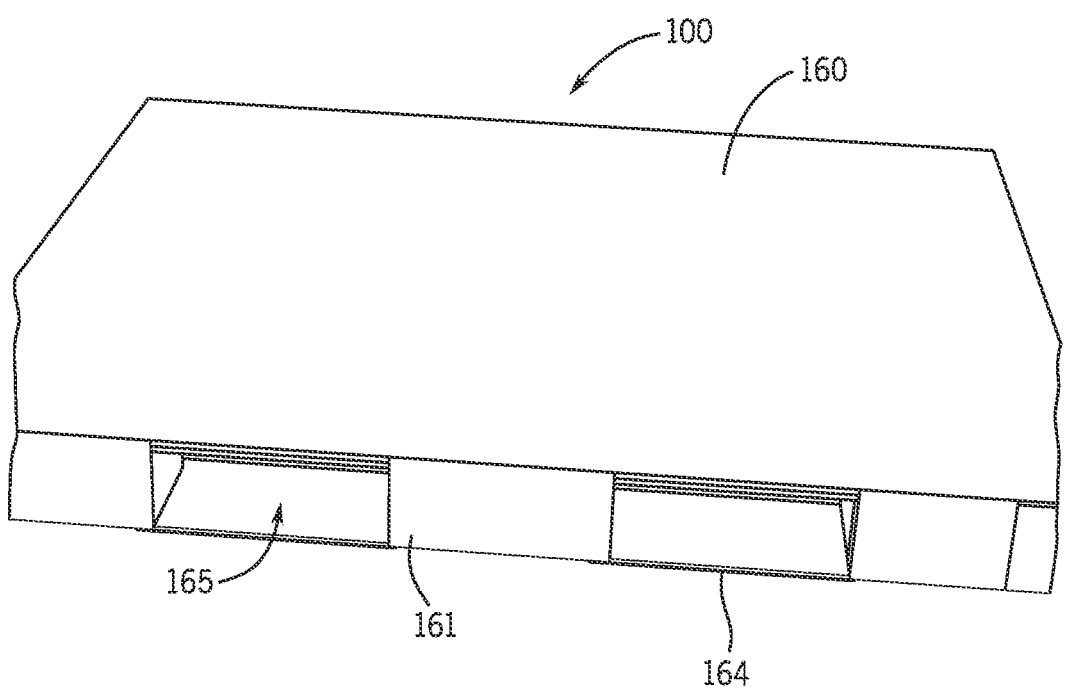
Figure 1C:
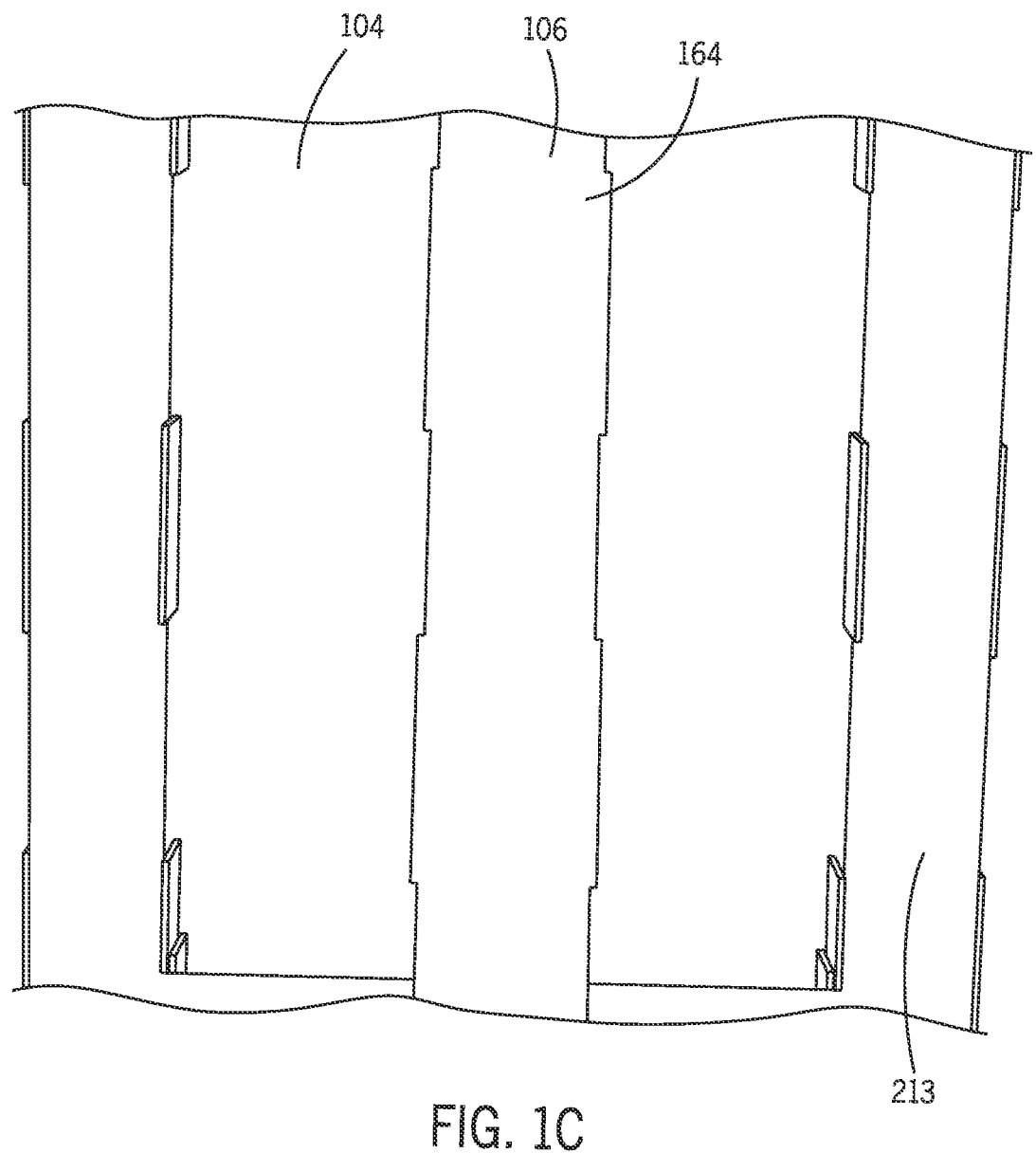
Figure 1D:
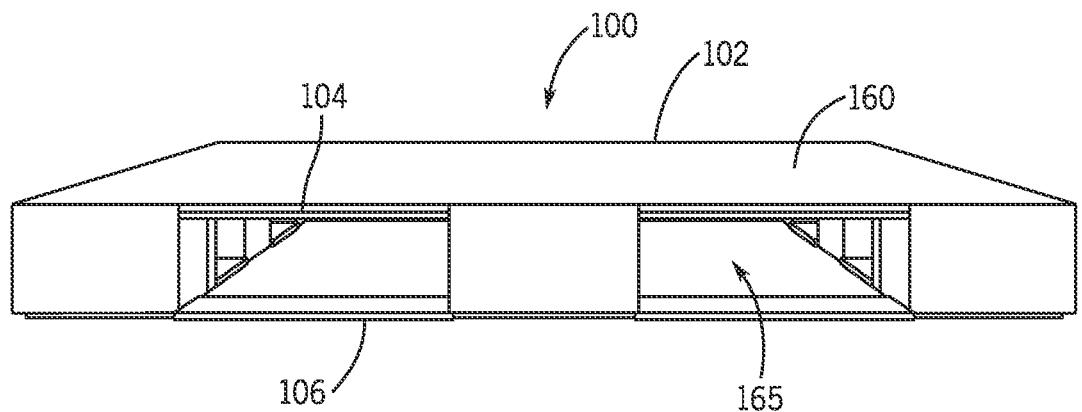

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

Embodiments of the present disclosure are related to structures and methods for increasing the rigidity and strength of foldably constructed force resisting structures, such as pallets, skids, shipping containers, storage containers, and the like (hereinafter referred to as a "pallet" for the sake of convenience without intent to limit). Additionally, the present disclosure is related to a pallet that can be assembled easily by an automation process, such as by one or more assembly machines.

In one embodiment, a pallet including a top blank and bottom blank that are each folded to define one or more support columns is disclosed. The top and bottom blanks are secured such that the support columns interface and engage with one another and are secured together along a substantial portion of the engaging surfaces. For example, the surfaces of the support columns for each the top and bottom blank may be secured together by adhesive. In this example, the adhesive extends along a substantial portion of an engaging surface, which provides a stronger connection, similar to a welded connection, as compared to conventional foldable connections (e.g., locking tabs).

The pallet of the present disclosure is formed so as to have a simplified design and connection process. This allows the pallet to be easily assembled by a machine or other automated device. For example, the top and bottom blank may be formed into the top and bottom members of the pallet by folding various sidewalls and flaps. However, as compared to conventional foldable pallets, the folds may be made at 90 degrees or right angles. In this manner, the foldable flaps may be more easily manipulated by a machine or machine component as compared to individual locking tabs or the like typically used in foldable pallets.

In some embodiments, the pallet may also include one or more enhancement elements, such as an insert or rigid member coupled between the top and bottom blanks. The insert acts to further increase the rigidity and stiffness of the pallet. Other embodiments may include additional support columns or boxes that are connected between and connected to the top and bottom blanks. The additional support columns act to provide additional structural supports and rigidity to the pallet. The rigid member and additional support columns may be used together in combination for heavy loads or may be used on their own or omitted.

In some embodiments the pallet is constructed out of a corrugated or cellular material. For example, the top member and the rigid member may be constructed out of single wall, double wall, or triple wall corrugated paperboard. In these embodiments, the rigid member is coupled to the top member such that the corrugation direction of the rigid member is offset from the corrugation direction of the top member, e.g., 90 degrees offset, 45 degrees offset, or the like. This combination of corrugation directions increases the rigidity of the pallet as compared to conventional cardboard pallets. Further due to the varying corrugation angles, the pallet is able to better resist bending forces in all directions, rather than a single direction, and has an increased stiffness to withstand higher columnar loads. This allows pallets of the present disclosure to store and transport heavier loads and/or uneven loads as the forces are better distributed and resisted and allows support of unevenly or asymmetric or awkwardly shaped loads, e.g., round goods, bundled goods, produce, and the like.

Conventional cardboard pallets typically cannot support heavy asymmetric loads because the force is not balanced and due to the lack of rigidity, the pallet could collapse or the load could collapse. Thus, conventional pallets required that the load be evenly distributed and columnar type loads could not be supported. Accordingly, conventional cardboard pallets could not be used in many applications. Using the structures of the present disclosure cardboard can be used to construct a pallet that will easily support columnar and uneven load distributions allowing the pallet to be used in many more applications and for varying types of goods.

The pallet of the present disclosure may be made of paperboard, cardboard, plastics, or other corrugated or cellular structured materials. Additionally, in many embodiments the pallet is foldably constructed and can be transported from a first location in a first configuration (e.g., unfolded or reduced volume) and assembled at a second location into a second configuration (e.g., folded or increased volume). In this manner, shipping costs associated with delivering the pallet to certain locations are significantly reduced compared to conventional wooden pallets. Compared to conventional wooden pallets, the present disclosure generally provides a pallet that is lighter in weight, is less expensive, strong, is easy to assemble, is easier and less costly to transport and store, requires less space for storage, is more readily recyclable or disposable, and minimizes environmental impact.

In accordance with various embodiments, a pallet may be packaged and shipped with a container. The container may have an expanded configuration and a collapsed configuration. In the collapsed configuration, the pallet and the container are slightly larger than the size of the pallet alone. In the expanded configuration, the pallet supports the container. The container covers approximately area of the pallet and forms an enclosed volume. The packaging system may be provided to a user in the collapsed state simplifying shipping and logistics allowing the user to assembly the packaging system to its expanded state out of a single box.

In accordance with various embodiments, the various sheet material from which the pallet(s) and/or container(s) of the present disclosure are made is paperboard and, most preferably, corrugated paperboard. Corrugated paperboard comprises a corrugated medium held or sandwiched between liner sheets. The corrugated medium, which is typically made from a short fiber paper, is configured with flutes or pleats forming interconnected arches. The flutes or pleats extend lengthwise along parallel lines of corrugation with arches being typically glued to the liner sheets, which are normally made of puncture resistant paper. The corrugated paperboard can be manufactured in various ways. The corrugated paperboard can be treated in various ways including chemical cooking processes and surface treatment, including but not limited to flame treatment, and/or coating processes, among others. However, thermal plastics and ductile metals could be used as the sheet material. The blanks for each of the components can each be cut in any suitable manner from stock sheet material, such as by die or stamp cutting. The blanks can be treated in various ways to make them suitably moisture and water resistant. The blanks can be made from virgin materials or from recycled materials. The blanks are easily and routinely recyclable while maintaining many of the desirable characteristics of less readily recyclable materials such as wood, metal and various plastics.

Figure 2:
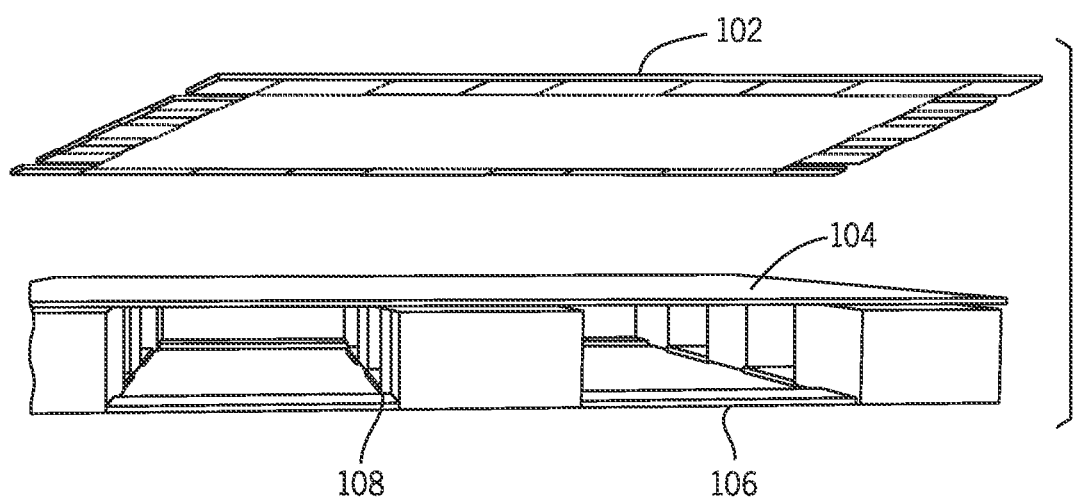
FIG. 2 is a partially exploded view of the pallet of FIG. 1A.

FIGS. 1-14 illustrate one example of a force resisting structure or pallet 100. With reference to FIGS. 1A-2, the pallet 100 includes a top blank 102 and a bottom blank 106 secured together. Optionally, the pallet 100 may also include one or more rigidity enhancements or accessories, such as a rigid member 104 and/or one or more additional support columns, such as a support column 108. The rigid member 104 and support column 108 are connected between the top and bottom blanks 102, 106 and provide additional rigidity and structural support for the pallet 100. In many embodiments, the rigid member 104 is aligned with the top blank 102 and, as the top blank 102 is secured to the bottom blank 106, the rigid member 104 is secured as well. Similarly, the support column 108 may be positioned on the bottom blank 106, optionally may be adhesively secured to bottom blank 106, and when the top blank 102 is secured to the bottom blank 106, the support column 108 is secured in position.

The additional support columns, such as the support column 108, may be used to provide an additional structure to allow the top and bottom blanks 102, 106 to more easily connect to one another by providing additional material on the bottom blank 106 to form a solid exterior on the columns for the top blank 102 to which the top blank can connect (as discussed in more detail below). Additionally, the support columns enhance the strength of the pallet 100, as well as simplify the matching processes during assembly. However, in other embodiments the additional support columns may be omitted.

Preferably the rigid member 104 is sufficiently coupled to the top blank 102 and the bottom blank 106 that when the pallet 100 is assembled, the rigid member 104 is essentially integrated with the pallet 100. In some embodiments, the rigid member 104 is positioned between the top blank 102 and the bottom blank 106 such that the top blank 102 is positioned on top of and around the rigid member 104 to couple the components together. In one embodiment, the rigid member 104 is coupled to the top blank 102 such that the combination of the two components defines an upper deck for the pallet 100 with a top surface of the top member forming the deck surface for the pallet 100. In this embodiment, the bottom member forms the lower deck of the pallet 100.

Figure 3A:
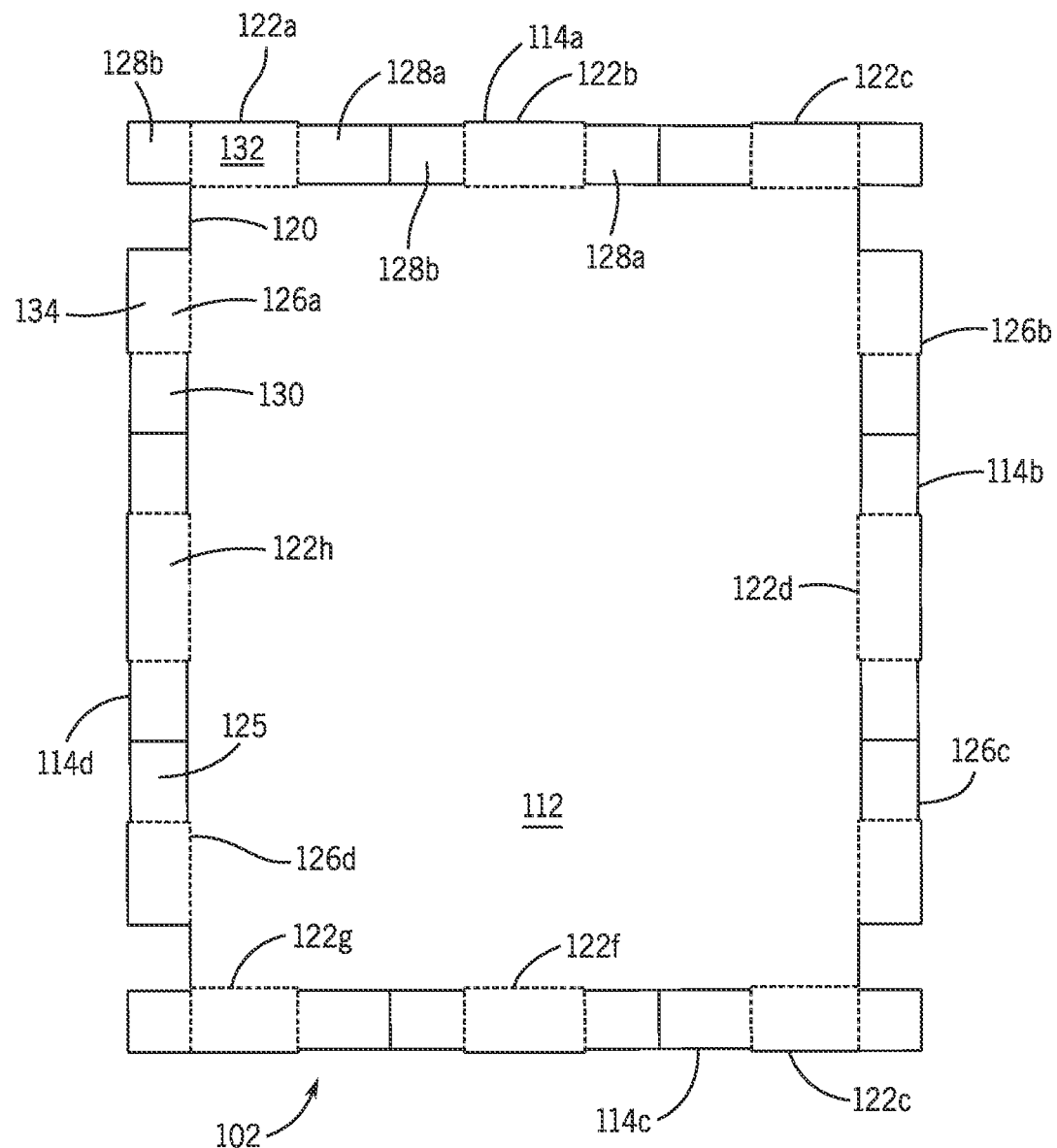
FIG. 3A is a bottom plan view of a top blank in an unfolded configuration.

With reference to FIG. 3A, before folding, the top blank 102 is a generally planar member having an interior surface 112 and a top surface 160. A plurality of sidewalls 114a, 114b, 114c, 114d surround a perimeter edge 120 of the top blank with two of the sidewalls 114a, 114c extending past a portion of the perimeter edge 120 (i.e., having a longer length than the corresponding dimension of the interior surface 112) of the top blank 102 and two of the sidewalls 114b, 114d have a shorter length than a corresponding portion of the perimeter edge 120. Each of the sidewalls 114a, 114b, 114c, 114d pivot to approximately 90 degrees or a right angle relative to the interior surface 112. As will be discussed in more detail below, the sidewalls 114a, 114b, 114c, 114d will form support structures, such as a portion of a pillar or of the support column 108, for the pallet 100 (see FIG. 4). In FIG. 3A, the dotted lines illustrate the fold lines for each of the sidewalls 114a, 114b, 114c, 114d. Portions of the sidewalls 114a, 114b, 114c, 114d are attached to the perimeter edge 120 while other portions are detached, allowing rotation along other directions than just along the edge 120 as discussed in more detail below.

In some embodiments, the pallet 100 is formed from foldable materials, such as corrugated or non-corrugated cardboard, paperboard, plastic, or the like. In these embodiments, the components of the pallet 100 are typically formed from substantially flat blanks of material that are cut and/or perforated into a desired shape. In FIGS. 3A, 3B, 5A, and 5B foldable or pivotable connections between components are represented by dotted lines and edge lines indicate the edge of the top blank or component. However, in other embodiments where adhesive may be used, the top blank 102 may be formed in a different manner and may include fasteners or the like that secure the various components to the top blank 102, rather than having the components be integrally formed with the top blank 102.

Figure 3B:
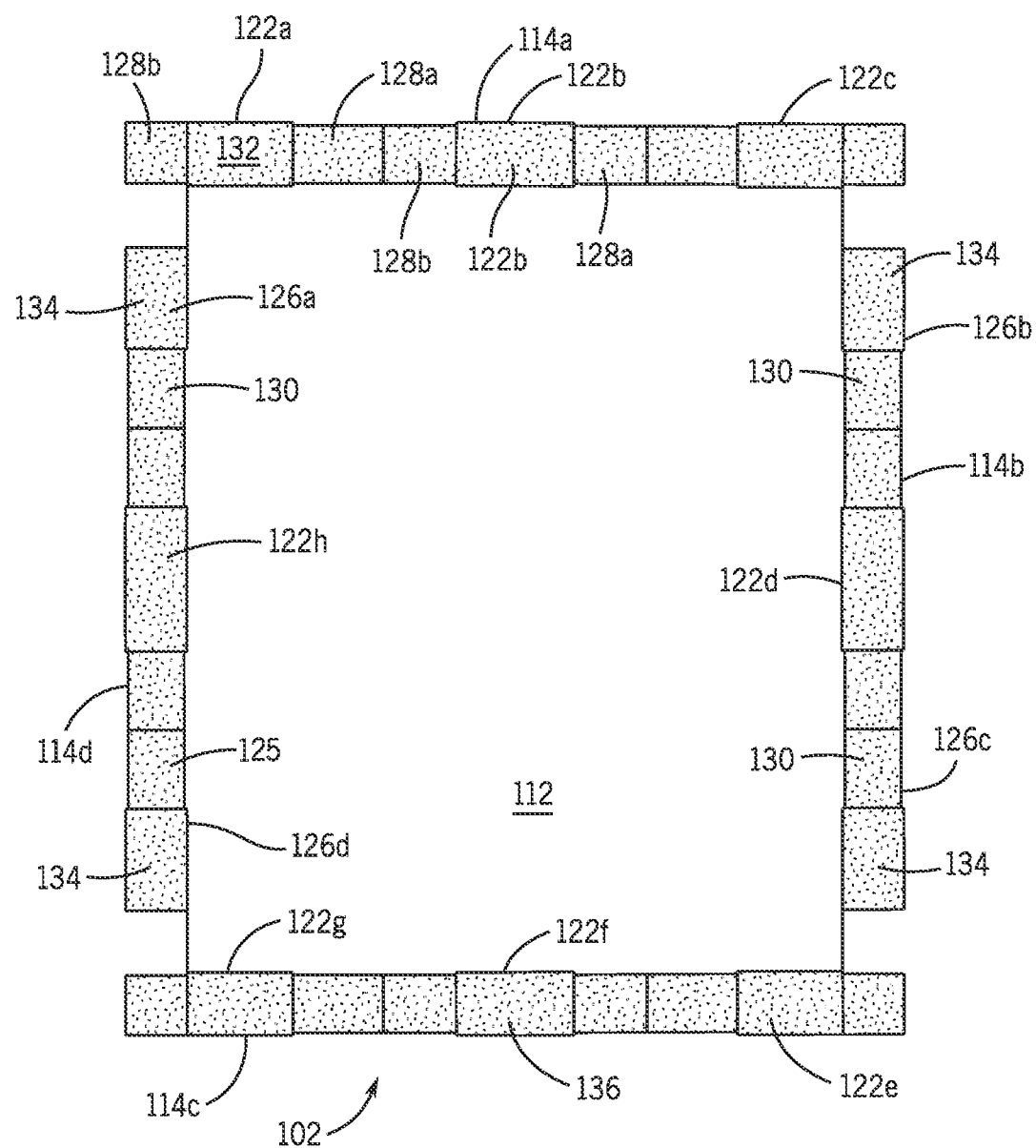
FIG. 3B is a bottom plan view of the top blank of FIG. 3A after adhesive has been applied to interior surfaces of one or more sidewalls.

FIGS. 3A and 3B illustrate bottom plan views of the top blank 102 in the unfolded configuration. FIG. 3A illustrates the top blank 102 without adhesive and FIG. 3B illustrates the top blank 102 with adhesive applied to the sidewall flaps. In one embodiment, the top blank 102 is a double wall corrugated material with two planes of corrugation vanes running parallel to one another. However, in other embodiments, the top blank 102 may be formed of a single layer of corrugated material or multiple layers of corrugation material.

With reference to FIG. 3A, before folding, the top blank 102 is a generally planar member having an interior surface 112 and a top surface 113. A plurality of sidewalls 114a, 114b, 114c, 114d surround a perimeter edge 120 of the top blank with two of the sidewalls 114a, 114c extending past a portion of the perimeter edge 120 (i.e., having a longer length than the corresponding dimension of the interior surface 112) of the top blank 102 and two of the sidewalls 114b, 114d have a shorter length than a corresponding portion of the perimeter edge 120. Each of the sidewalls 114a, 114b, 114c, 114d pivot to approximately 90 degrees or a right angle relative to the interior surface 112. As will be discussed in more detail below, the sidewalls 114a, 114b, 114c, 114d will form support structures, such as a portion of a pillar or column 108, for the pallet 100 (see FIG. 4). In FIG. 3A, the dotted lines illustrate the fold lines for each of the sidewalls 114a, 114b, 114c, 114d. Portions of the sidewalls 114a, 114b, 114c, 114d are attached to the perimeter edge 120 while other portions are detached, allowing rotation along other directions than just along the edge 120 as discussed in more detail below.

In some embodiments, the top blank 102 may include two types of flaps forming a portion of the sidewalls 114a, 114b, 114c, 114d. The sidewalls 114a-114d may include an interior surface 125, which as discussed in more detail below will be used to receive adhesive. For example, the top blank 102 may include one or more edge supports 122a-122h that are arranged on various edges of the top blank 102. In one embodiment, the first and third edges may each include three edge supports 122a, 122b, 122c, 122e, 122f, 122g spaced apart along the respective edge, whereas the second and fourth edges may each include a single edge support 122d, 122h positioned substantially in a middle section of the respective edge. The second and fourth edges may include corner walls 126a, 126b, 126c, 126d positioned on either side of the singular edge support 122d, 122h. As will be discussed in more detail below, the corner walls 126a-126d interface with flaps of adjacent edge supports 122a-122g on an adjacent edge.

With continued reference to FIG. 3A, each edge support 122a-122g may be substantially similar to each other as such the discussion below of the first edge support 112a should be understood to apply to the other edge supports 122b-122g. The first edge support 122a may include a center support wall 132 with two rotatable flaps 128a, 128b. The center support wall 132 is formed integrally with the interior surface 112 and connected thereto, but is rotatable along its bottom edge to the interior surface 112. The length of the center support wall 132 determines the size of the fork apertures 165. In particular, the shorter the center support wall 132 length, the larger the size of the fork apertures 165. However, reducing the length of the center support wall 132 may also reduce the structural rigidity and support of the pallet 100. Accordingly, the size of the center support wall 132 may be selected by balancing a desired fork aperture size and structural requirements for the pallet 100.

The rotatable flaps 128a, 128b extend from either side of the center support wall 132, but are disconnected (e.g., through a cut line or the like) from the interior surface 112. In this manner, the rotatable flaps 128a, 128b can pivot along two axes relative to the interior surface 112. In particular, with reference to FIG. 4, the rotatable flaps 128a, 128b pivot 90 degrees along a first axis relative to the interior surface 112 when the center support wall 132 pivots downwards from the interior surface 112 and then pivot along a second axis as they pivot 90 degrees from the connection edge to the center support wall 132. In some embodiments, each of the edge supports 122a, 122b, 122c, 122d, 122e, 122f include two flaps 128a, 128b on either side. This allows each of the flaps to have a reduced length, making assembly, especially by a machine easier since the machine components do not have to reach as far into the pallet 100 to secure the length of the flaps 128a, 128b to the corresponding structure on the bottom blank 106. Further, because each edge support includes two flaps 128a, 128b, the outer surface of the pallet 100 may be smoother since the edge supports 122a-f on the corners of the top blank 102 (i.e., 122a, 122c, 122e, 122g) will not have a cut edge exposed after folding, but rather a folded corner, which is less likely to snag during handling.

Figure 4:
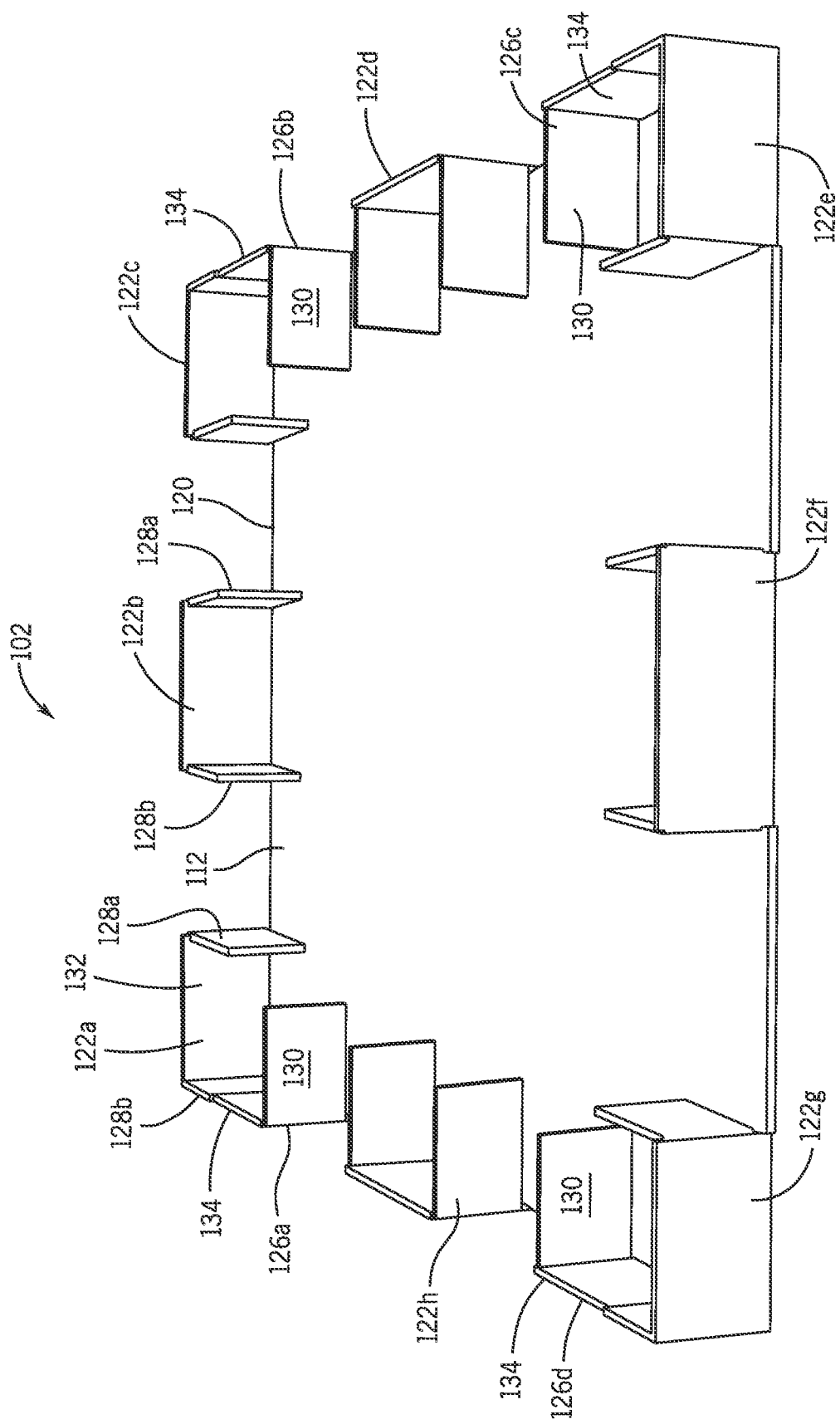
FIG. 4 is a bottom perspective view of the top blank of FIG. 3B in a folded configuration.

With reference to FIG. 4, in the folded configuration, the first edge support 122a defines a U-shaped support structure with the center wall 132 being positioned on the perimeter edge 120 of the interior surface 112 and the rotatable flaps 128a, 128b extending at approximately 90 degrees for the ends of the center wall 132 and extending into an interior of the top blank 102.

With reference again to FIG. 3A, the corner walls 126a, 126b, 126c, 126d will be discussed in more detail. The corner walls 126a, 126b, 126c, 126d each include an outer wall 134 and a rotatable corner flap 130 connected to the outer wall 132. The outer wall 134 is connected to the perimeter edge 120 of the top blank 120 and rotatable relative thereto along the connected edge. The corner flap 130 is connected along a side edge to the outer wall 134, but is separated from the perimeter edge 120, allowing the corner flap 120 to be positioned towards a center over the top blank 102 and extend over a portion of the interior surface 112.

With reference to FIG. 4, in the folded configuration, the corner walls 126a, 126b, 126c, 126d are folded such that the outer wall 134 pivots along the perimeter edge 120 about 90 degrees to form a right angle with the interior surface 112. The corner flap 130, which is connected to the outer wall 134 pivots with the outer wall 134, but then pivots at a right angle relative to the side edge of the outer wall 134. In this manner, the corner flap 130 extends inward toward a center of the top blank 102. The formed corner wall 126a, 126b, 126c, 126d then form an L-shaped wall. In some embodiments, the outer wall 134 is aligned adjacent to the rotatable flap 128b of the edge support 122a (or the edge support on the adjacent edge of the top blank 102). In some embodiments, the side edges of each the outer wall 134 and the rotatable flap 128b may engage one another. In this manner, the flap 128b and the outer wall 134 form an extended sidewall portion for the top blank 102 in the folded configuration.

As should be noted, each of the sidewalls 114a, 114b, 114c, 114d may be basic geometric shapes, such as rectangles or squares. As will be discussed in more detail below, the sidewall shapes allow a machine to more easily manipulate the sidewalls and fold them into a desired configuration.

With reference to FIG. 3B, before folding, the top blank 102 may be prepared for attachment to the bottom blank 106. In many embodiments, the top blank 102 may not be folded until it is aligned with the bottom blank 106 as discussed in more detail below. In some embodiments, the interior surfaces 125 of the sidewalls 114a, 114b, 114c, 114d are covered with adhesive 136. As will be discussed in more detail below, the adhesive 136 on the sidewalls 114a, 114b, 114c, 114d is used to secure the sidewalls 114a, 114b, 114c, 114d of the top blank 102 to the bottom blank 106. The adhesive 136 may be applied by a user or a machine to a substantial portion of the interior surfaces of each of the sidewalls to define an extended connection to the bottom blank 106 at each engagement surface as discussed in more detail below. The adhesive 136 may be substantially any substance configured to secure two surfaces together. For example, the adhesive 136 may be liquid or paste and applied to the various surfaces by rolling, spraying, brushing, or other suitable manner, whether by hand or by a machine. The adhesive 136 may be applied to the top blank 102 and/or to the bottom blank 106 during manufacturing and activated once the top and bottom blanks 102, 106 are to be secured together. For example, the adhesive 136 may be heat, water, or pressure activated. In some embodiments, the adhesive 136 may be a double-sided tape protected by a release tape that is removed during assembly of the pallet 100.

Figure 5A:
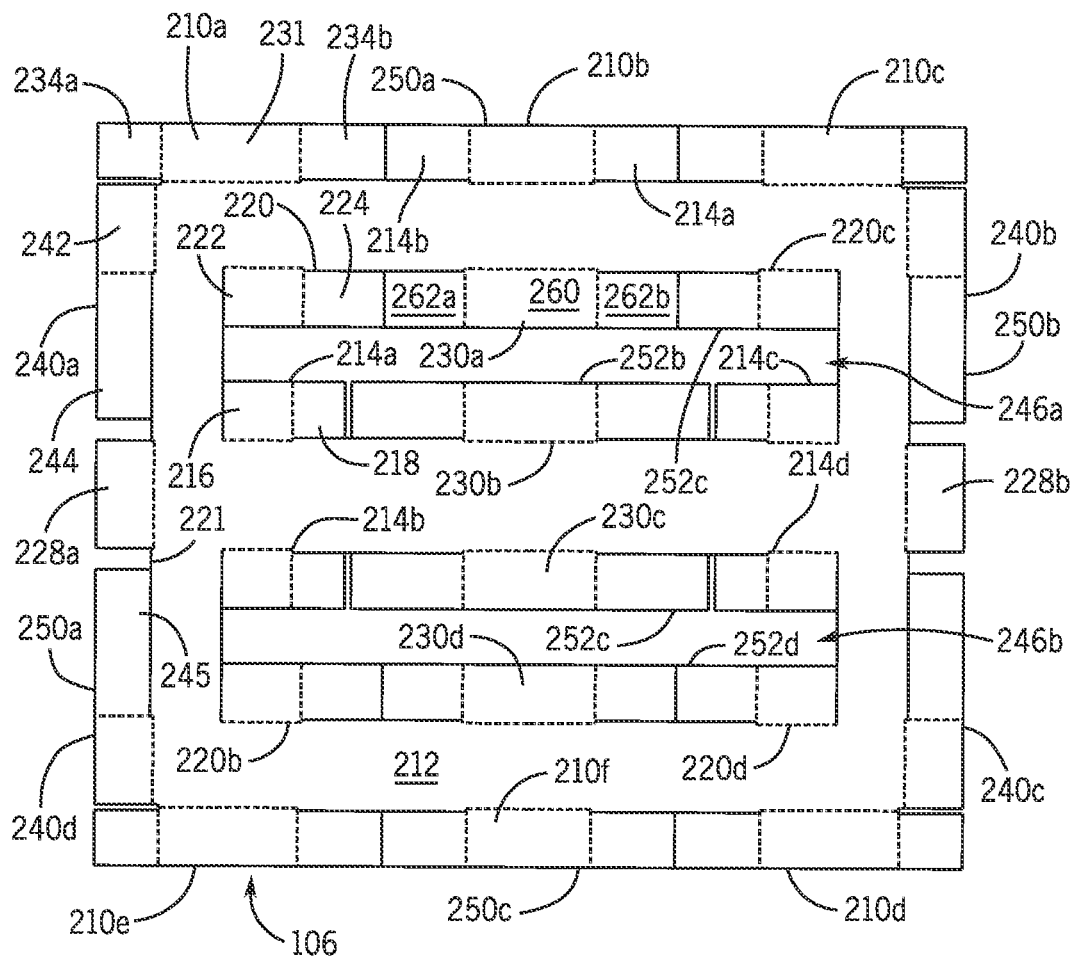
FIG. 5A is a top plan view of a bottom blank in an unfolded configuration.
Figure 5B:
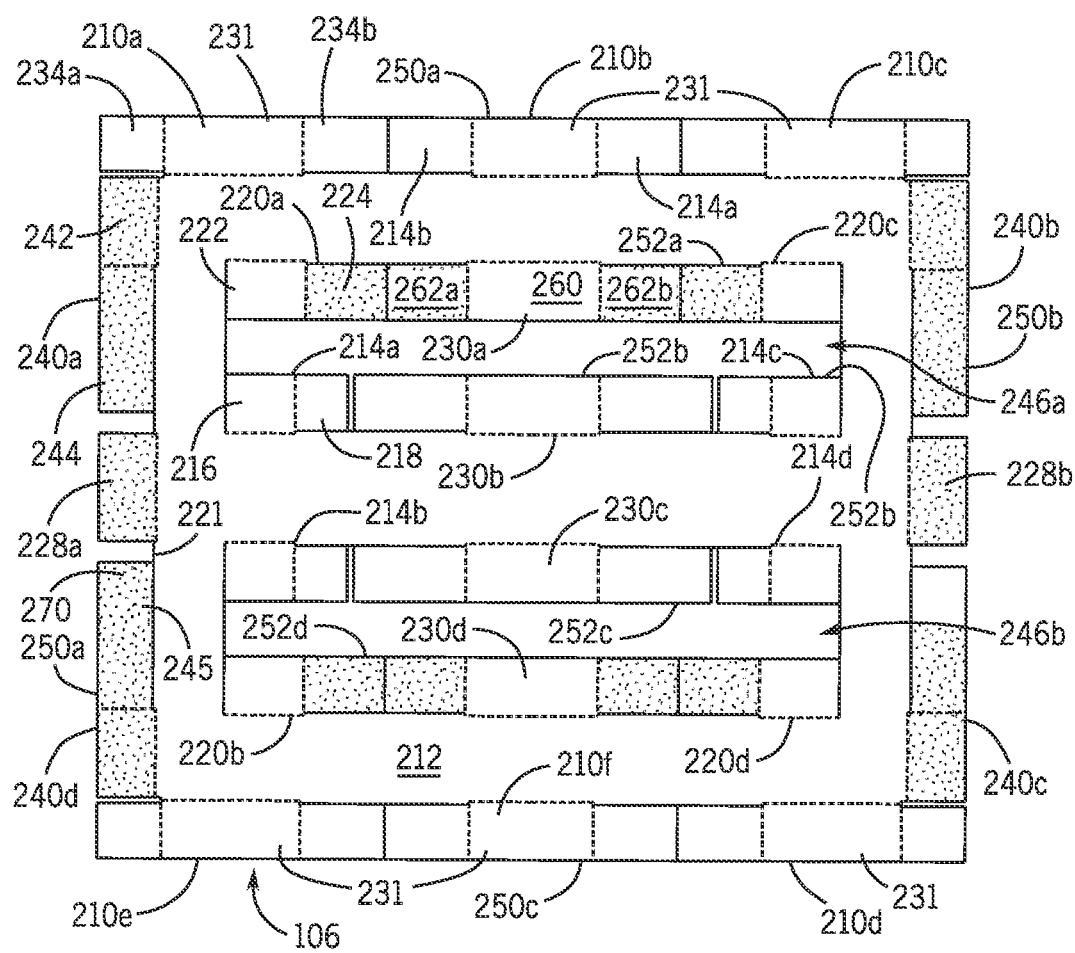
FIG. 5B is a top plan view of the bottom blank of FIG. 5A after adhesive has been applied to interior surfaces thereof.
Figure 6A:
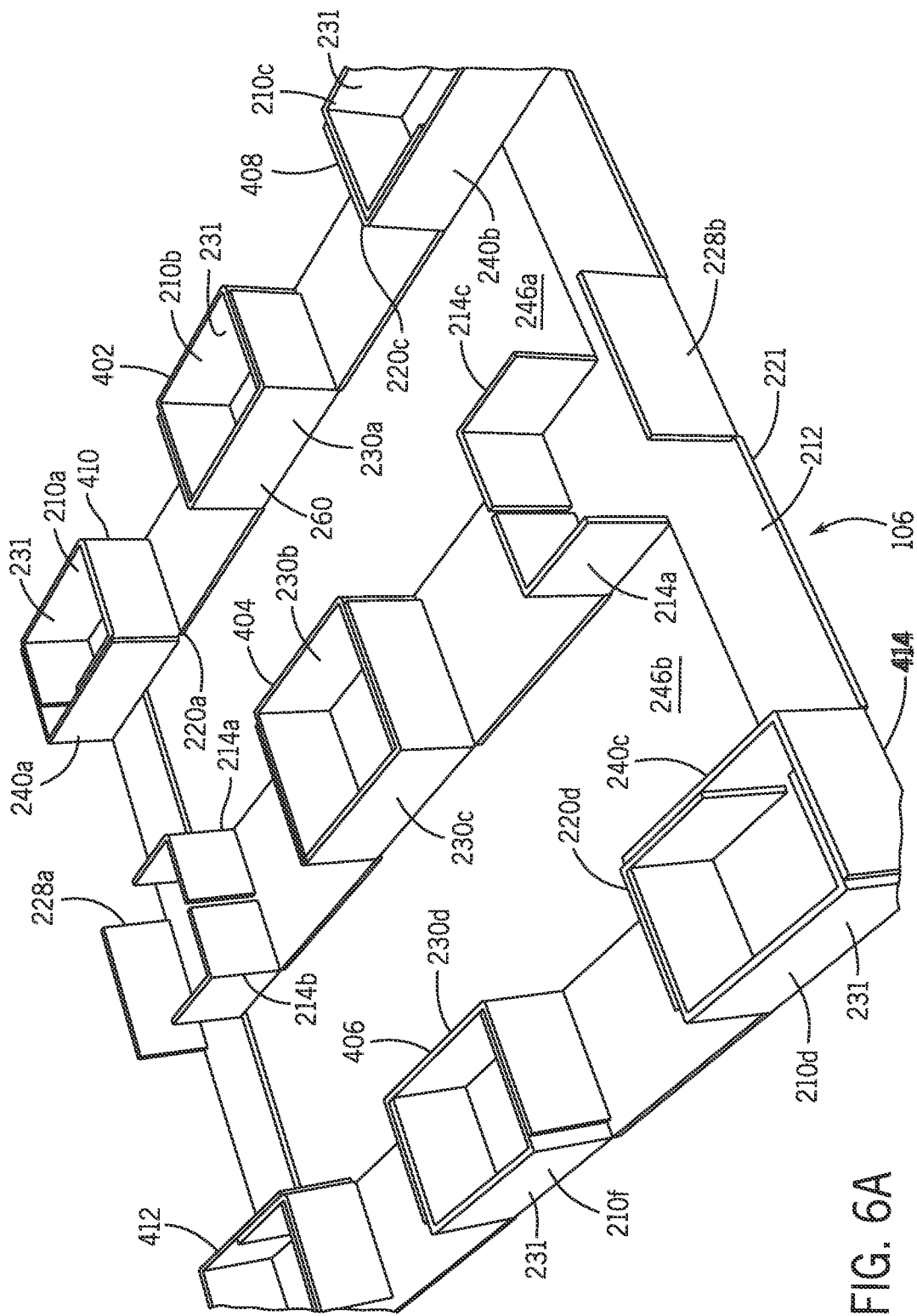
FIG. 6A is a top perspective view of the bottom blank of FIG. 5A in the folded configuration.
Figure 6B:
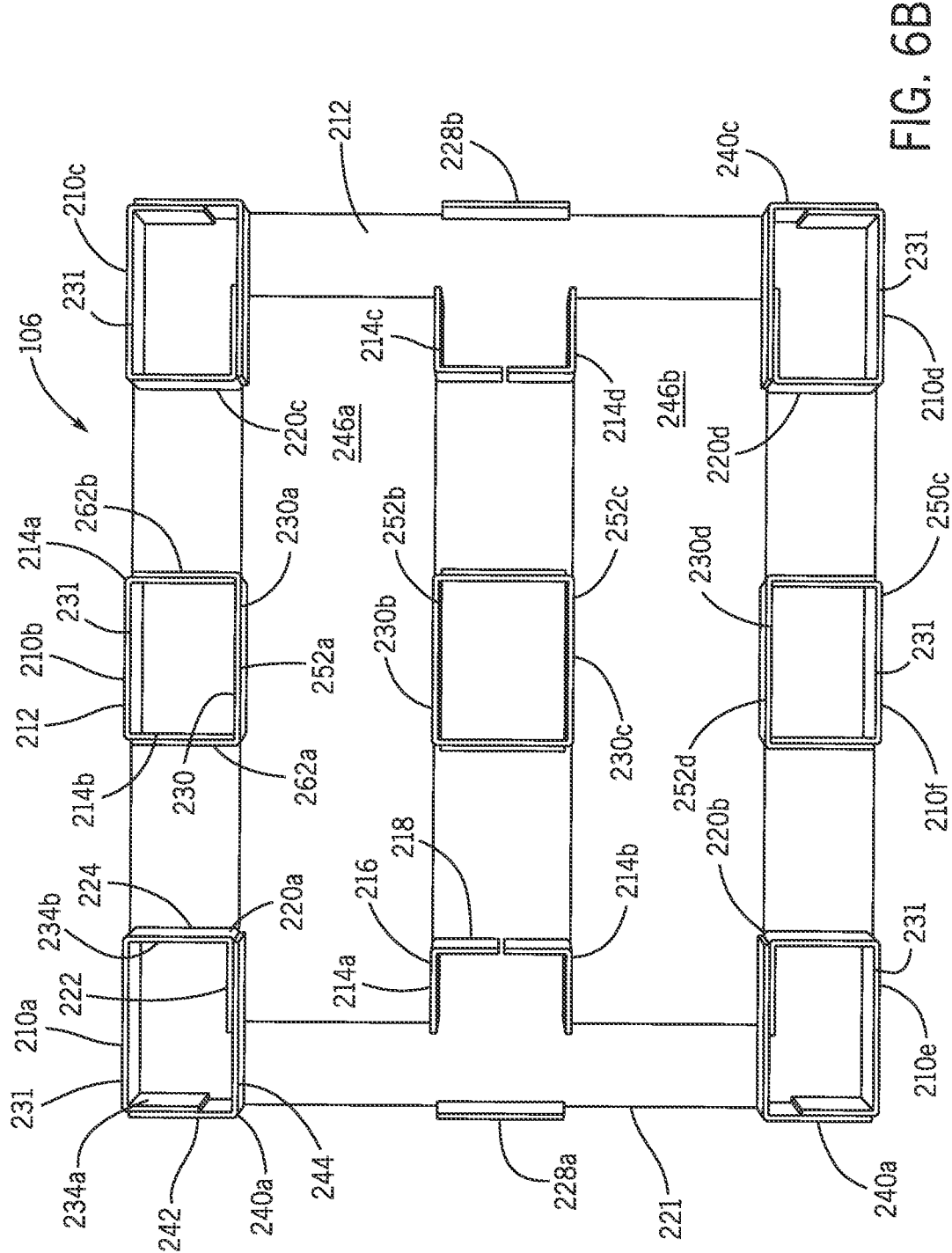
FIG. 6B is a top plan view of the bottom blank of FIG. 5A in the folded configuration.

The bottom blank 106 will now be discussed in more detail. FIG. 5A illustrates a top plan view of the bottom blank 106 in the unfolded configuration. FIG. 5B illustrates a top plan view of the bottom blank 106 illustrating the adhesive placement. FIGS. 6A and 6B illustrate various views of the bottom blank 106 in the folded configuration. With reference initially to FIG. 5A, the bottom blank 106 may be formed as a generally planar member including an interior surface 212 and an exterior surface 213 (see FIG. 1C). The bottom blank 106 may include a perimeter 221 that defines a perimeter of the pallet 100. A plurality of sidewalls 250a, 250b, 250c, 250d surround the perimeter 221 and are foldable relative to the interior surface 212 to pivot to a position normal to the interior surface 212 as discussed in more detail below. Each of the sidewalls 250a, 250b, 250c, 250d forms a portion of a support structure, such as interior pillars or columns, that provides support between the top and bottom blanks 102, 106. The bottom blank 106 may also include one or more interior apertures 246a, 246b defined through the interior surface 212. The interior apertures 246a, 246b define interior edges about which internal sidewalls 252a, 252b, 252c, 252d are formed and pivot relative thereto.

Similar to the top blank 102, the sidewalls 250a-d of the bottom blank 106 include a plurality of edge supports 210a, 210b, 210c, 210d, 210e that are folded to define in whole or in part support pillars for the pallet 100. However, unlike the top blank 102, the edge supports 210a, 210b, 210c, 210d, 210e may be formed only on two edges of the bottom blank 106, for example, on the first and third edges of the perimeter 221. Similar to the top edge supports, the bottom edge supports 210a, 210b, 210c, 210d, 210e may each be substantially similar and may include structures that are foldable to define a U-shaped structure. For example, with reference to FIG. 5A, the first edge support 210a includes an edge support center support wall 231 having two flaps 234a, 234b extending from either side. The edge support center support wall 231 is connected on one edge to the perimeter 221 of the bottom blank 106 and pivots along the connected edge approximately 90 degrees to be oriented normal to the interior surface 212. The fold lines for the bottom blank 106 are illustrated by dotted lines in FIG. 5A.

Each of the flaps 234a, 234b are separated from the perimeter 221, such as through a cut, slot, or the like. This allows the flaps 234a, 234b to pivot with the edge support center support wall 231 and also pivot along the connected edge to the edge support center support wall 231 inward toward a center of the interior surface 212. In this manner, as shown in FIGS. 6A and 6B, the folded edge supports 210a, 210b, 210c, 210d, 210e form the U-shape supports for the pallet 100.

As with the top blank 102, the bottom blank 106 sidewalls 250a-250d may also include corner walls 240a, 240b, 240c, 240d. The corner walls 240a, 240b, 240c, 240d each may be substantially the same and each may include an outer wall 242 that is connected to and pivots relative to the perimeter 221 and a corner flap 244 extending from one side edge of the outer wall 242. The corner flap 244 is disconnected from the perimeter 221 and allows to pivot in multiple directions relative to the interior surface 212. With reference to FIGS. 6A and 6B, when folded, the corner walls 240a, 240b, 240c, 240d form an L-shaped structure with the outer wall 242 extending parallel to the respective edge of the perimeter 221 and the corner flap 244 is pivoted approximately 90 degrees relative to the outer wall 242. As will be discussed in more detail below, in some embodiments, the corner walls 240a, 240b, 240c, 240d engage with and are connected to the edge supports 210a, 210b, 210c, 210d. For example, the edge supports 210a, 210c, 210d, 210e positioned at the corners of the bottom blank 106 may be held in the folded configuration by the corner walls 240a, 240b, 240c, 240d that include adhesive on their interior surfaces 245.

The outer sidewalls 250a, 250b, 250c, 250d of the bottom blank 106 may also include outer flaps 228, 228b. The outer flaps 228a, 228b may be positioned between the corner walls 240a, 240b, 240c, 240d and specifically the corner flaps 244 on the second and third edges of the perimeter 221. The outer flaps 228a, 228b are connected to the perimeter 221 and pivot along the connection to be orientated normal to the interior surface 212 when in the folded configuration. In some embodiments the outer flaps 228a, 228b may be replaced by an edge support and include multiple flaps and that define a U-shape structure.

With reference to FIG. 5A, the internal sidewalls 252a, 252b, 252b, 252d are folded relative to the interior surface 212 to define interior support structures for the pallet 100. In some embodiments, the internal sidewalls 252a, 252b, 252c, 252d engage with and connect to portions of the exterior sidewalls 250a, 250b, 250c, 250d. Additionally, the internal sidewalls 252a, 252b, 252c, 252d may include similar structures as the outer sidewalls. For example, a plurality of interior edge supports 230a, 230b, 230c, 230d may be defined that are substantially similar to the exterior edge supports 210a, 210b, 210c, 210d, 210e. Each of the interior edge supports 230a, 230b, 230c, 230d includes an interior edge center support wall 260 that is connected to the interior surface 212 and pivots relative thereto. The interior edge center support wall 260 may be formed integrally or monolithically with the interior surface 212 and includes two rotatable flaps 262a, 262b that extend from either side. The flaps 262a, 262b are disconnected from the interior surface 212 and pivot along one edge that is connected to the interior edge center support wall 260. Similarly to the exterior edge supports 210a, 210b, 210c, 210d, 210e, the interior edge supports 230a, 230b, 230c, 230d form a U-shaped support structure in the folded configuration as the interior edge center support wall 260 pivots 90 degrees relative to the interior surface 212 and the flaps 262a, 262b pivot 90 degrees relative to the side edges of the interior edge center support wall 260.

The interior edge supports 230a, 230b, 230c, 230d are configured to be folded around the exterior edge supports 210b, 210f (specifically, the flaps 262a, 26b of the interior edge supports 230, 230b, 230c, 230d fold over the outside of the flaps 234a, 234a of the exterior edge supports). This structure avoids a double-step lap joint when the top blank 102 is connected, which typically increases the width of the fork lift apertures 165. Thus in these embodiments, the chances that a forklift fork may snag on the structure are reduced. In one embodiment, a double-step lap joint may extend into the fork lift aperture 165 by over ½ inch and is more likely to become a snag as compared to the current joint that in one example may only extend by 5/16 of an inch. Also, by reversing the folds, some of the lap joints are now flush instead of having one lap joint as does the folded pallet 100.

In addition to the interior edge supports 230*a*, 230*b*, 230*c*, 230*d*, two of the internal sidewalls 252*a*, 252*d* may also include a plurality of peripheral corner supports 220*a*, 220*b*, 220*c*, 220*d*. The peripheral corner supports 220*a*, 220*b*, 220*c*, 220*d* are positioned at the terminal ends of the interior apertures 246*a*, 246*b* and oriented toward the exterior first and third edges of the perimeter 221. Each of the peripheral corner supports 220*a*, 220*b*, 220*c*, 220*d* includes a corner wall 222 and a corner flap 224 extending from a side edge of the corner wall 222. The corner wall 222 is connected to the interior surface 212 and pivots 90 degrees relative thereto. The corner flap 224 is disconnected from the interior surface and pivots 90 degrees along the connected edge or fold line to the corner wall 222. In this manner, the folded corner supports 220*a*, 220*b*, 220*c*, 220*b* form an L-shaped support pillar (see FIG. 6A). In some embodiments, the peripheral corner supports 220*a*, 220*b*, 220*c*, 220*d* are configured to fold over the outside surface of the respective exterior edge supports 210*a*, 210*b*, 210*c*, 210*d* (specifically fold over the flap 234*a* of each). This structure removes a potential double-step lap joint from being formed on the inside of the pallet 100 when the top blank 102 is folded around and secured to the bottom blank, which, for the reasons discussed above, reduce the risk that the forks of a forklift may damage or snag portions of the pallet 100.

Similarly to the peripheral corner supports 220*a*, 220*b*, 220*c*, 220*d*, the interior sidewalls 252*b*, 252*c* each include a plurality of central corner supports 214*a*, 214*b*, 214*c*, 214*d*. The central corner supports 214*a*, 214*b*, 214*c*, 214*d* may be substantially similar to the peripheral corner supports 220*a*, 220*b*, 220*c*, 220*d*, but may have a shorter corner flap and are positioned at the terminal ends of the interior apertures 246*a*, 246*b* but closer towards a center area of the interior surface 212 as compared to the peripheral corner supports 220*a*, 220*b*, 220*c*, 220*d*. Each central corner support 214*a*, 214*b*, 214*c*, 214*d* includes a corner wall 216 formed integrally with or otherwise connected to the interior surface 212 and a corner flap 218 connected along one edge of the corner wall 216 and otherwise movable relative to the interior surface 212. In the folded configuration, each central corner supports 214*a*, 214*b*, 214*c*, 214*d* is folded such that the corner wall 216 pivots 90 degrees relative to the interior surface 212 and the corner flap 218 then pivots 90 degrees relative to the side edge of the corner wall 216 to define an L-shaped support structure. In some embodiments, the corner flap 218 of the central corner supports 214*a*, 214*b*, 214*c*, 214*d* is shorter than the peripheral corner supports 220*a*, 220*b*, 220*c*, 220*d* and thus does not extend as far as the corner flaps 224 in the peripheral corner supports 220*a*, 220*b*, 220*c*, 220*d*. In one embodiment, the corner flap 224 in the peripheral corner supports 220*a*, 220*b*, 220*c*, 220*d* is approximately the same length as the corner wall 222, whereas the corner flap 218 in the central corner supports 214*a*, 214*b*, 214*c*, 214*d* may have a length that is shorter than a length of the corner wall 216.

With reference to FIG. 5B, as with the top blank 102, the bottom blank 106 may include adhesive 270 applied to certain interior surfaces 245 of the interior and exterior sidewalls 250*a-d*. In particular, each panel forming a portion of the second and fourth exterior sidewalls 250*b*, 250*d* may include one or more layers of adhesive 270. As will be discussed below, the adhesive 270 can be applied by a machine and may be used to connect the sidewalls of the bottom blank 106 to the top blank 102 and one or more accessories (e.g., additional support pillars or the like). The adhesive 270 may be similar to the adhesive 136 described above.

Figure 7A:
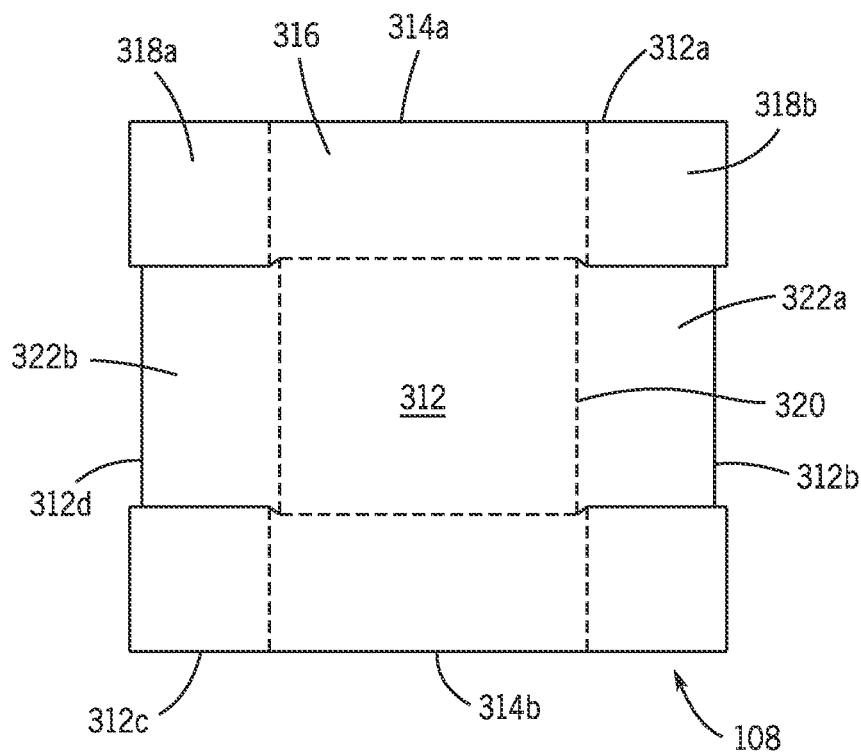
FIG. 7A is a top plan view of a supplemental column support in an unfolded configuration.
Figure 7B:
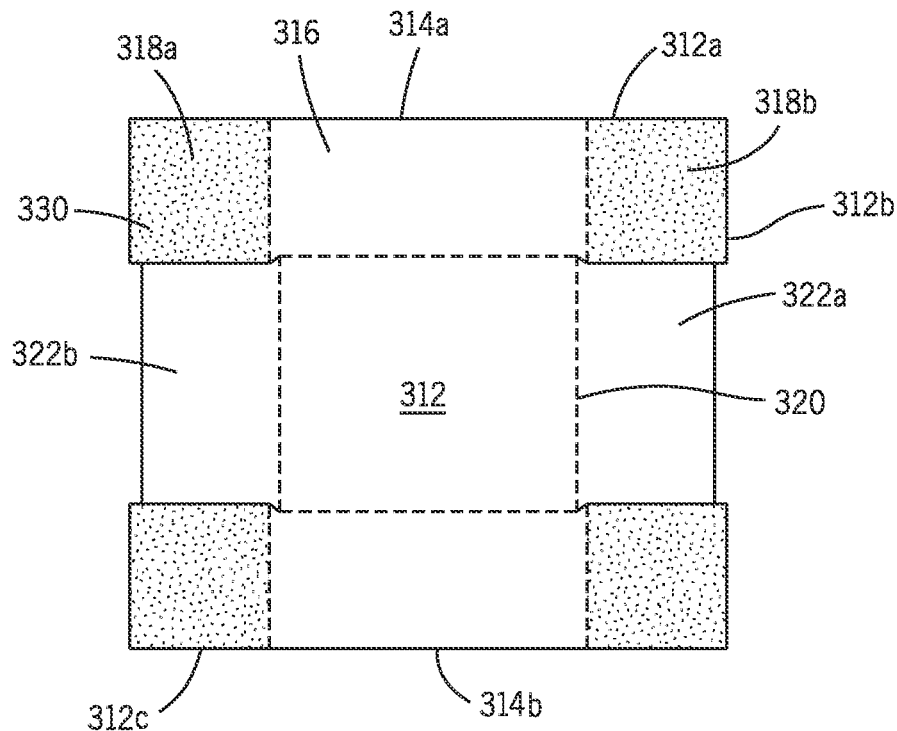
FIG. 7B is a top plan view of the supplemental column support of FIG. 7A after adhesive has been applied to interior surfaces thereof.
Figure 7C:
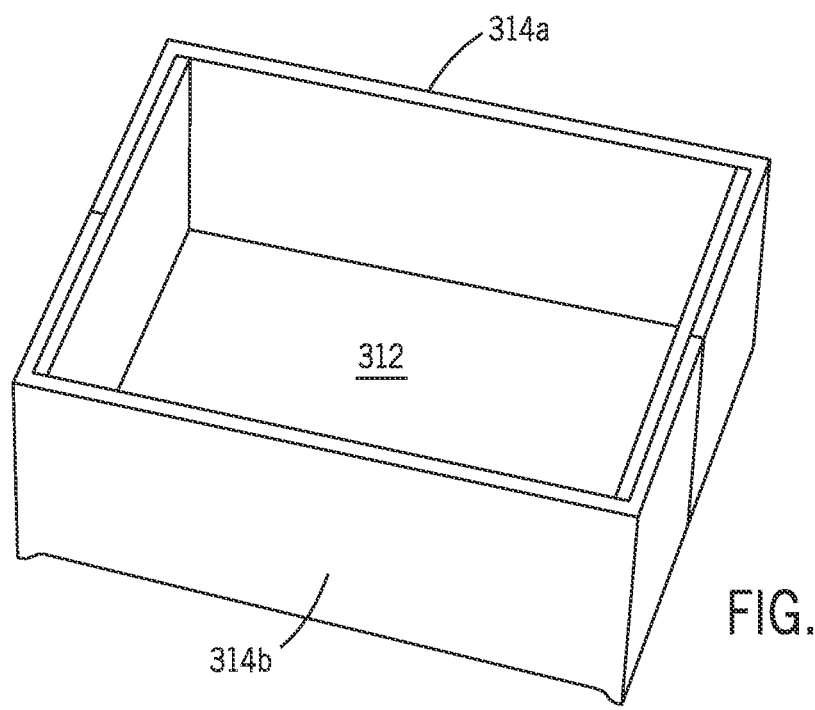
FIG. 7C is a top perspective view of the supplemental column support of FIG. 7A in a folded configuration.
Figure 7D:
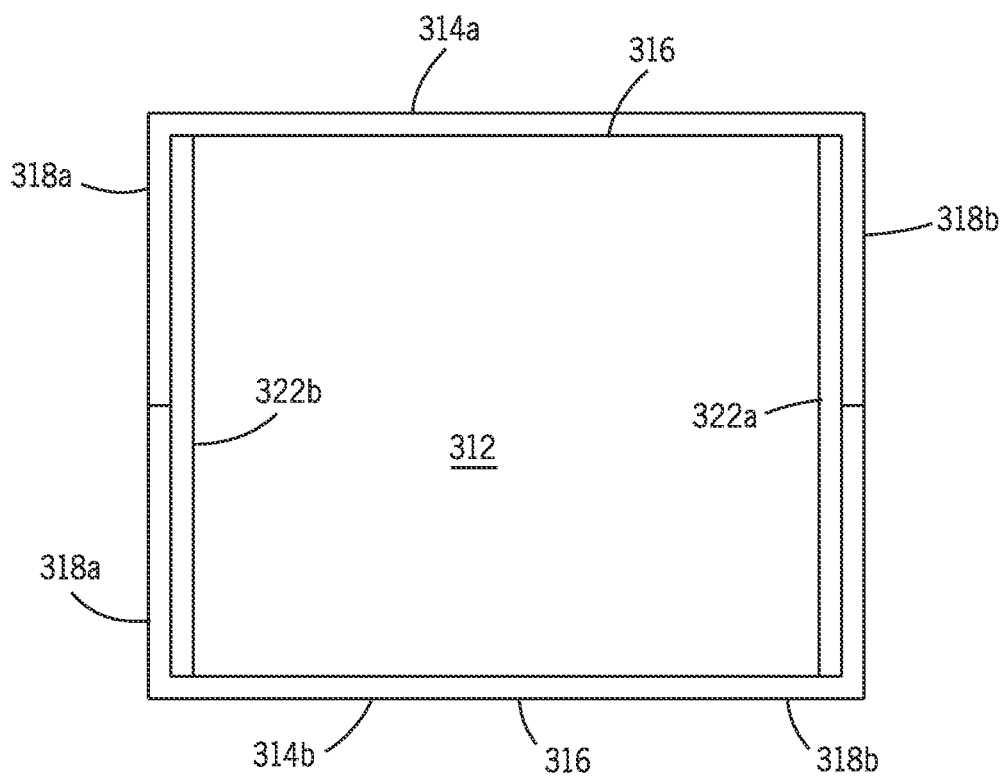
FIG. 7D is a top plan view of the supplemental column support of FIG. 7C.

The support column 108 will now be discussed in more detail. FIGS. 7A and 7B illustrate top plan views of the support column 108 in the unfolded configuration. FIGS. 7C and 7D illustrate various views of the support column 108 in the folded configuration. With reference to FIG. 7A, the support column 108 may be formed as a generally planar member having an interior surface 312 and a plurality of sidewalls 312*a*, 312*b*, 312*c*, 312*d* pivotably connected to a perimeter 320 of the interior surface 312. In one embodiment, two of the sidewalls 312*a*, 312*c* may define edge support structures 314*a*, 314*b* each having a center wall 316 integrally formed with or otherwise connected to the interior surface 312 along a first edge of the perimeter 320. Two edge flaps 318*a*, 318*b* extend from either side of the center wall 316 and have three free edges and a fourth edge that is connected to the center wall 316. This allows the edge flaps 318*a*, 318*b* to pivot along two axes relative to the interior surface 312. In the folded configuration (see FIGS. 7C and 7D), the edge support structures 314*a*, 314*b* define a U-shaped support element as the two flaps 318*a*, 318*b* pivot 90 degrees relative to the center wall 316 and the center wall 316 and the flaps 318*a*, 318*b* are oriented to be perpendicular to the interior surface 312.

In addition to the edge support structures 314*a*, 314*b*, the support column 108 may include one or more flaps 322*a*, 322*b*. The flaps 322*a*, 322*b* are connected to a respective edge of the interior surface 312 and pivot 90 degrees relative to the interior surface 312. The flaps 322*a*, 322*b* are connected only along one edge and have three free edges.

With reference to FIG. 7C, in some embodiments, the support column 108 may include adhesive 330 applied to one or more interior surfaces of the sidewalls 312*a*, 312*b*, 312*c*, 312*d*. For example, one or more adhesive layers may be applied to a substantial portion or the entire surface of the flaps 318*a*, 318*b*. The adhesive layers 330 may be used to secure the flaps 318*a*, 318*b* to the free standing flaps 322*a*, 322*b* to create a column structure that can be inserted into the pallet 100 during the assembly process, discussed in more detail below. The adhesive 330 may be configured similarly to the adhesives 136, 270 discussed above.

Figure 8A:
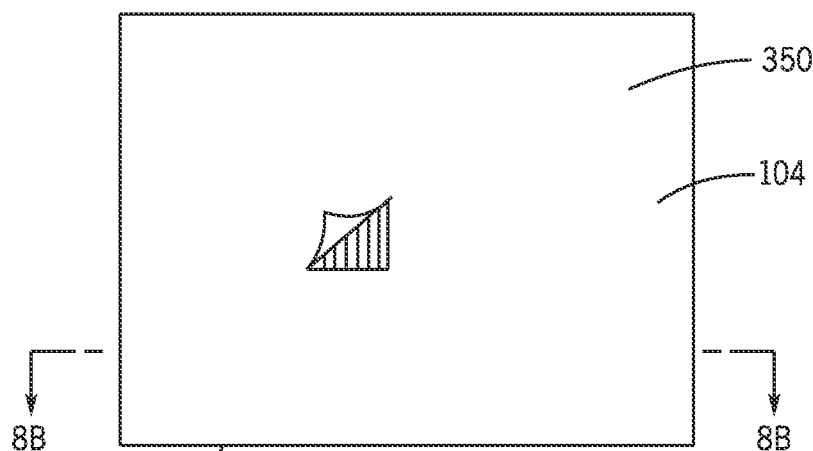
FIG. 8A is a top plan view of a rigid insert for a pallet.
Figure 8B:
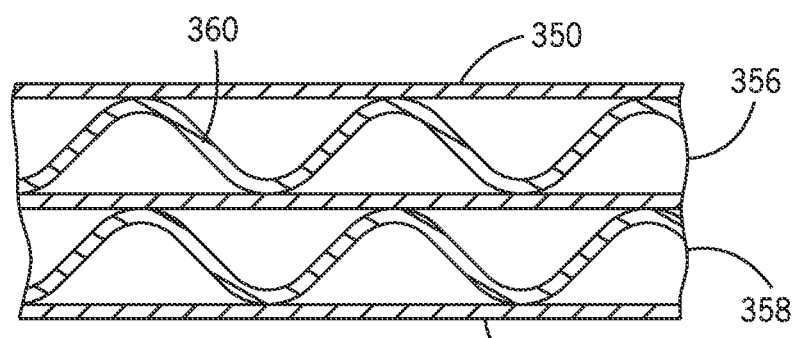
FIG. 8B is a cross section view of the rigid insert of FIG. 8A taken along line 8B-8B in FIG. 8A.
Figure 8C:
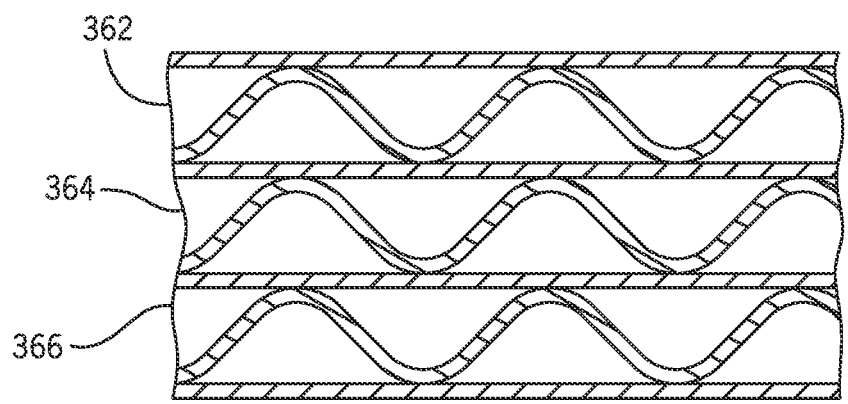
FIG. 8C is a cross section view of another example of a rigid insert.

The rigid member 104 will now be discussed in more detail. FIG. 8A illustrates a top plan view of the rigid member 104. FIG. 8B illustrates an enlarged cross-section of the rigid member 104 taken along line 8B-8B. FIG. 8C illustrates another embodiment of the rigid member. With reference to FIGS. 8A and 8B, the rigid member 104 may be a substantially planar material and may be shaped to correspond generally to the top surface 160 of the top blank 102. In one embodiment, the rigid member 104 is generally rectangular shaped, but other shapes and dimensions are envisioned. The rigid member 104 has a top surface 350 and a bottom surface 352 and optionally may include one or more corrugation or strengthening layers positioned therebetween. For example, with reference to FIG. 8B, in one embodiment, the rigid member 104 includes a first corrugation layer 356 and a second corrugation layer 358 each having corrugation vanes 360 extending parallel to one another. The corrugation vanes 360 provide additional strength and rigidity to the rigid member 104.

In instances where additional strength is desired the rigid member 104 may have additional strengthening layers. For example, in FIG. 8C, the rigid member 104 in this embodiment three strengthening layers 362, 364, 366 connected to one another. Additionally, although the strengthening layers in both FIGS. 8B and 8C are shown with the corrugation vanes running in the same direction, in other embodiments, the strengthening layers may be rotated such that the vanes in the first strengthening layer 356 may run in a first direction and the vanes in the second strengthen layer 358 may be offset or out of phase by approximately 90 degrees relative thereto. Other offset angles may also be used depending on the expected load to be carried by the pallet 100.

While the rigid material 104 may be formed integrally as a single material, in other embodiments, the rigid member 104 includes multiple layers of the same material or layers of different materials coupled together. In one embodiment, the rigid material 104 may include one or more corrugated or cellular materials that are laminated or otherwise connected via an adhesive together. For example, two pieces of double walled corrugated cardboard may be laminated or glued together to define the rigid member. In embodiments where adhesive or lamination is used, the adhesive and lamination may function as a corrugated and/or strengthening layer and further increase the rigidity of the components. The rigid member 104 is typically the same type of material as the top and bottom blanks 102, 106 but is not required to be. For example, in instances where significant additional rigidity is desired, the rigid member 104 may be plastic, metal, one or more alloys of the like.

The rigid member 104 may be coextensive with the upper surface 160 of the top blank 102 or may be differently shaped or sized. For example, the rigid member 104 may be formed as an "X" that extends between the corners and a center area of the top member, but without requiring the same amount of material as when it is formed coextensively with the top surface 160. In another embodiment, the rigid member 104 may be configured to provide discrete or pinpoint type support in desired locations. The rigid member 104 may be formed of the same material as the top or bottom member or may be a different material. For example, the rigid member 104 may be a plastic insert whereas the top and bottom members may be formed from cardboard. As another example, the rigid member may be a metal or alloy and the top and bottom members are formed from plastic or cardboard.

A method to assemble the pallet 100 will now be discussed in more detail. With initial reference to FIG. 2, the overall method flow may generally include assembly or construction of the support column 108 (if included), construction of the bottom blank 106, connection of the rigid member 104 to one of the top blank 102 or the bottom blank 106, and then connecting the top and bottom blanks 102, 106 together. FIGS. 9-14 illustrate an exemplary assembly process for the pallet 100. It should be noted that the operations discussed below may be performed by a user, such as a human, or may be done by a machine.

Figure 9:
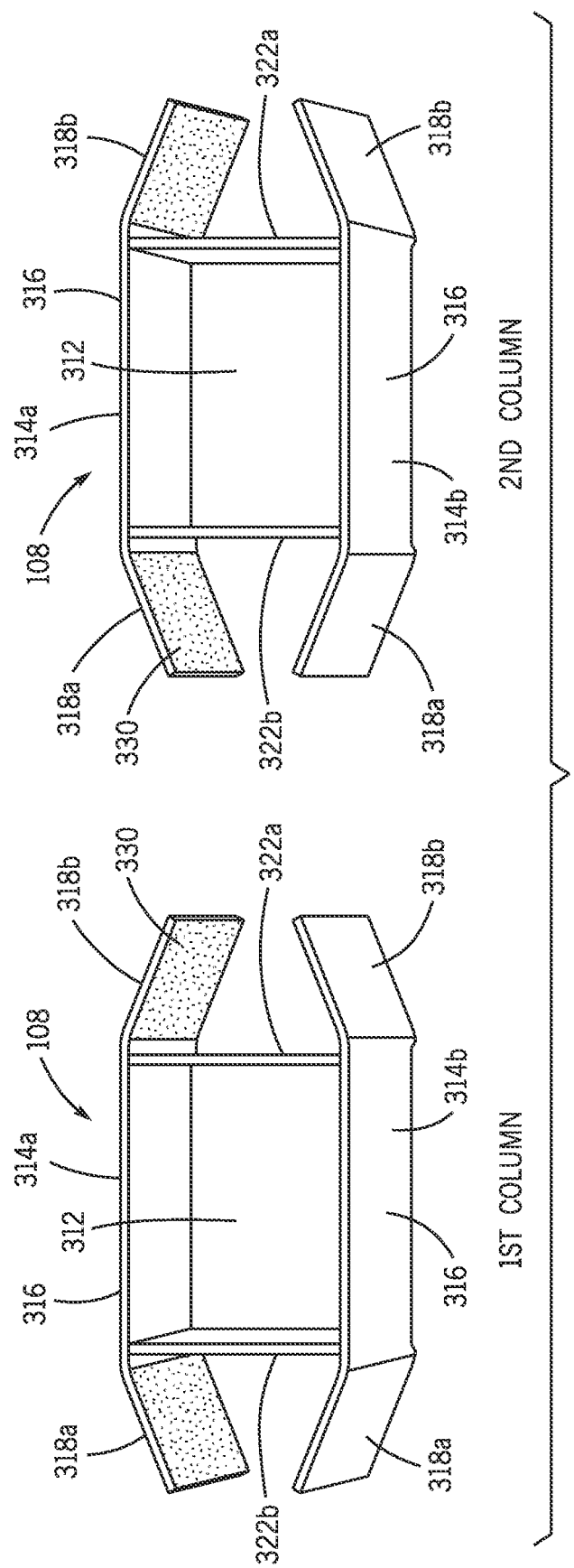
FIG. 9 illustrates an assembly operation for constructing the supplemental column supports for the pallet.

With reference to FIGS. 7B and 9, in some embodiments where accessories or supplemental columns, such as the support column 108, are used, these may be assembled discretely. In one example, two support columns are used and assembled by pivoting the flaps 322*a*, 322*b* 90 degrees relative to the interior surface 312 such that the flaps 322*a*, 322*b* are oriented normal to the interior surface 312. Then, the two edge support structures 314*a*, 314*b* are pivoted into position. Specifically, each center wall 316 is pivoted so as to be perpendicular to the interior surface 312 and positioned at a right angle to the two flaps 322*a*, 322*b*. The rotatable flaps 318*a*, 318*b* of the edge support structures are then pivoted 90 degrees relative to the center wall 316 and aligned to be parallel to the flaps 322*a*, 322*b*. The rotatable flaps 318*a*, 318*b* are secured to the outer surface of the flaps 322*a*, 322*b*. For example, the adhesive 330 on the interior surface of the flaps 318*a*, 318*b* binds the two sets of flaps together. In some embodiments, the adhesive 330 may be positioned on the exterior surface of the free standing flaps 322*a*, 322*b* rather than the interior surface of the edge flaps 318*a*, 318*b*. The adhesive defines a secured connection along the entirety of the interfacing or engaging surfaces between the two flaps 318*a*, 318*b*, 322*a*, 322*b* ensuring a strong connection that will distribute forces across the surfaces, rather than at a single point.

Figure 10:
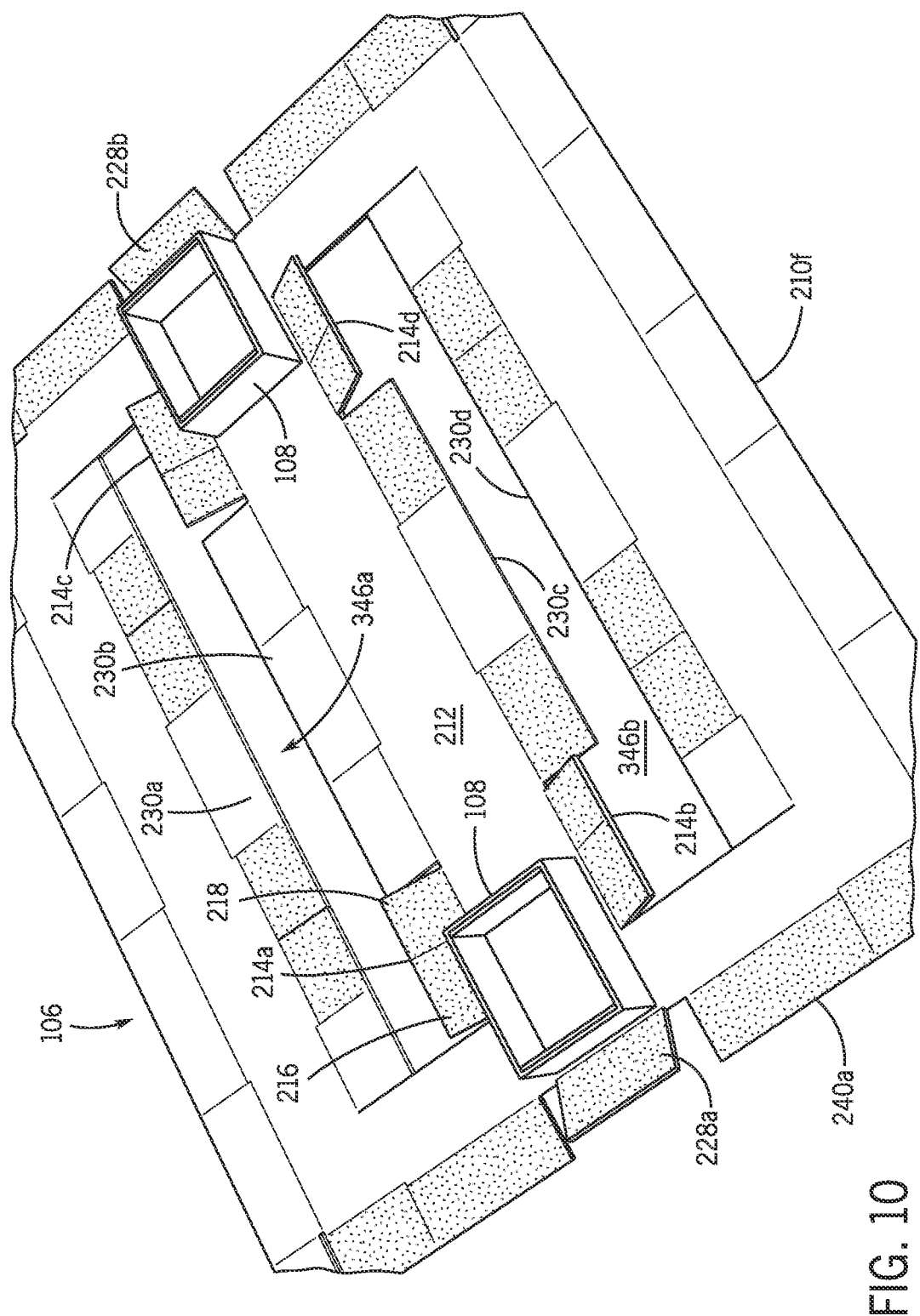
FIGS. 10-14 illustrate various assembly operations for constructing the pallet.

With reference to FIG. 10, the assembled additional support columns, including the support column 108, are positioned on the interior surface 212 of the bottom blank 102. The support column 108 is aligned with the outer flaps 228*a*, 228*b* on the second and fourth edges of the perimeter 220. The outer flaps 228*a*, 228*b* are pivoted upward and, with the adhesive 270 applied to their interior surfaces, are adhered to the outer surfaces of the edge support flaps 318*a* and to both edge supports 314*a*, 314*b* of the support column 108. In this embodiment, the connection defines a triple layer of material, which if the material is dual-vane corrugate, includes six layers of corrugation. The multiple layers enhance the strength and stiffness of the pallet 100.

With continued reference to FIG. 10, the central corner supports 214*a*, 214*b*, 214*c*, 214*d* are pivoted upward relative to the interior surface 212 and connect to the outer surfaces of the support columns, such as the support column 108. In particular, the center wall 216 is connected to the center wall 316 of the edge supports 314*a*, 314*b* and the corner flaps 218 are connected to the other edge flaps 318*b* of both edge supports 314*a*, 314*b*.

Figure 11:
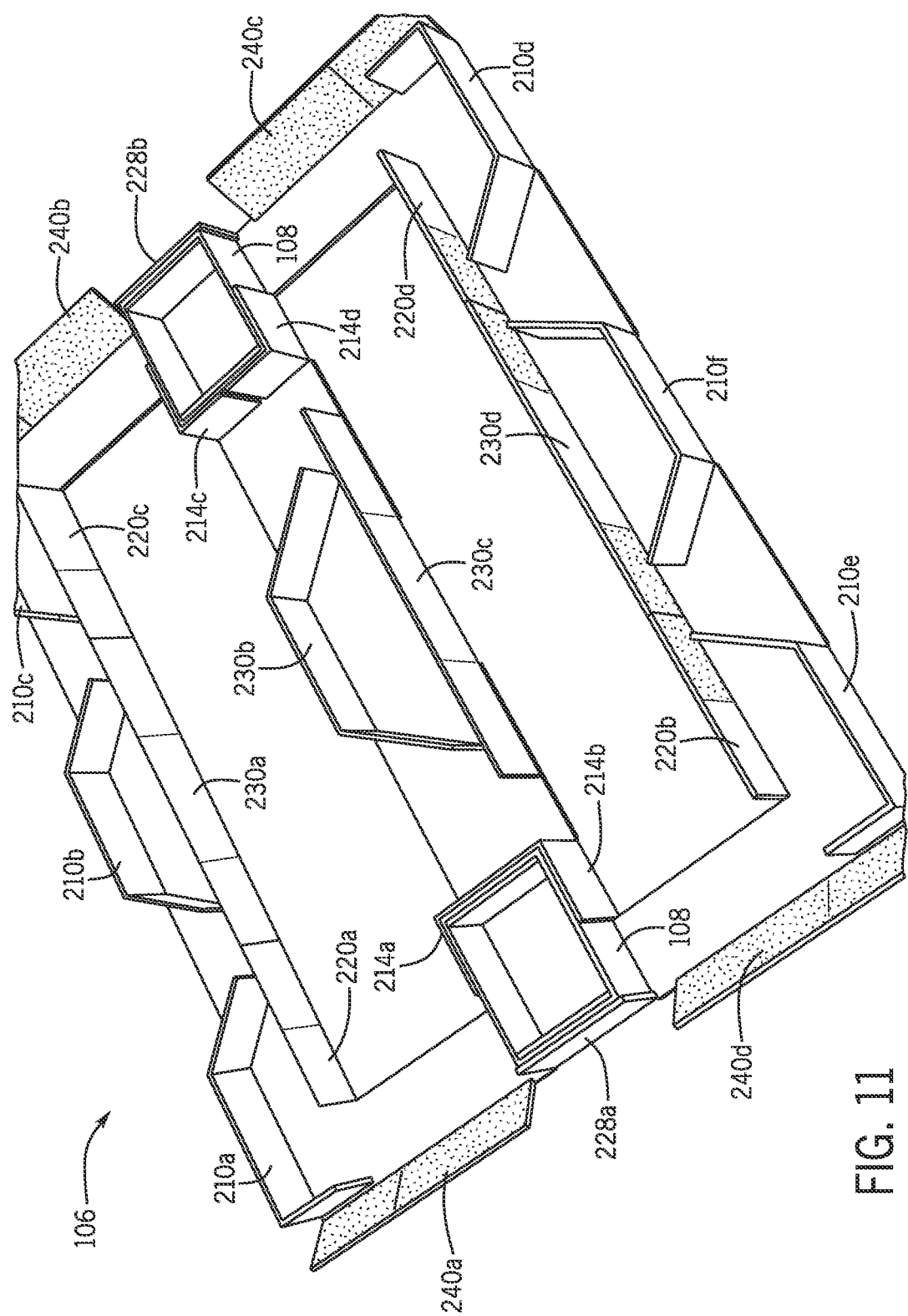
Figure 12:
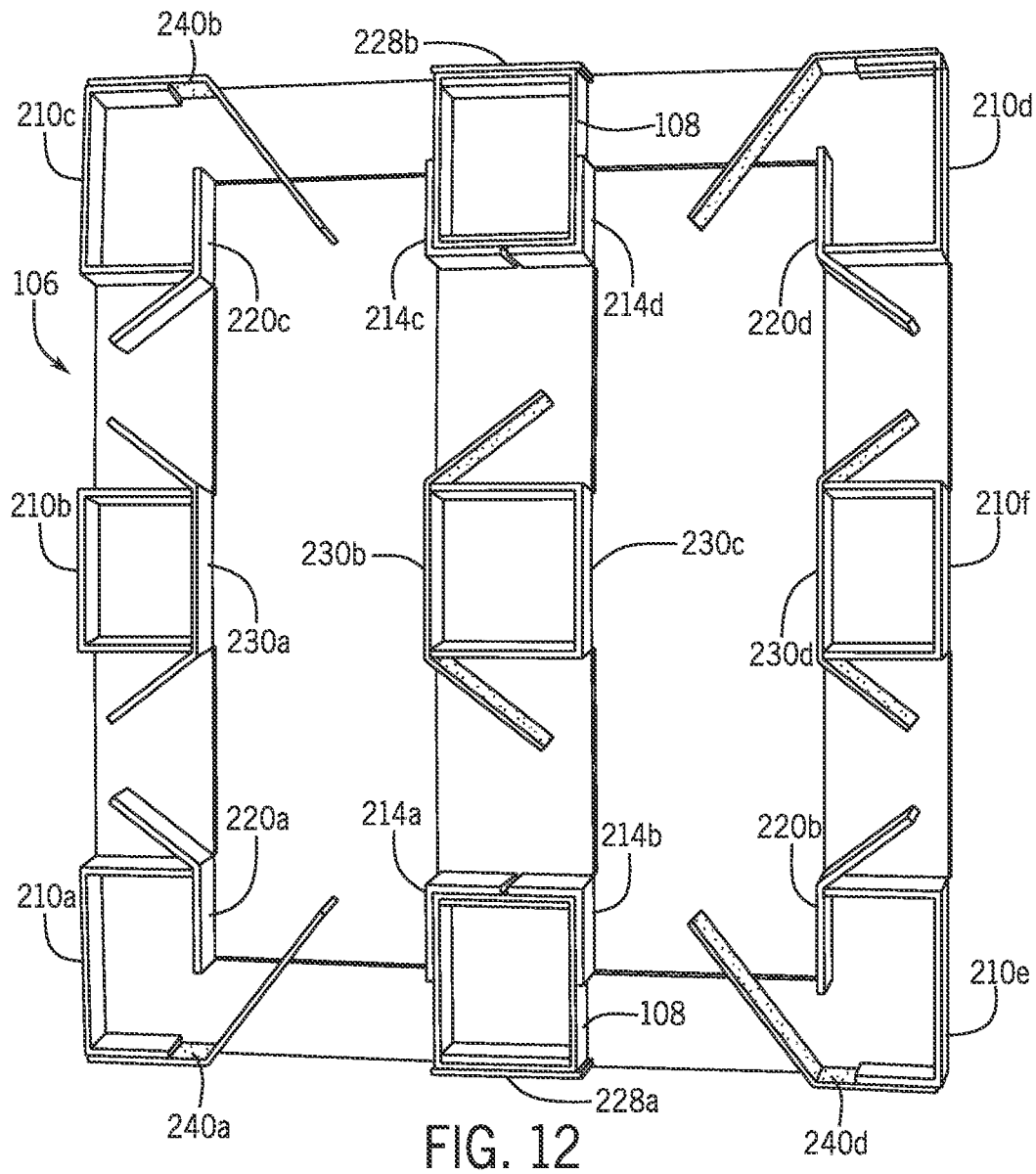
Figure 13A:
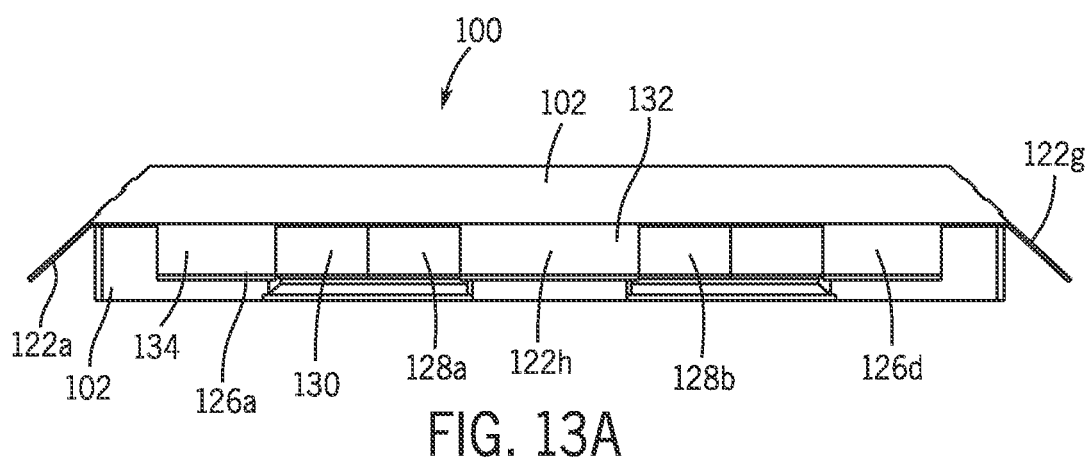
Figure 13B:
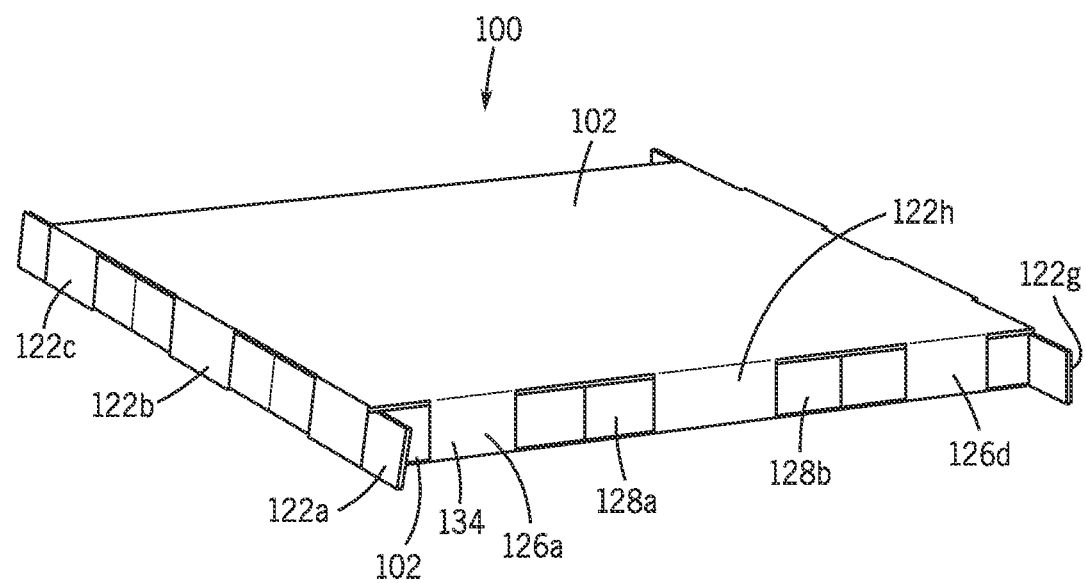
Figure 14:
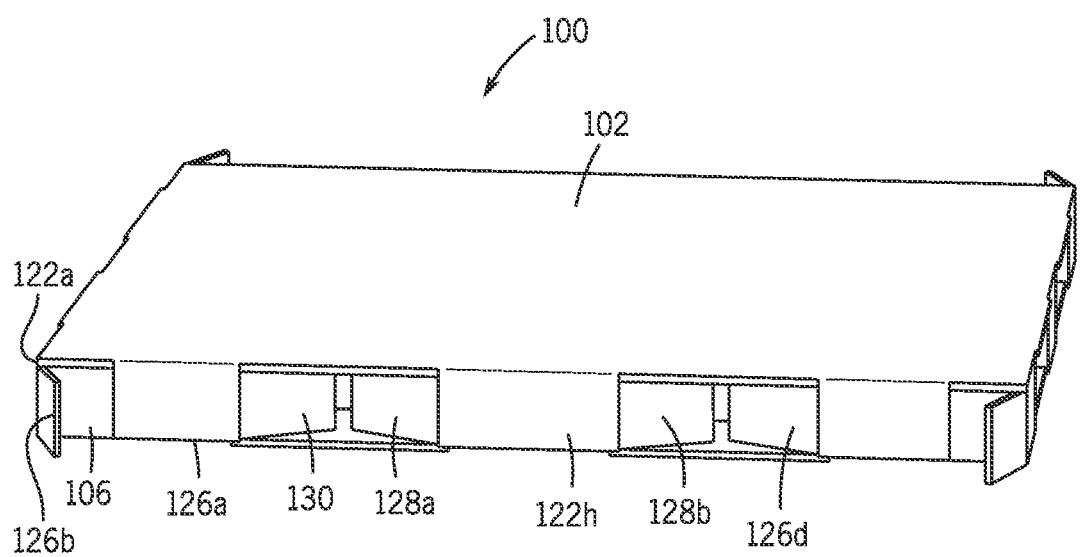

After, as, or before, the additional support columns, such as the support column 108, are secured to the bottom blank 106, the remaining support columns formed by the bottom blank 106 are formed. FIGS. 11 and 12 illustrate the folding process for assembling the bottom blank 106, which may be done automatically by a machine or by a user. With reference to FIGS. 6A, 11, and 12, in one embodiment three centrally aligned support pillars 402, 404, 406 are defined by a combination of U-shaped support structures. For example, the exterior edge supports 210*b*, 210*f* are assembled and connected via adhesive to surfaces of the interior edge supports 230*a*, 230*d*. Similarly, the two of the interior edge supports 230*b*, 230*c* are folded and connected to each other via adhesive. As described above with respect to other connections, the adhesive 270 extends along a substantial portion or the entirety of the interfacing surfaces, generating a strong bond between connecting structures.

With continued reference to FIGS. 6A, 11, and 12, corner pillars 408, 410, 412, 414 are assembled by connecting the remaining exterior edge supports 210*a*, 210*c*, 210*d*, 210*e* to the corner walls 240*a*, 240*b*, 240*c*, 240*d*, as well as to the peripheral corner walls 220*a*, 220*b*, 220*c*, 220*d*. In this manner, the corner pillars 408, 410, 412, 414 are formed by portions of sidewalls on two exterior edges and one interior edge of the bottom blank 106.

With reference to FIG. 2, after the bottom blank 106 has been assembled into the bottom member, the optional rigid member 104 may be positioned on top of the bottom pillars 402, 404, 406, 408, 410, 412, 414. After the rigid member 104 is positioned or in embodiments where the rigid member 104 is omitted, the top blank 102 is positioned over the bottom blank 102. The top blank 102 is then folded and secured to the bottom blank 106. For example, with reference to FIGS. 4, 13, and 14, the sidewalls 114a, 114b, 114c, 114d are pivoted downwards from the top surface 160 and the respective flaps are folded inward toward a center of the top blank 102.

The edge supports 122a, 122b, 122c, 122d, 122e, 122f, 122g, 122h are folded such that the center wall 132 is connected to a corresponding center wall on the bottom blank 106. The flaps 128a, 128b are then pivoted inward and attached to the interior sidewalls of the pillars on the bottom blank 106. The flaps of the top blank 102 are secured via adhesive to the bottom blank 106 and the pallet 100 is assembled.

FIGS. 15-20 illustrate an additional pallet 500 formed from foldable materials, such as corrugated cardboard, paperboard, plastic, or the like. Except as otherwise stated below, the pallet 500 of FIGS. 15-20 is similar to the pallet 100 of FIGS. 1-14. Accordingly, in certain instances, descriptions of like features will not be discussed when they would be apparent to those of skill in the art in light of the description above and in view of FIGS. 15-20. For ease of reference, like structures are represented with appropriately incremented reference numbers.

Figure 15:
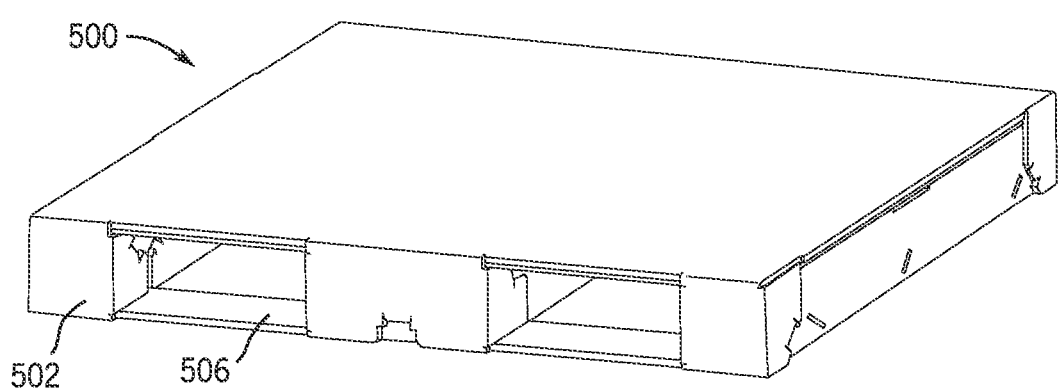
FIG. 15 is a perspective view of an additional pallet.
Figure 16:
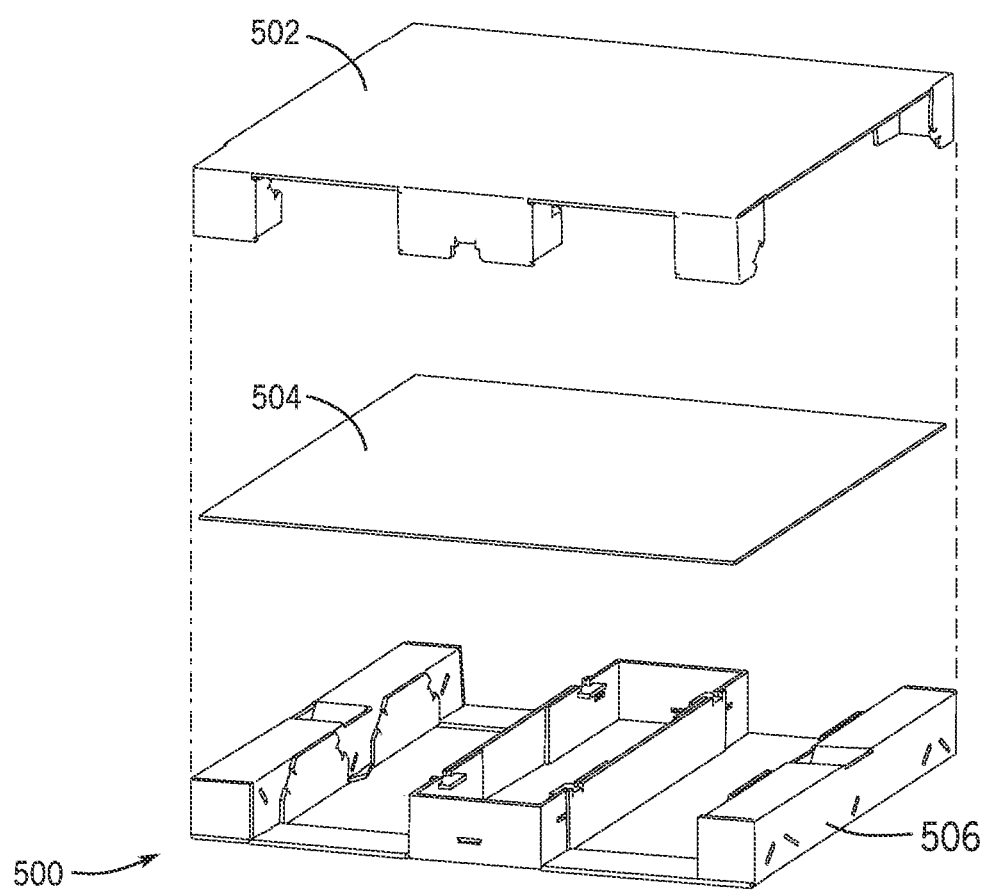
FIG. 16 is a partially exploded view of the pallet of FIG. 15.

Referring to FIGS. 15 and 16, the pallet 500 includes a top member 502 and a bottom member 506 coupled to the top member 502. Similar to the pallet 100 above, the pallet 500 optionally includes a rigid insert 504 coupled between the top and bottom members 502, 506 to increase the rigidity of the pallet 500. The pallet 500 generally includes a top surface 560 and a bottom surface 564 generally parallel to the top surface 560 and spatially separated therefrom by a plurality of sidewalls 561 that extend between the two surfaces 560, 564. The sidewalls 561 often will be configured to define two or more fork apertures 565 on one or more sides of the pallet 500. The fork apertures 565 are sized to receive one or more tines from a pallet fork or other lifting mechanism and may be varied accordingly. To that end, while the pallet 500 shown in FIGS. 15-20 includes fork apertures 565 on only two opposing sides, in some embodiments, the pallet 500 may include fork apertures 565 only on one side or on each side of the pallet 500. In this manner, one or more of the sidewalls 561 may be uninterrupted and extend an entire length of the pallet 500. Similarly, in instances where the pallet 500 may not be used as a pallet, the fork apertures 565 may be omitted and each of the sidewalls 561 may extend along the entire length of the pallet 500. The various components of the pallet 500 will be discussed in detail below, though it should be noted that the below examples are meant as exemplary only.

Figure 17:
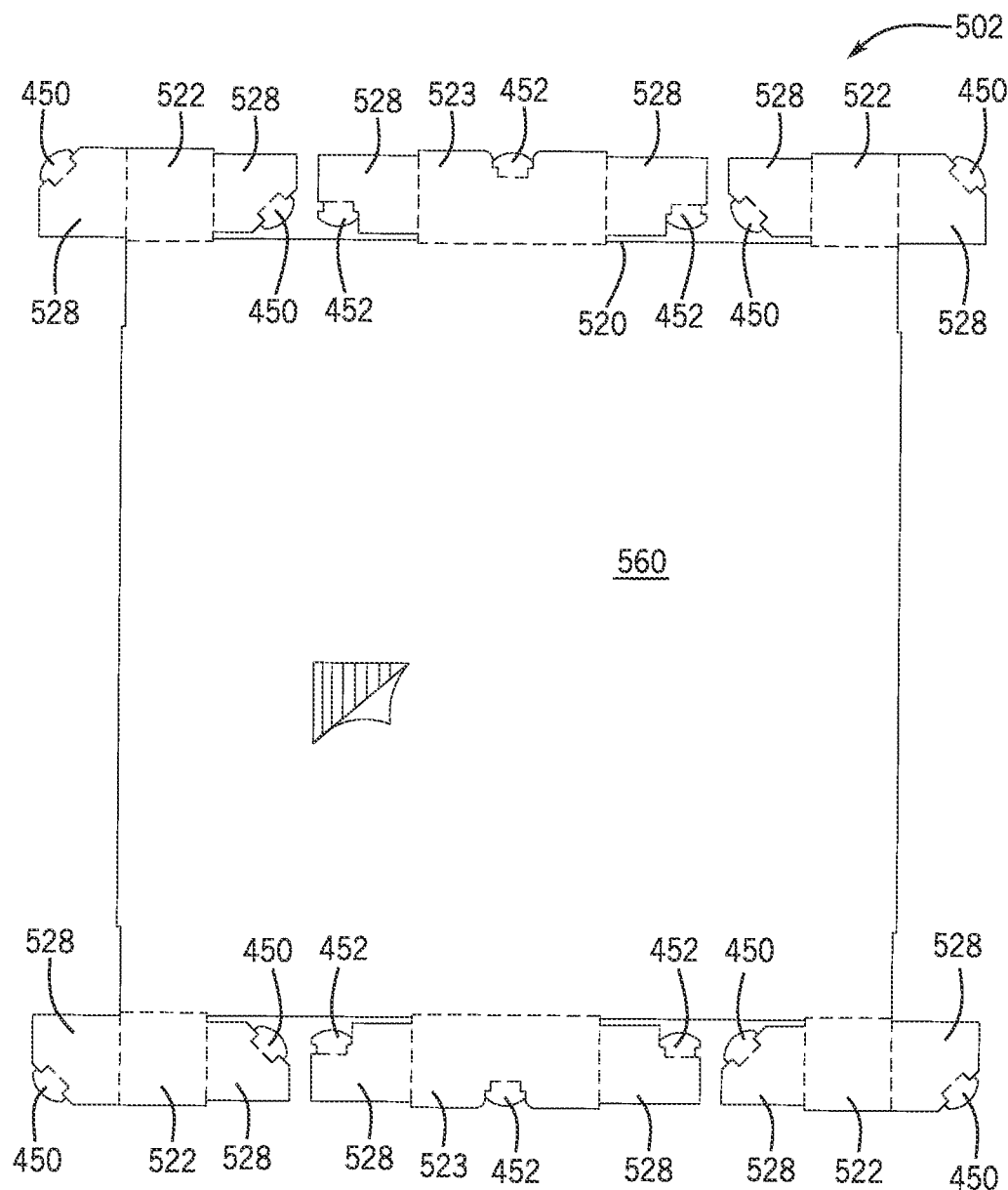
FIG. 17 is a plan view of a top blank of the pallet of FIG. 15 in an unfolded configuration.
Figure 18:
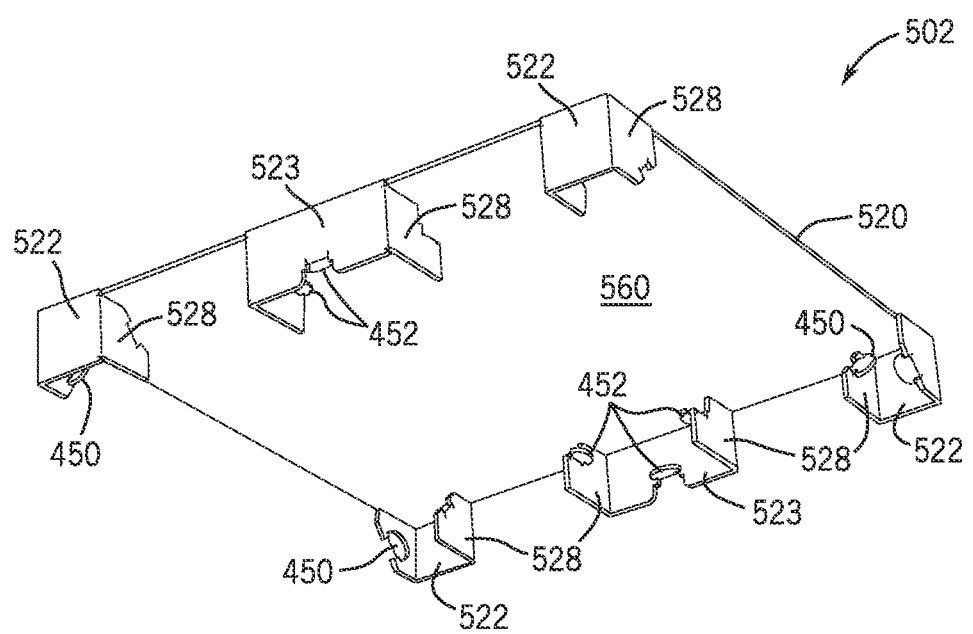
FIG. 18 is a bottom perspective view of the top blank of FIG. 17 in a folded configuration.

FIG. 17 illustrates the top member 502 in blank form prior to being folded or assembled. FIG. 18 illustrates the top member 502 in a folded configuration. As shown, the top member 502 may be manufactured with a plurality of fold lines, cut lines, tabs, slots, slits, flanges, cutouts, and/or other predefined locations of weakness operable to facilitate assembly, discussed in more detail below. As shown in FIGS. 17 and 18, the perimeter of the top surface 560 is defined by a perimeter edge 520, which also defines the edge of the top member 502 in a folded configuration. A number of edge supports (e.g., corner edge supports 522 and center edge supports 523) are pivotably connected around the perimeter edge 520. As will be discussed in more detail below, the edge supports 522, 523 are folded perpendicularly relative to the top surface 560 to define various elements of the pallet 500, such as the sidewalls 561. Each edge support is rotatable about fold or pivot lines. The fold lines extend parallel to the perimeter edge 520 such that when the edge supports 522, 523 are folded, they fold downward with respect to the top surface 560 to be angled perpendicularly relative to the top surface 560.

In the embodiment of FIGS. 17 and 18, the top member 502 includes a corner edge support 522 positioned at each corner of the top surface 560 (e.g., four corner edge supports 522). Each corner edge support 522 includes opposing rotatable flaps 528 pivotably connected to opposing sides of the respective corner edge support 522. For example, the rotatable flaps 528 may rotate relative to their associated corner edge support 522 via fold lines such that the rotatable flaps 528 extend at an angle to the corner edge supports 522 (e.g., perpendicularly). Each rotatable flap 528 includes a locking feature 450, such as mushroom-shaped tab structures, that is separately rotatable from the rotatable flap 528 and are configured to secure the corner edge supports 522 to the bottom member 506, as discussed in detail below. The location and shape of the locking features 450 may be varied as desired based on the locking requirements of the pallet 500.

With continued reference to FIGS. 17 and 18, the top member 502 also includes center edge supports 523 positioned on opposing edges of the top surface 560. As shown, the center edge supports 523 are positioned between the corner edge supports 522 on the opposing edges and are generally aligned with a center area or midway point of the opposing edges. The center edge supports 523 are foldable along fold lines relative to the top surface 560 and rotate downwardly to a perpendicular orientation relative to the top surface 560. Additionally, each of the center edge supports 523 includes two rotatable flaps 528 extending laterally from opposing sides of the center edge support 523, such as toward the corner edge supports 522 positioned adjacent to the center edge support 523. Each rotatable flap 528 is foldable relative to the center edge support 523 and rotates inwardly to a generally perpendicular orientation relative to the center edge support 523. Each rotatable flap 528 and center edge support 523 includes locking features 452 similar to the locking features 450 discussed above to secure the center edge support 523 and rotatable flaps 528 to the bottom member 506.

Figure 19:
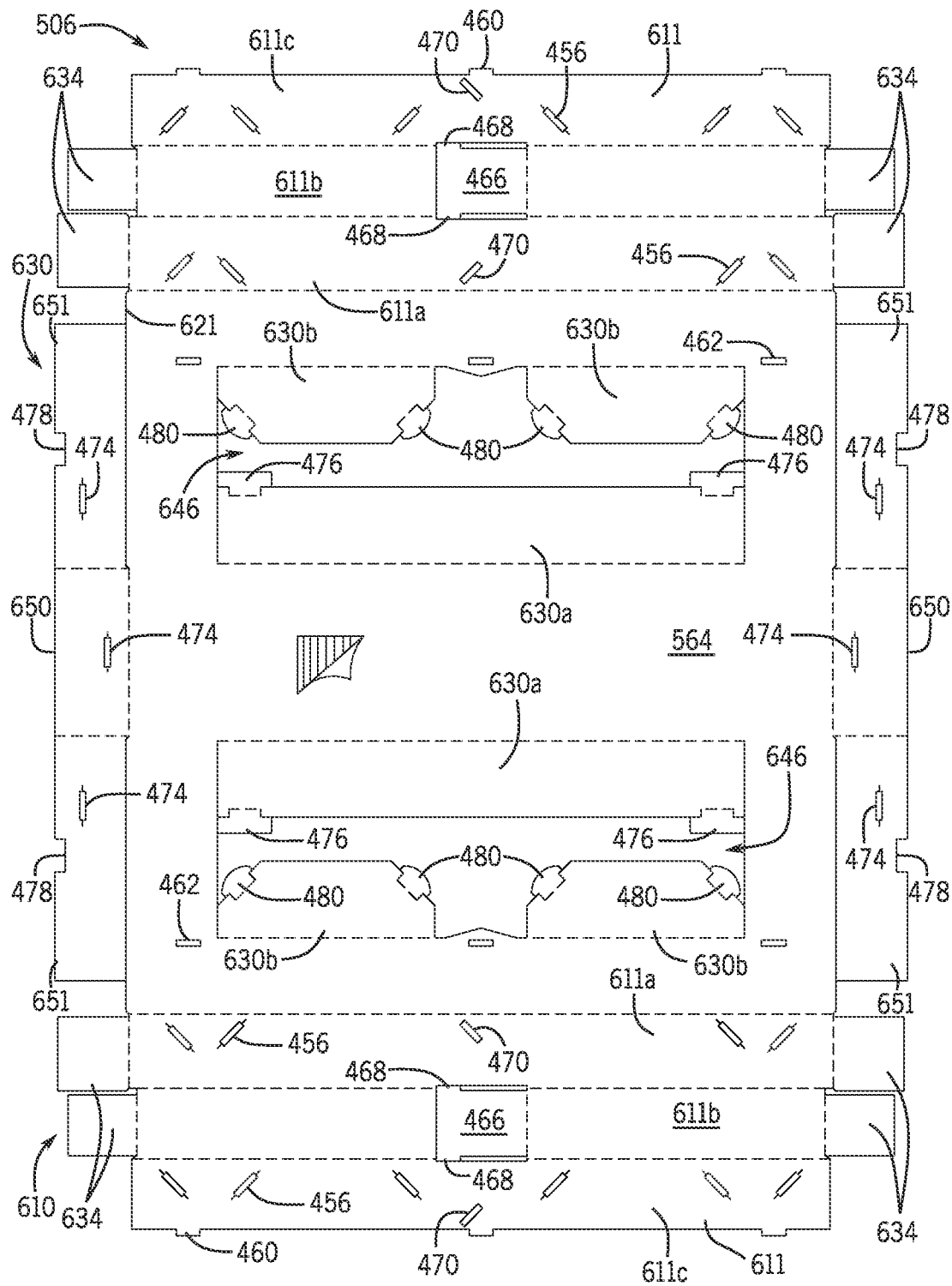
FIG. 19 is a plan view of a bottom blank of the pallet of FIG. 15 in an unfolded configuration.
Figure 20:
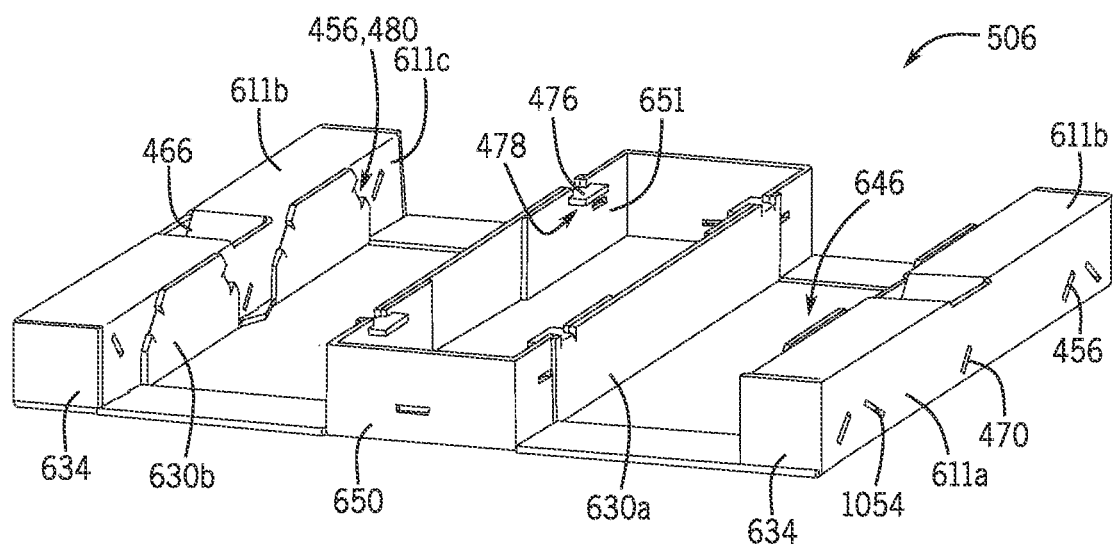
FIG. 20 is a top perspective view of the bottom blank of FIG. 19 in a folded configuration.

FIG. 19 illustrates the bottom member 506 in blank form before being folded or assembled. FIG. 20 illustrates the bottom member 506 in a folded configuration. As with the top member 502, the bottom member 506 is initially formed as a planar material having various cutouts and perforations to allow the planar material to be folded in a variety of manners to define the sidewalls 561, support structures, and locking features for connecting to the top member 502. The bottom member 506 may be manufactured with a plurality of fold lines, cut lines, tabs, slots, slits, flanges, cutouts, and/or other predefined locations of weakness operable to facilitate assembly, discussed in more detail below.

As illustrated in FIGS. 19 and 20, the perimeter of the bottom surface 564 is defined by an perimeter edge 621, which also defines the edge of the bottom member 506 in a folded configuration. Extending from the perimeter edge 621 is a plurality of edge supports 610 that are rotatable relative to the bottom surface 564. In the embodiments shown in FIGS. 19 and 20, the edge supports 610 rotate upward relative to the bottom surface 564 to be orientated generally perpendicularly relative to the bottom surface 564 and are used to define the structural and connection features for the pallet 500. The configuration of the edge supports 610 can be varied to increase or decrease the length of the sidewalls 561, the shapes of the support columns, and so on.

As an example of the edge supports 610, FIGS. 19 and 20 illustrate the bottom member 506 including wall supports 611 pivotably connected to opposing edges of the perimeter edge 621. Each wall support 611 rotates relative to the bottom surface 564 via one or more fold lines. In one embodiment, each wall support 611 includes a plurality of flap members (e.g., a first flap member 611a, a second flap member 611b, and a third flap member 611c) pivotably connected together. In such embodiments, the first flap member 611a may be pivotably coupled to the perimeter edge 621 of the bottom surface 564, the second flap member 611b may be pivotably coupled to the first flap member 611a, and the third flap member 611c may be pivotably coupled to the second flap member 611b. For example, the first flap member 611a may be a rectangular flap including opposing first and second edges. Similarly, the second flap member 611b may be a rectangular flap including opposing first and second edges. The third flap member 611c may be similarly configured to include opposing first and second edges.

In such embodiments, the first edge of the first flap member 611a is pivotably coupled to the perimeter edge 621 of the bottom member 506 along a first fold line, the first edge of the second flap member 611b is pivotably coupled to the second edge of the first flap member 611a along a second fold line, and the first edge of the third flap member 611c is pivotably coupled to the second edge of the second flap member 611b along a third fold line. The first flap member 611a may rotate about the first fold line relative to the bottom surface 564 such that the first flap member 611a extends at an angle to the bottom surface 564 (e.g., perpendicularly). The second flap member 611b may rotate about the second fold line relative to the first flap member 611a such that the second flap member 611b extends at an angle to the first flap member 611a (e.g., perpendicularly). The third flap member 611c may rotate about the third fold line relative to the second flap member 611b such that the third flap member 611c extends at an angle to the second flap member 611b (e.g., perpendicularly). In this manner, once folded the first, second, and third flap members 611a, 611b, 611c may define a support structure along a length (e.g., the entire length) of the edge of the bottom member 506 and in the shape of a hollow prism, such as a hollow rectangular prism.

As shown in FIGS. 19 and 20, a plurality of locking receptacles 456 are defined in the first and third flap members 611a, 611c to secure other components of the bottom member 506 to the wall supports 611, as described below, as well as to secure the bottom member 506 to other components or elements, such as to at least the top member 502. For example, locking receptacles 456 may be defined in the first and third flap members 611a, 611c to at least partially receive the locking features 450 defined on the corner edge supports 522 of the top member 502 to secure the top and bottom members 502, 506 together.

In some embodiments, the third flap member 611c may be arranged to interlock with the bottom surface 564 to define the folded configuration of the wall supports 611. For instance, a plurality of tabs 460 (e.g., three tabs 460) may extend from the second edge of the third flap member 611c to engage corresponding structure defined in the bottom surface 564. In one embodiment, a corresponding number of receptacles or slots 462 may be defined in the bottom surface 564 to at least partially receive the tabs 460. In such embodiments, each wall support 611 may be folded as discussed above and the tabs 460 received within the slots 462 to define the shape of the support structure as well as provide lateral stability to the wall support 611.

In some embodiments, each wall support 611 may include additional elements to increase the lateral stability of the wall supports 611 once folded. For example, a plurality of wings 634 may extend laterally from at least one of the first, second, and third flap members 611a, 611b, 611c (e.g., from each of the first and second flap members 611a, 611b). In such embodiments, the wings 634 may be secured to surrounding structure once the wall supports 611 are folded to define the support structures. For instance, in embodiments where wings 634 extend laterally from each of the first and second flap members 611a, 611b, the wings 634 extending from the first flap member 611a and the wings 634 extending from the second flap member 611b may be rotated to abuttingly face each other once the wall supports 611 are folded into position. In such embodiments, the wings 634 extending from the first flap member 611a may be secured to the wings 634 extending from the second flap member 611b, such as via adhesive, fasteners, or interlocking structures, among others.

Additionally or alternatively, a support flap 466 may be defined within the interior of one of the first, second, and third flap members 611a, 611b, 611c (e.g., within the interior of the second flap member 611b) to interlock with the other flap members. As shown, the support flap 466 is pivotably connected to the second flap member 611b. Once the first, second, and third flap members 611a, 611b, 611c are folded into position, the support flap 466 may be folded to within the interior space of the wall support 611 and secured to adjacent flap members. For instance, a pair of locking tabs 468 may extend laterally away from each other, such as at a distal end of the support flap 466. In such embodiments, corresponding locking slots 470 may be defined in the first and third flap members 611a, 611c to at least partially receive the locking tabs 468 therein. As described herein, the wings 634 and/or the support flap 466 may limit lateral shifting of the wall supports 611 to support a load thereon.

With continued reference to FIGS. 19 and 20, the bottom member 506 also includes two middle edge supports 650 positioned on the remaining opposing edges of the bottom surface 564. The middle edge supports 650 are aligned with each other and generally aligned with a center area or midway point of the remaining opposing edges. The middle edge supports 650 are foldable along fold lines relative to the bottom surface 564 and rotate upwardly to a perpendicular orientation relative to the bottom surface 564. Additionally, each middle edge support 650 includes two wings 651 extending laterally away from opposing sides of the middle edge support 650. Each wing 651 is foldable relative to the middle edge support 650 and rotates inwardly to a generally perpendicular orientation relative to the middle edge support 650. To further secure the top and bottom members 502, 506 together, each wing 651 and middle edge support 650 includes a locking receptacle 474 defined therein to at least partially receive the locking features 452 of the center edge supports 523 of the top member 502 to secure the top and bottom members 502, 506 together.

In some embodiments, the bottom member 506 may include a plurality of interior edge supports 630 that are used, either alone or in combination with the edge supports 610 positioned around the perimeter edge 621 of the bottom surface 564, to define interior structural supports for the pallet 500. For example, and without limitation, the bottom member 506 may include two interior apertures 646 cut through the bottom surface 564. The interior apertures 646 are typically formed during a cutting process and are sections of material removed from the bottom blank during formation. In the embodiments shown in FIGS. 19 and 20, the interior apertures 646 are substantially rectangular-shaped apertures, though the apertures 646 may be configured differently depending on the particular application.

In one embodiment, the bottom member 506 may include a plurality of inner interior edge supports 630*a* (e.g., two inner interior edge supports 630*a*) and a plurality of outer interior edge supports 630*b* (e.g., four outer interior edge supports 630*b*) pivotably connected along a boundary edge surrounding the interior apertures 646. The inner and outer interior edge supports 630*a*, 630*b* are rotatable relative to the bottom surface 564 along the boundary edge and rotate upwardly relative to the bottom surface 564. As explained below, the inner and outer interior edge supports 630*a*, 630*b* are configured to engage other components of the bottom member 506 to define the structural supports of the pallet 500.

Each inner interior edge support 630*a* may be rectangular shaped and may include a plurality of locking tabs pivotably connected thereto. For example, a pair of T-shaped locking tabs 476 may be pivotably connected to an edge of the inner interior edge support 630*a* opposite the edge of the inner interior edge support 630*a* pivotably attached to the boundary edge surrounding the interior apertures 646. In such embodiments, the T-shape locking tabs 476 may fold relative to the inner interior edge supports 630*a* to engage the wings 651 of the middle edge supports 650. For example, as shown in FIGS. 19 and 20, each wing 651 of the middle edge support 650 may include a slot 478 defined on a top edge thereof, the slots 478 arranged to receive at least a portion of the T-shaped locking tabs 476 of the inner interior edge supports 630*a*.

Each outer interior edge support 630*b* may be configured to interlock with the wall supports 611 in a folded configuration. For instance, each outer interior edge support 630*b* may include one or more locking features 480, such as one or more mushroom-shaped tab structures, that are separately rotatably from the outer interior edge support 630*b*. To secure the outer interior edge supports 630*b* to the wall supports 611, the locking features 480 of the outer interior edge supports 630*b* may be at least partially received within the locking receptacles 456 defined in the third flap member 611*c* of each wall support 611.

Though the various components of the top and bottom members 502, 506 have been described as interlocking together, the locking features and receptacles (e.g., the locking features 450, 452, 480 and locking receptacles 456, 474) may be omitted and the various components may be secured together via alternative means, such as via adhesive. For example, portions of the edge supports 522 and 523 of the top member 502 may be adhesively secured to the edge supports 610 of the bottom member 506.

Figure 21:
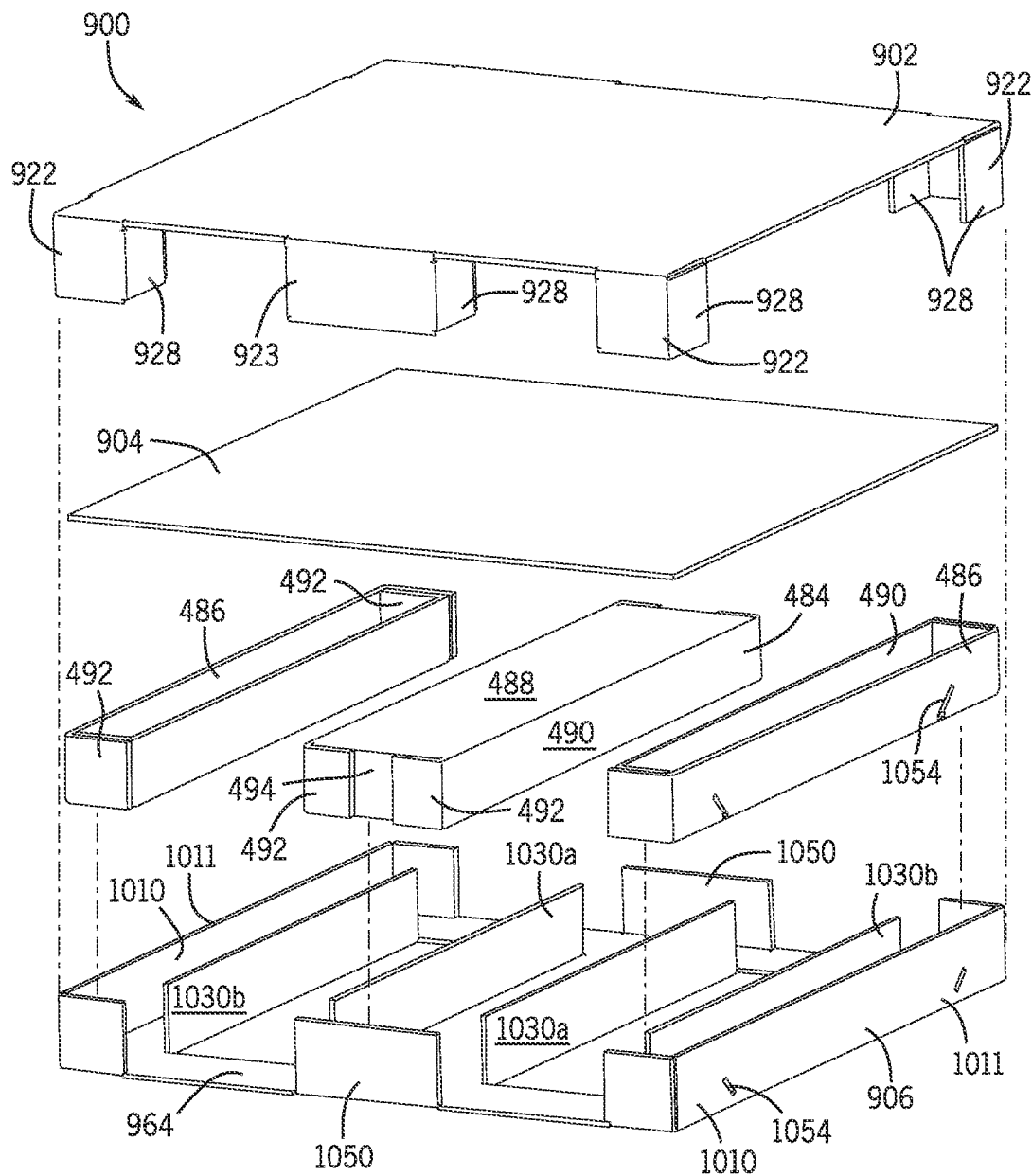
FIG. 21 is a partially exploded view of an additional pallet.
Figure 22:
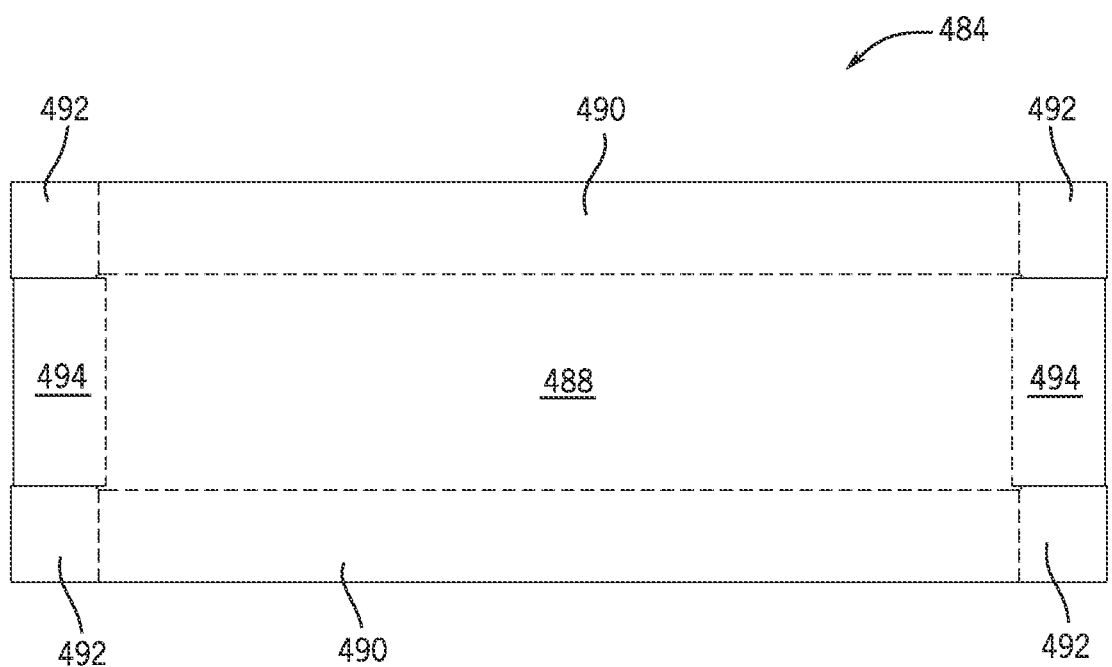
FIG. 22 is a plan view of a middle insert of the pallet of FIG. 21.
Figure 23:
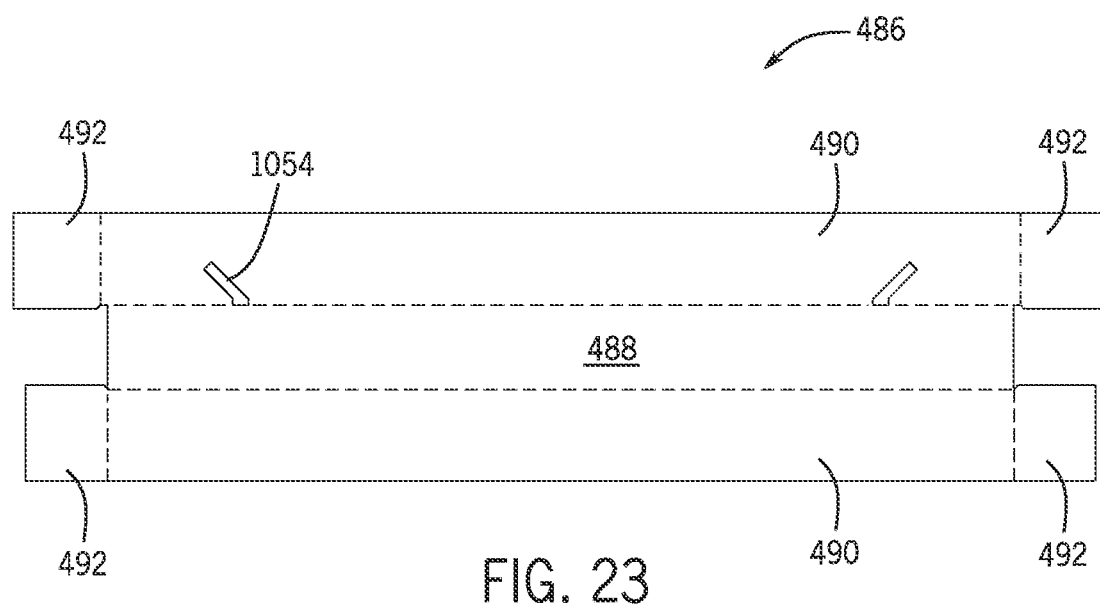
FIG. 23 is a plan view of a side insert of the pallet of FIG. 21.

FIGS. 21-23 illustrate an additional pallet 900 where the structural and connection features are secured together via adhesive. Except as otherwise stated below, the pallet 900 of FIGS. 21-23 is similar to the pallet 500 of FIGS. 15-20 and thus, like features will not be described when they would be apparent to those of skill in the art in light of the description above and in view of FIGS. 21-23.

As shown in FIG. 21, the pallet 900 includes a plurality of structural inserts configured to be adhesively secured to the edge supports 922, 923, 1010 of the top and bottom members 902, 906. For example, the pallet 900 may include a middle insert 484 configured to be adhesively secured to the middle edge supports 1050 and the inner interior edge supports 1030*a* of the bottom member 906 as well as the center edge supports 923 of the top member 902. Similarly, the pallet 900 may include one or more side inserts 486 configured to be adhesively secured to the wall supports 1011 and the outer interior edge supports 1030*b* of the bottom member 906 as well as the corner edge supports 922 of the top member 902. The middle and side inserts 484, 486 will be discussed in detail below.

Referring to FIGS. 21 and 22, the middle insert 484 may include a center flap 488 and a pair of side flaps 490 foldably connected to opposing sides of the center flap 488. The side flaps 490 are foldable along fold lines relative to the center flap 488 and rotate to a generally perpendicular orientation relative to the center flap 488. Each of the center flap 488 and side flaps 490 may include a pair of panels 494, 492 extending from opposing ends of the respective flap. In such embodiments, the panels 492 are foldable relative to the side flap 490 and rotate to a generally perpendicular orientation relative to the side flap 490. Similarly, the panels 494 are foldable relative to the center flap 488 and rotate to a generally perpendicular orientation relative to the center flap 488. Once the various elements of the middle insert 484 are folded, the panels 492 of the side flaps 490 may be positioned in an abutting facing relationship with the panels 494 of the center flap 488. To provide a degree of lateral stability to the middle insert 484, the panels 492, 494 may be adhesively secured together. Each side insert 486 may be arranged similarly to the middle insert 484. In some embodiments, the panels 494 extending from the center flap 488 of the side inserts 486 may be omitted (see FIG. 23).

Referring to FIG. 21, the structural inserts may be positioned against the bottom member 906. For instance, the middle insert 484 may be positioned to extend between the middle edge supports 1050 of the bottom member 906. In like manner, each side insert 486 may be positioned to extend along an edge of the bottom surface 964, such as between opposing corner edge supports 922 of the top blank 902 when the pallet 900 is assembled. Once positioned, the middle and side inserts 484, 486 may be adhesively secured to the bottom member 906. For example, and without limitation, the middle edge supports 1050 and the inner interior edge supports 1030*a* may be adhesively secured to the panels 492 and side flaps 490 of the middle insert 484, respectively. Additionally or alternatively, the wall supports 1011 and the outer interior edge supports 1030*b* may be adhesively secured to the side flaps 490 of the side inserts 486.

With continued reference to FIG. 21, the top member 902 may be adhesively secured to the edge supports 1010 of the bottom member 906, such as to the wall supports 1011, and/or to the middle and side inserts 484, 486. For example, to secure the top member 902 to the bottom member 906, the corner edge supports 922 and their associated rotatable flaps 928 may be adhesively secured to the wall supports 1011 of the bottom blank 906 and/or to at least a portion of the side inserts 486 (such as to a portion of the side flaps 490). For example, the corner edge supports 922 (e.g., the rotatable flaps 923 of the corner edge supports 922) may be adhesively secured to at least a portion of the side inserts 486, such as to at least a portion of the side flaps 490 of the side inserts 486. In like manner, the center edge supports 923 and their associated rotatable flaps 928 may be adhesively secured to additional edge supports of the bottom blank 906, such as to the middle edge supports 1050 and/or to the inner interior edge supports 1030*a* of the bottom blank 906. In some embodiments, the center edge supports 923 (e.g., the rotatable flaps 928 of the center edge supports 923) may be adhesively secured to at least a portion of the middle insert 484, such as to at least a portion of the side flaps 490 of the middle insert 484.

Figure 24:
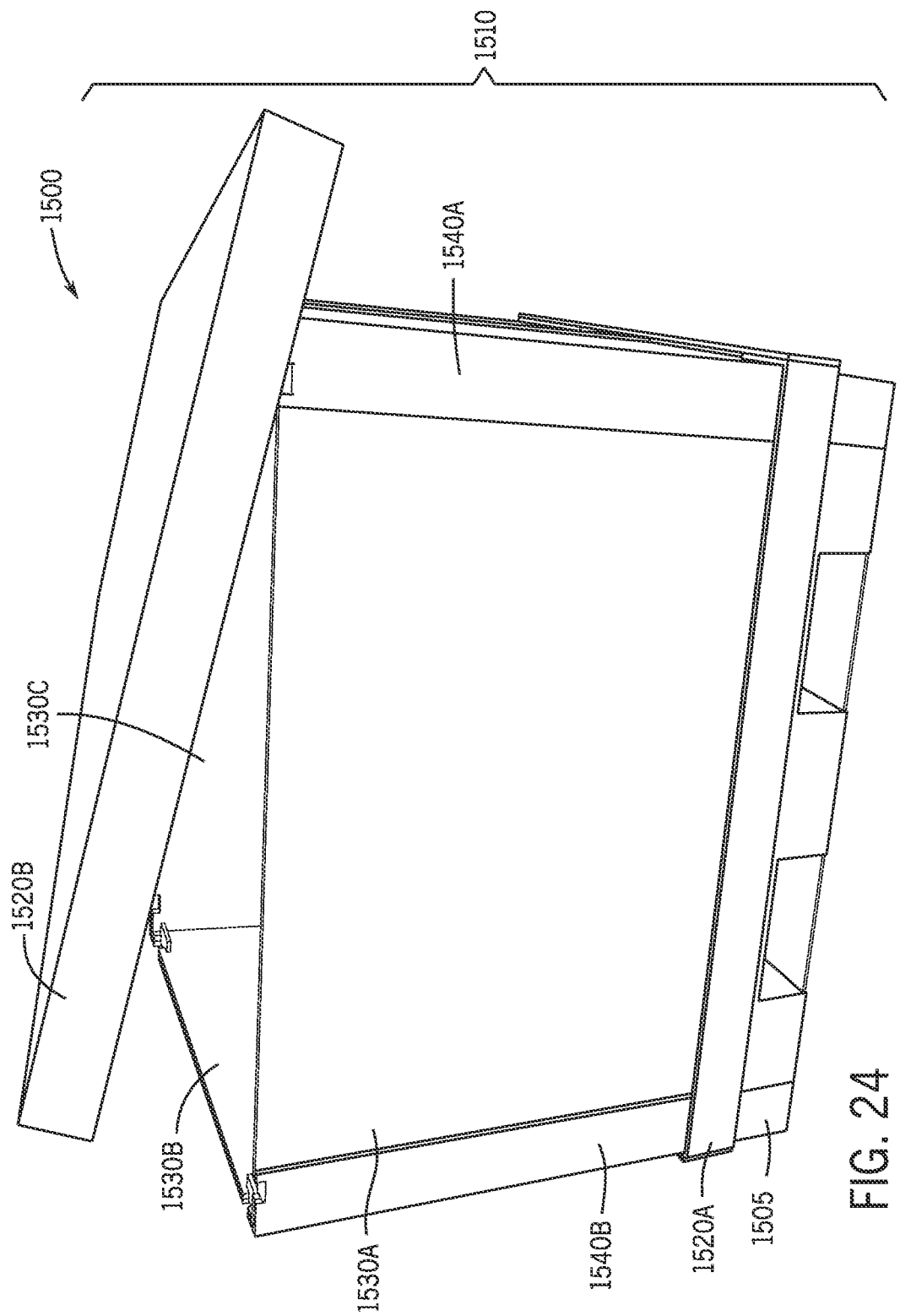
FIG. 24 illustrates a perspective view of a packaging system in an expanded state.
Figure 25:
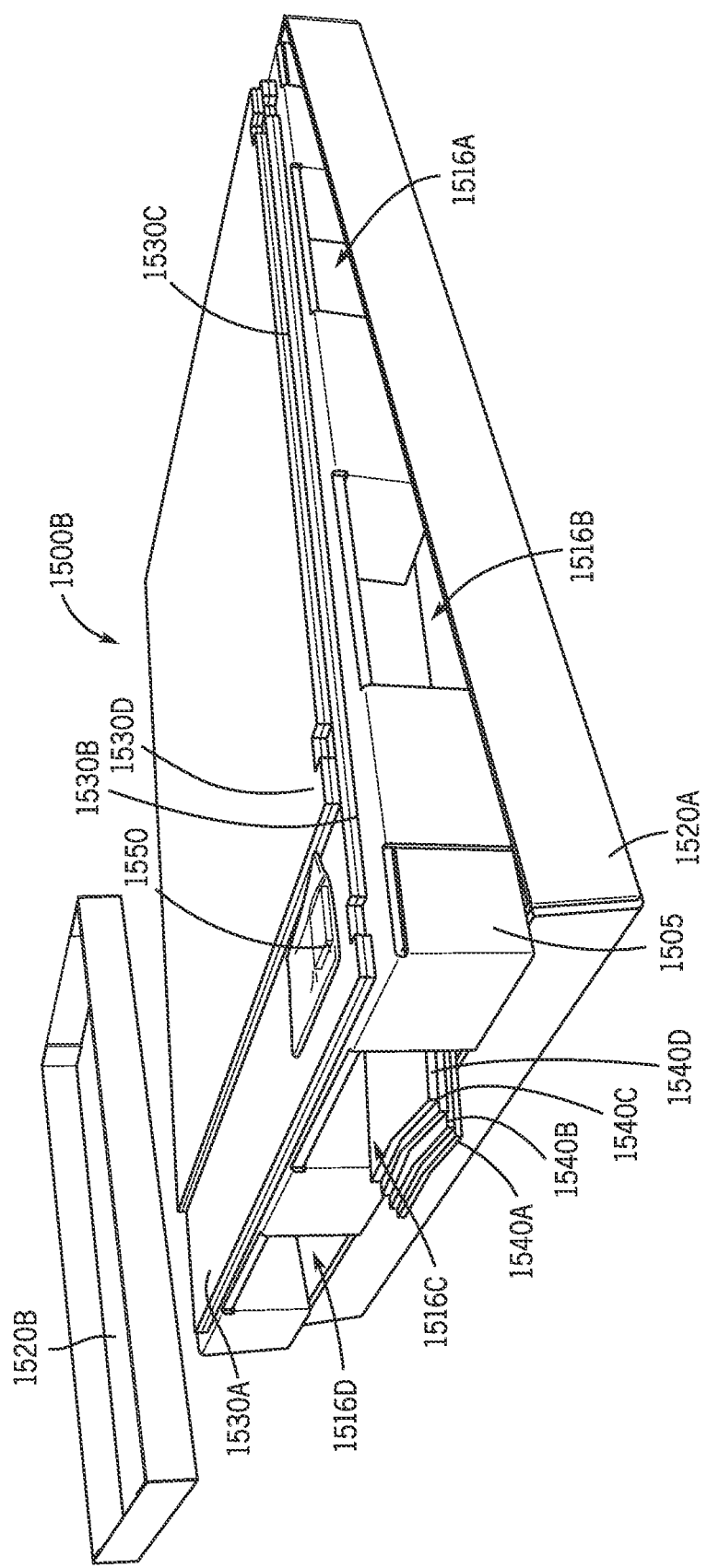
FIG. 25 illustrates a perspective view of a packaging kit in a partially unpacked state.
Figure 29:
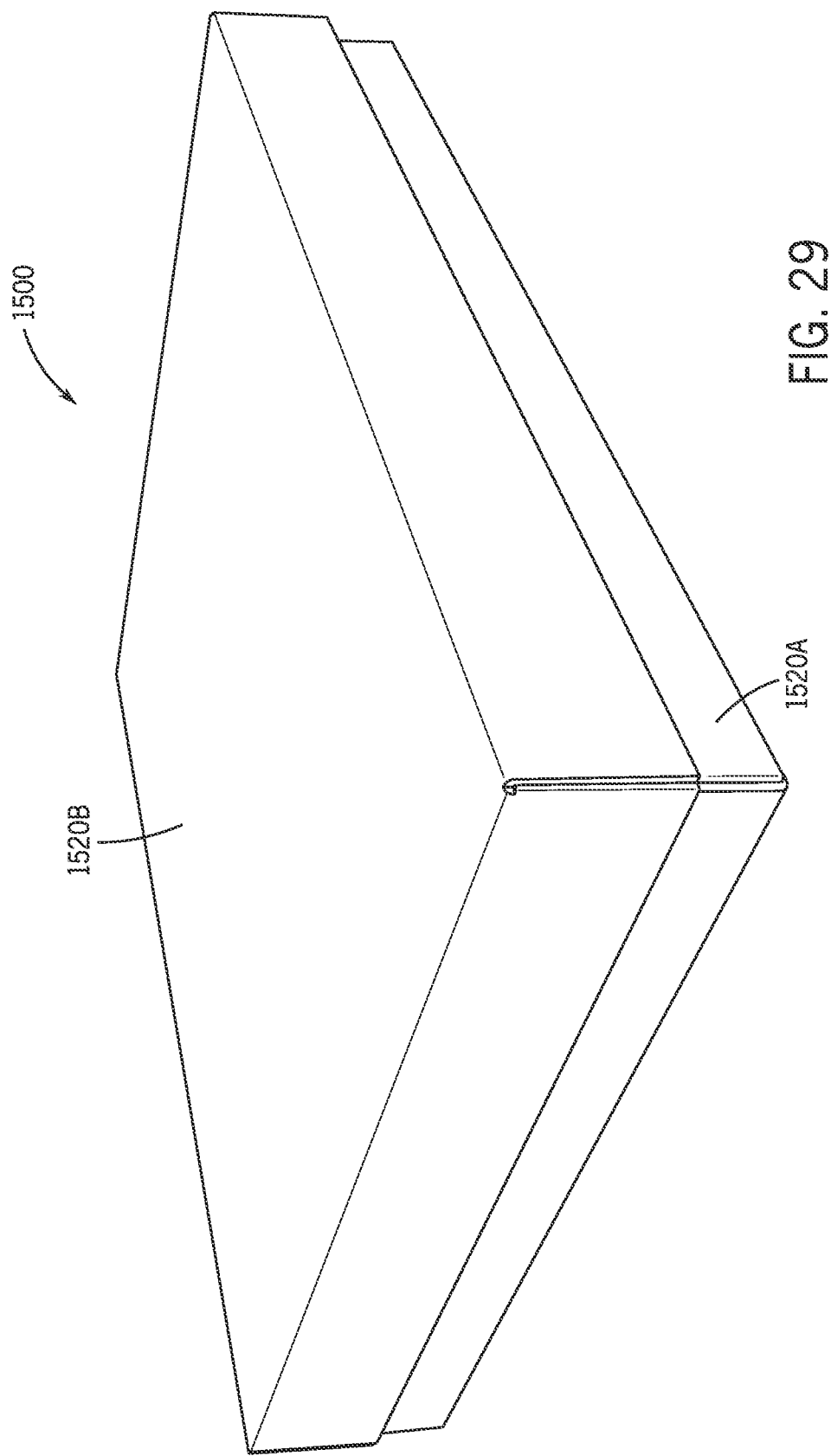
FIG. 29 illustrates a perspective view of a packaging kit in a collapsed state.

According to various embodiments of the present disclosure, a pallet (or other force resisting structure such as a skid) may be packaged and shipped with a container as part of a packing system or kit. As illustrated in FIG. 24, a packaging system 1500 includes a pallet 1505 (e.g., the pallet 100, the pallet 500, or the pallet 900, among others). The packaging system 1500 also includes a container 1510. As shown in FIG. 24, the pallet 1505 and container 1510 are in their expanded states. FIG. 25 shows a substantially collapsed state with the container 1510 open to illustrate example components. FIG. 29 illustrates an example of a completely collapsed state suitable for shipping. The container 1510 is sized to mate with and/or be supported by the pallet 1505. The container 1510 can be any suitable structure for storing and/or enclosing items therein. In accordance with various embodiments, the container 1510 includes side walls (shown as side walls 1530A, 1530B, and 1530C in FIG. 24 with 1530D not shown). While illustrated in FIG. 24 with four sides, it is, however, appreciated that the container 1510 can include any number of side walls suitable for enclosing goods to be shipped or stored within the container 1510. For example, the container can have three sides, four sides, five sides, or more. In another example, the side wall can be configured with a single wall forming a cylinder. In a preferred embodiment, the container 1510 includes the same number of side walls as the pallet 1505. For example, as shown in FIG. 24, the pallet 1505 includes four sides and the container 1510 includes four side walls 1530A, 1530B, 1530C, and 1530D.

In accordance with various embodiments, the side walls 1530A, 1530B, 1530C, and 1530D are separate structures disconnected from one another. In other embodiments, one or more of the side walls 1530A, 1530B, 1530C, and 1530D can be continuously coupled with one another. These couplings may be direct or via an intermediate member connection member (e.g., joint supports 1540A, 1540B, 1540C, 1540D). In embodiments incorporating joint supports 1540, the side walls 1530 are flat walls that form disconnected joints proximal to the corners of and approximately at the same angles as the corners of the pallet 1505. In other embodiments the side walls 1530 could form the corners and meet along the flat walls. In such embodiments the joint supports 1540 could connect one wall to the next along the flat portions. In various embodiments, the container 1510 includes the same number of corner supports as side walls 1530. In an example connection of the preferred embodiment, the side walls 1530A and 1530B are coupled to one another by joint support 1540B; the side walls 1530B and 1530C are coupled to one another by joint support 1540C (as shown in FIG. 29); the side walls 1530C and 1530D are coupled to one another by joint support 1540D (as shown in FIG. 27); and the side walls 1530D and 1530A are coupled to one another by joint support 1540A.

In accordance with various embodiments, the container 1510 may include a base 1520A. The base 1520A, which may be referred to as a base support or a container base, forms the base of the container 1510 enclosing the bottom of the container 1510. The base 1520A also mates with and rests upon the pallet 1505. The base 1520A may be sufficiently strong to bridge across the pallet 1505 to provide support to goods within the container 1510 so that the container 1510 including goods can be lifted by the pallet 1505. In such embodiments, the base 1520A retains the side walls 1530 providing a structure and enclosure to the container 1510.

In accordance with various embodiments, the container 1510 also includes a cap 1520B. The cap 1520B helps retain the top edges of the side walls and encloses the top opening of the container 1510. Once enclosed the entire system may be wrapped in shipping stretch wrap or similar product.

In accordance with various embodiments, the container system 1500 may be configured in a collapsed state suitable for transportation as illustrated in FIG. 25. In the embodiment illustrated therein, the container system 1500 may be disassembled and collapsed as a packaging kit 1500B. In accordance with various embodiments, the packaging kit 1500B includes the base 1520A, the pallet 1505, and a sufficient number of walls 1530 (e.g., 1530A, 1530B, 1530C, and 1530D) to form a container or similar enclosure when assembled with the base 1520A. In embodiments with separated walls (e.g., 1530A, 1530B, 1530C, and 1530D) the packaging kit 1500B also includes a sufficient number of joint supports 1540 (e.g., 1540A, 1540B, 1540C, 1540D) to couple adjacent side walls 1530 together as discussed above to form the container 1510.

In accordance with various embodiments, the packaging kit 1500B may also include a coupler 1550. The coupler 1550 may be operable to limit movement of the container 1510 relative to the pallet 1505, such as by coupling (either releasably or fixedly) the base 1520A of the container 1510 to the pallet 1505. For example, and without limitation, the coupler 1550 may be an adhesive (e.g., double-sided tape, a bead of adhesive, etc.) positioned at least partially between the base 1520A and the pallet 1510 (see FIGS. 27A and 27B).

Figure 30:
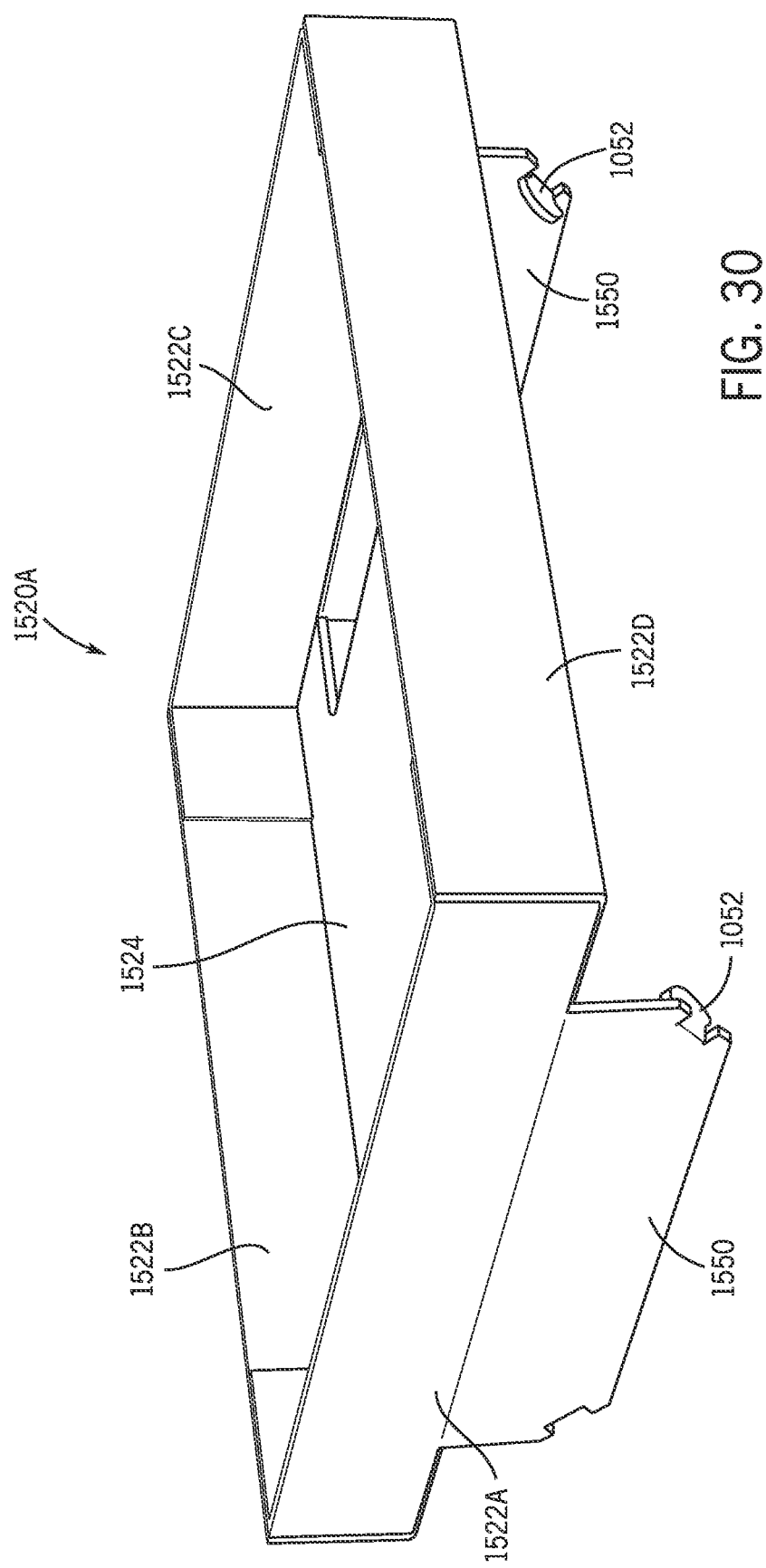
FIG. 30 illustrates a perspective view of an additional container base.
Figure 32A:
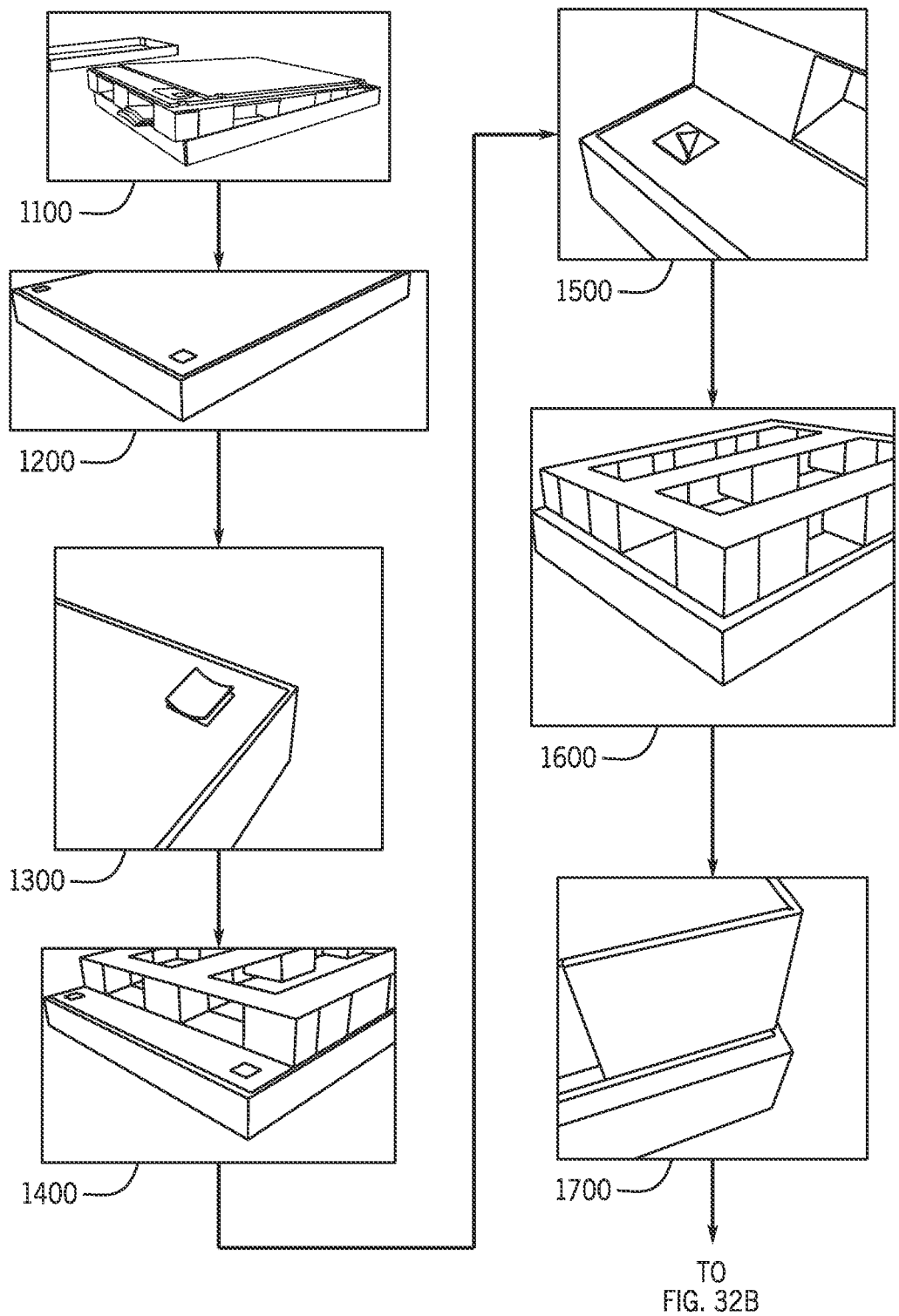
FIGS. 32A-32C illustrate a flow diagram of a method of assembling a packaging system.
Figure 32B:
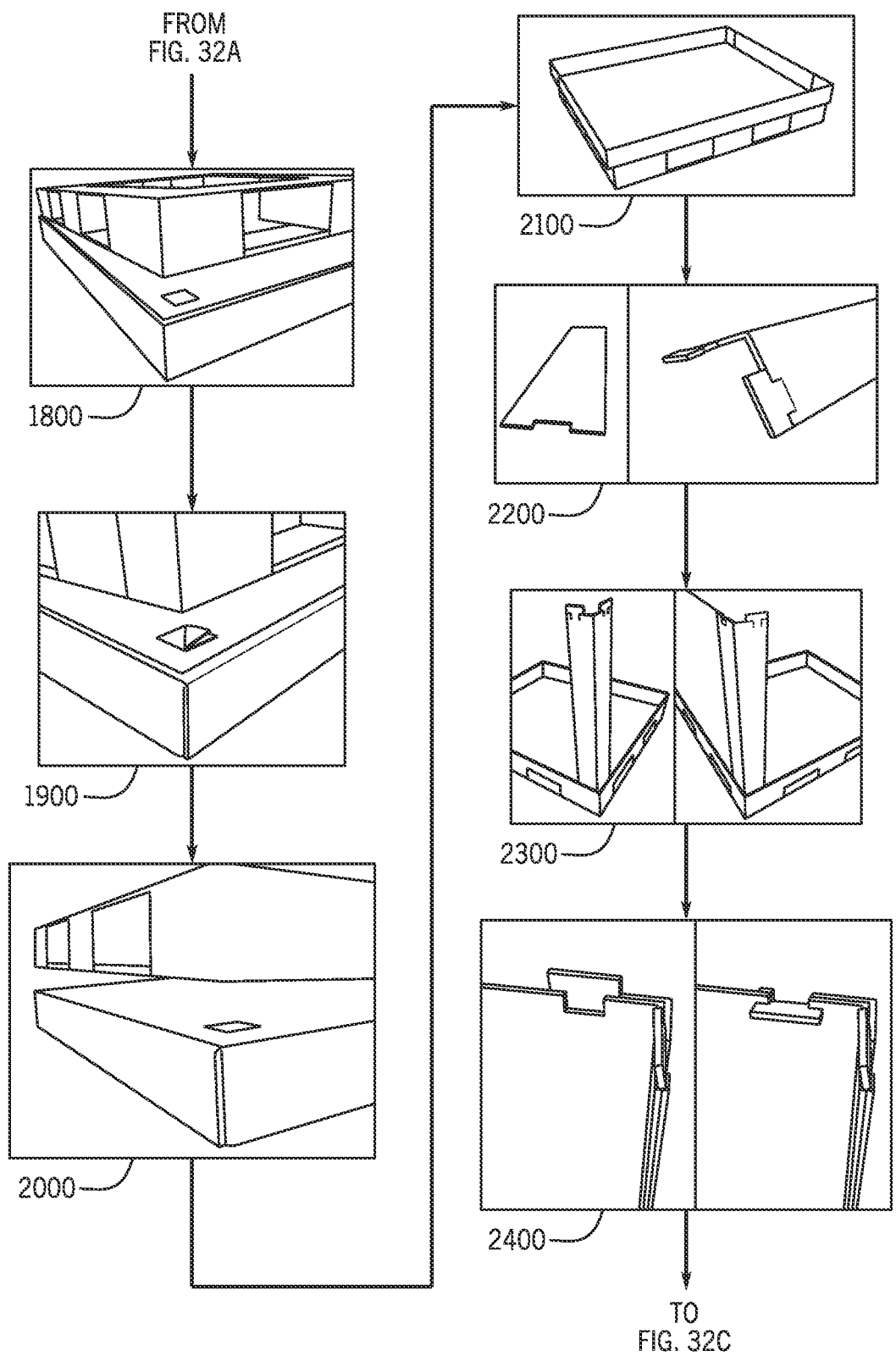
Figure 32C:
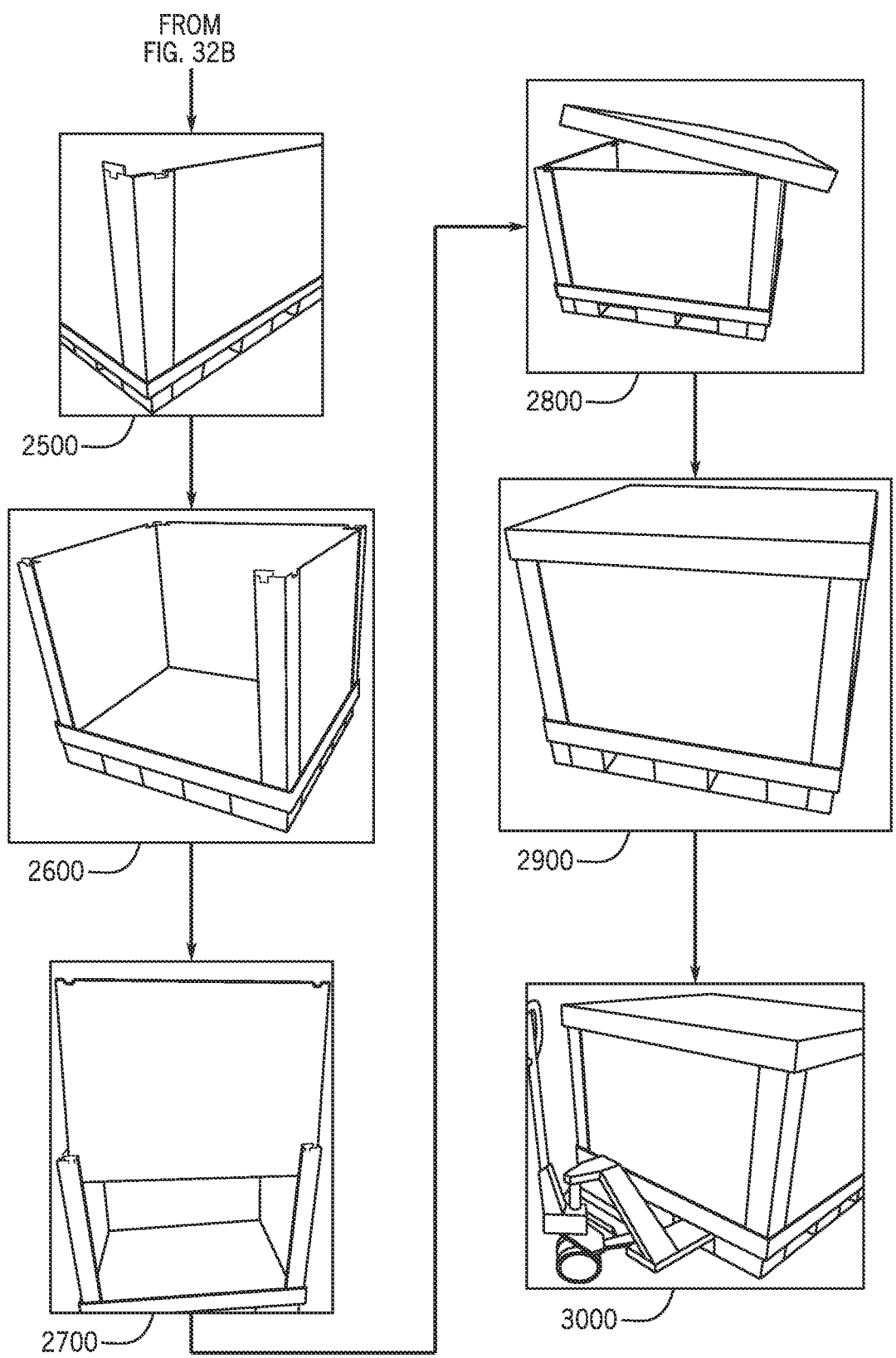

In some embodiments, the coupler 1550 may be defined as part of the pallet 1505 or as part of the base 1520A (e.g., as part of the base 1520A as shown in FIG. 30). For example, as shown in FIG. 30, the coupler 1550 may be defined as one or more panels foldably attached to the base 1520A (e.g., foldably attached to the bottom panel 1524). The coupler 1550 may be arranged to fold downwardly to below the bottom surface of the base 1520A for engagement with the pallet 1505 (e.g., with the top and/or bottom members 102, 502, 902 and/or 106, 506, 906 of the pallets 100, 500, 900). In such embodiments, the coupler 1550 may interlock with a portion of the pallet 1505 (see FIG. 31) to couple the base 1520A to the pallet 1505. For instance, a portion of the coupler 1550 may be positioned at least partially within (e.g., inserted within) a portion of the pallet 1505, such as via a tab and slot structure shown in FIG. 31. Additionally or alternatively, in some embodiments, the coupler 1550 may be adhesively secured to the pallet 1505, such as via double sided tape or the like.

In embodiments where the coupler 1550 is defined as part of the pallet 1505, the coupler 1550 may be defined as a panel foldably attached to the pallet 1505, the panel arranged to fold upwardly from the pallet 1505 to engage the container (e.g., the base 1520A). Though the coupler 1550 may be defined as part of the base 1520A or as part of the pallet 1505, the coupler 1550 is described below as an adhesive for ease of reference. Accordingly, any description to adhesive below may be applied to a coupler formed integrally with the base 1520A or formed integrally with the pallet 1505.

In various embodiments, the joint supports 1540 may be sized to fit within a side aperture (i.e., fork lift openings) of the pallet 1505. The side walls 1530 may be the same area or less than the top surface of the pallet 1505 so that the walls can lay flat on the pallet 1505 in a condensed state. In other embodiments, larger walls may be used but be sufficiently flexible or otherwise bent to lay generally flat on the pallet 1505.

Figure 26A:
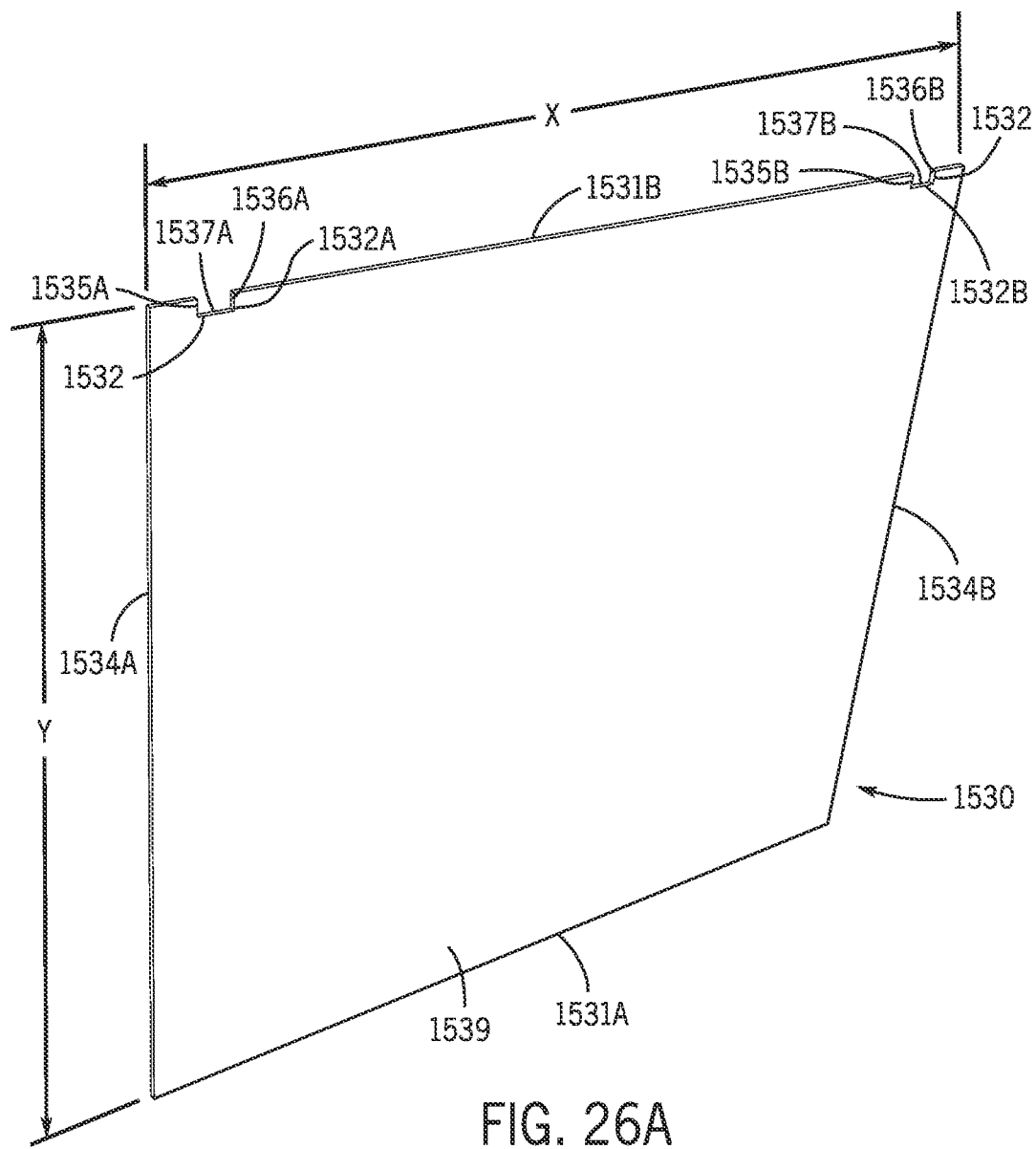
FIG. 26A illustrates a perspective view of a side wall.

In accordance with various embodiments, as illustrated in FIG. 26A, the side wall 1530 functions as the side enclosure to the container 1510. In one example, the side wall 1530 includes a body 1539 defined by front and back surfaces forming a panel that is generally flat. In other examples, the side wall can include a wavy surfaces or the entire panel can be wavy (e.g. a corrugated panel) to improve vertical strength. In other examples, curved or irregular surfaces can be used as well to define the body 1539 of the side wall 1530. The side wall 1530 is also sufficiently strong to contain the goods held within the container 1510 in the lateral direction. The side wall 1530 may define the storage height of the container 1510 in the Y direction form lower edge 1531B to top edge 1531A. The width of the container 1510 in the X direction extends from edge 1534A to edge 1534B. In preferred embodiments, opposing side walls (e.g., 1530A, 1530C) may have the same width, while adjacent sidewalls (e.g., 1530B, 1530D) may have the same or different widths thus forming rectangular containers. In other embodiments, the containers are circular, triangular, or defined by other polygons and as such each of the separate side walls 1530 may have different relative widths X to define such shapes.

Figure 28:
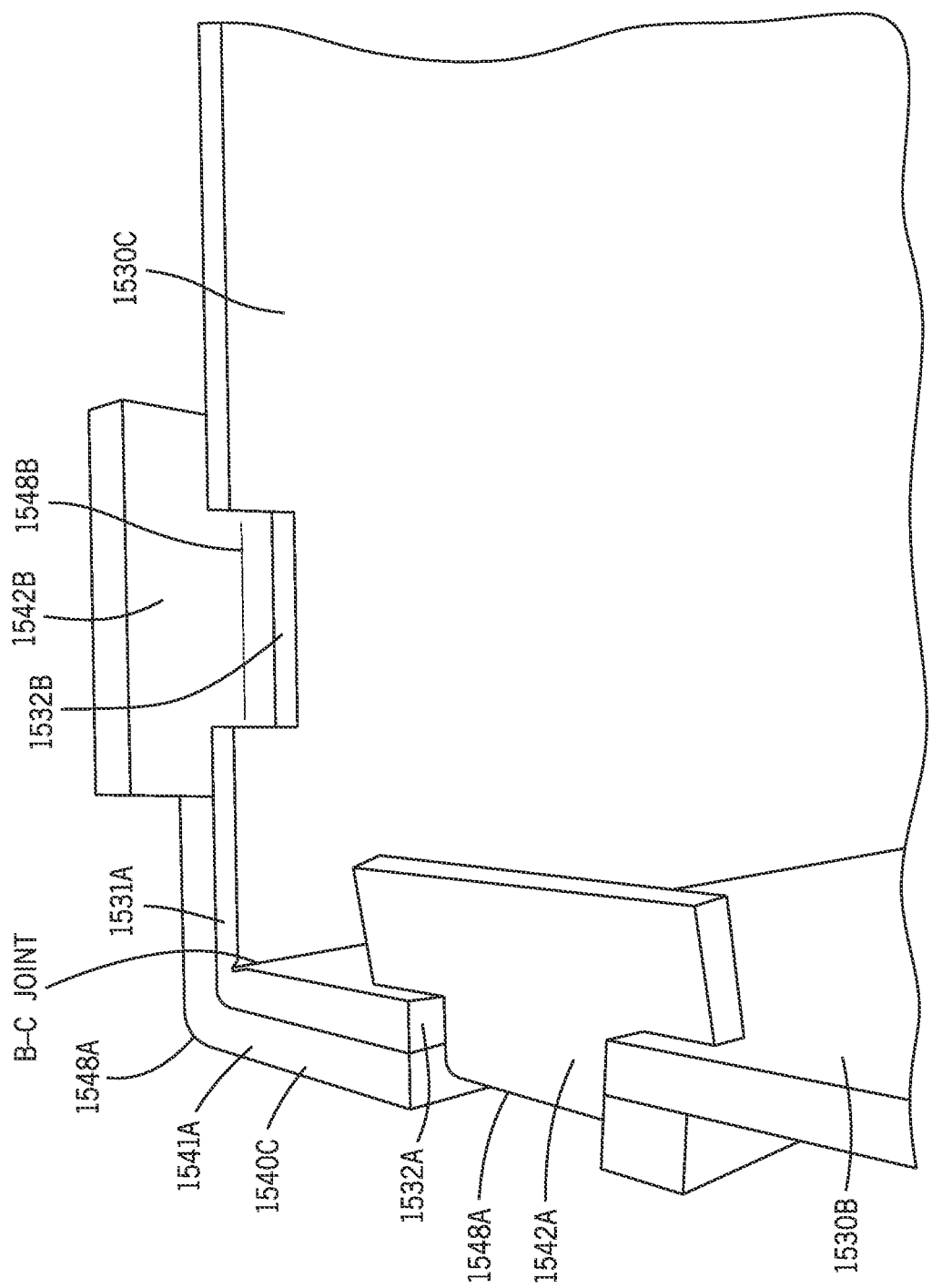
FIG. 28 illustrates a detailed view of the corner support connection illustrated in FIG. 27.

As indicated above, one or more of the side walls 1530 may be separate structures with no direct connections to adjacent walls. In such embodiments, the side walls 1530 may include a wall coupler 1532 configured to receive the joint support 1540 (discussed above and further shown in FIG. 26B) which is suitable to couple two adjacent side walls 1530 together (e.g., the first side wall 1530B connected to a second side wall 1530C via corner support 1540C as shown in FIG. 28) such that their movement relative to one another is limited. In various embodiments, the wall coupler 1532 may be integrally formed with the side wall 1530. In other embodiments, the wall coupler 1532 may be a separate component such as a fastener attached to the side wall 1530. In embodiments in which the wall coupler 1532 is integrally formed, the wall coupler 1532 is complementary with a joint support coupler 1542 of the joint support 1540 (as shown in FIG. 27).

In one embodiment, the wall coupler 1532 may include an aperture 1532A positioned proximal to one edge 1534A of the side wall 1530. In various examples, the aperture 1532A is a notch having edges (1535A, 1536A) that extend into the body 1539 of the side wall 1530. The edges (e.g., 1535A, 1536A) may extend from the top edge 1531A to a lower edge (e.g., 1537A). In a preferred embodiment, the edges (e.g., 1535A, 1536A) may be perpendicular to top edge 1531A. But in other embodiments, the edges may be at an angle to the top edge and/or each other, forming a parallelogram shaped notch or a dove tail notch respectively. It is appreciated that any aperture shape suitable to receive and lock into a corresponding feature may be used.

In various embodiments, a second wall coupler 1532B may be symmetric across the vertical centerline of the wall relative to the first wall coupler 1532A such that the second wall coupler 1532 is another aperture such as a notch (e.g., having edges 1535B, 1536B, and 1537B) located proximally to another edge 1534B of the side wall 1530. The notch may have a depth and width that is suitable to receiving the corresponding feature 1542 on a joint support 1540 (e.g., a tab 1542 shown in FIG. 26B). In another embodiment, the wall may have the tab and the joint support may have the notch. In other embodiments, the wall coupler can be an adhesive (glue, tape, etc.), a mechanical fastener (staples, snaps, hook and loop fastener, etc.), or any suitable bracket, piece of hardware, or the like that can directly or indirectly connect the side wall 1530 to the joint support 1540. In one embodiment, the wall coupler 1532 is positioned at the top of the side wall 1530 as shown in FIG. 26A. Such an embodiment allows the joint support 1540 to join the tops of adjacent side walls (e.g., 1530A and 1530B) while the base 1520A retains the bottoms of the wall (at least in a direction extending outwardly from the containment area of the container). In other embodiments, the wall coupler may be positioned at both the top and the bottom of the wall being symmetric about a midline of the wall. In this way, the wall coupler may connect one wall to another via the joint support (e.g. 1540) at both the top and the bottom.

Figure 26B:
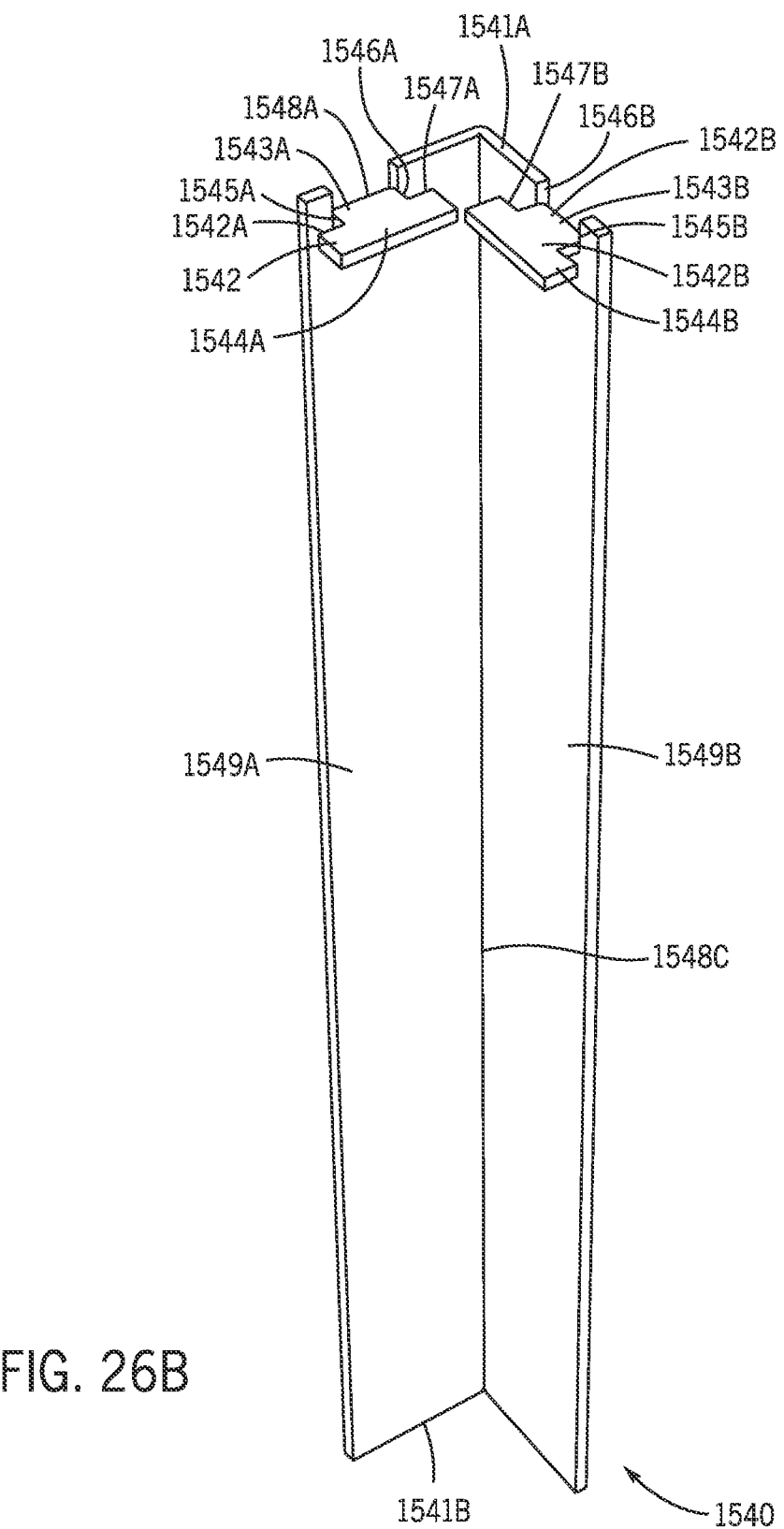
FIG. 26B illustrates a perspective view of a corner support.

In accordance with various embodiments, as illustrated in FIG. 26B, the joint support 1540 provides reinforcement to the container 1510. In one example, the reinforcement is provided by adding additional thickness to the walls such as doubling, tripling, or quadrupling the wall thickness to add vertical rigidity to the wall allowing for stacking of the containers 1510 and/or the entire storage system 1500. The joint support 1540 is also sufficiently strong to help the side walls 1530 contain the goods held within the container 1510 in the lateral direction. In another example, the reinforcement is provided by securing one side wall (e.g., 1530B) relative to another side wall (e.g., 1530C) with the joint support 1540 such that the movement of the walls is limited relative to one another due to the joint support 1540. In one example, the joint support 1540 includes a body 1543 defining panels 1549A, 1549B that are generally flat. The panels 1549A, 1549B may be positioned at an angle relative to one another that are the same as the desired angle between adjacent walls. In other examples, the panels 1549A, 1549B can include a wavy structure to improve vertical strength. In other examples, curved or irregular panels can be used as well to define the panels 1549A, 1549B.

In embodiments in which one or more of the side walls 1530 may be separate structures with no direct connections to adjacent walls, the joint support 1540 may couple together two side walls 1530 (e.g., the first side wall 1530B connected to a second side wall 1530C via corner support 1540C as shown in FIG. 28) to provide stability relative to one another. In such embodiments, the joint support 1540 includes a joint support coupler 1542 that corresponds with a wall coupler 1532. In various embodiments, the joint support coupler 1542 may be integrally formed with the joint support 1540. In other embodiments, the joint support coupler 1542 may be a separate component such as a fastener attached to the joint support 1540. In the various embodiments, the wall coupler is complementary with a joint support coupler 1542 of the joint support 1540 (as shown in FIG. 27). In one embodiment, the joint support coupler 1542 may include a tab (e.g., 1542A) positioned proximally to one edge 1544A of the joint support 1540. In various embodiments, the joint support coupler 1542 extends from one of the surfaces of the joint support 1540 (e.g., joint support coupler 1542A may extend from the surface of panel 1549A). This position may also be below the top edge 1541A. With the joint support coupler 1542 below the top edge 1541A, the top edge 1541A can align with the top edge 1531A of the side wall 1530 when assembled. By aligning edges 1541A and 1531A and edges 1541B and 1531B, the joint support 1540 can provide additional vertical support to the side wall 1530 strengthening the overall system for stacking on system 1500 on top of another. It may also be appreciated that in other embodiments, the joint support coupler 1542 is positioned at or above edge 1541A.

As discussed above, the joint support coupler 1542 may include a tab. In various examples of such an embodiment, the tab includes edges (e.g. 1545A, 1546A) that form a separation from the panel (e.g., 1549A). The edges (e.g., 1545A, 1546A) may extend downwardly from the top edge 1541A. In a preferred embodiment, the edges (e.g., 1545A, 1546A) may be perpendicular to top edge 1541A. But in other embodiments, the edges may be at an angle to the top edge and/or each other, e.g., forming a parallelogram shaped tab or a dove tail tab, respectively. In some embodiments, the tab is wider at its free end than at its attached end. This widening may be gradual such as in embodiments in which the tab edges are at an angle to one another. In other embodiments, such as the one shown in FIG. 27, this widening is abrupt forming a T-shaped tab with a flare (e.g., flare 1544A) extending out from a trunk (e.g., 1543A). The edges (e.g., 1545A and 1546A) define the narrower trunk portion 1543. An edge (e.g., 1547A) extending from one or both sides of the trunk defined by the edges (e.g., 1545A and 1546A) may define the width of the flare (e.g., 1544A). With a narrow trunk between the extending edges (e.g., 1545A and 1546A) and a wide flare (e.g., flare 1544A) the tab can engage the notch (e.g., 1532A discussed above) at the trunk. Having the notch about the width of the trunk and wider flare, the tab is able to couple the coupling member 1540 to the side wall 1530 as shown in FIG. 28. The tab can be formed as an integral part of the coupling member 1540 by defining the edges 1545A and 1546A via slits that separate the trunk (e.g., 1543A) from the panel (e.g., 1549A). The tab may then be bent at the trunk (e.g., 1543A) along a bend line (1548A) forming a distinct tab extending out in a different plane than the panel (e.g., 1549A). It is, however, appreciated that any tab shape suitable to receive and lock into a corresponding feature may be used.

In various embodiments, a second joint support coupler 1542B may be symmetric across the vertical centerline of the coupling member 1540. In one example as shown in FIG. 27, the vertical centerline may be a fold 1548C that folds the coupling member 1540 in two so that it can extend around two separate wall surfaces where they come together at a joint. A second joint support coupler 1542B may be positioned the same distance from the fold 1548C as a first joint support coupler 1542A. In one example, the joint support couplers 1542A, 1542B are both tabs having respective trunk 1543A and 1543B, respective separation edges 1545A, 1546A and 1545B, 1546B, respective flare edges 1547A and 1547B, respective flares 1544A and 1544B, and respective bends 1543A and 1543B.

FIG. 27 illustrates the assembly of some of the walls with the tabs and notches and also shows the location of detailed view of FIG. 28. As illustrated in FIG. 28, the tab 1542A and the tab 1542B on the joint support 1540C engage with notch 1532A and the notch 1532B respectively on the separate side walls 1530B and 1530C. As shown, the tabs 1542A and 1542B bend along the respective bends 1548A and 1548B to fold down into the notches 1532A and 1532B respectively. The trunks of each of the tabs pass through the notches while the flares of each of the tabs secure the tab over onto the walls. In this way coupling member 1540C secures side wall 1530B to side wall 1530C around the disconnected B-C joint.

In other embodiments, the side wall 1530 may have the tab and the joint support 1540 may have the notch. Alternatively, in yet other embodiments, the joint support coupler can be an adhesive (glue, tape, etc.), a mechanical fastener (staples, snaps, hook and loop fastener, etc.), or any suitable bracket, piece of hardware, or the like that can directly or indirectly connect the side wall 1530 to the joint support 1540. In other embodiments, the joint coupler may be positioned at both the top and the bottom of the joint support being symmetric about a midline of the joint. In this way, the joint coupler may connect one wall to another via the joint support (e.g., 1540) at both the top and the bottom.

In accordance with various embodiments, as illustrated in FIG. 26C, the base (e.g., base 1520A shown in FIG. 24) includes a bottom panel 1524 with at least one retainer to secure the side walls (e.g., 1530A-D) and prevent them from extending outwardly. In the example, as shown, the retainer includes vertical walls 1522A-B connected to the bottom panel 1524. Each of the vertical walls 1522A-B is connected to the adjacent wall to limit outward pressures from distorting the shape of the base 1520A. In other embodiments the retainers can be flanges, ribs, hardware, or any other device suitable to retain the bottom of the side walls 1530A-D. The cap 1520B as shown in FIG. 24 may be a similar structure to the base 1520A. In one example, as shown in FIG. 29, the cap 1520B may be larger than the base 1520A but only large enough to engage the base 1520A with a snug fit so as to form a packaging container for the rest of the components involved in the packaging kit 1500. The fully packed system can then be easily stacked, stored, shipped, or otherwise handled without having to separately coordinate containers and pallets.

Figure 26D:
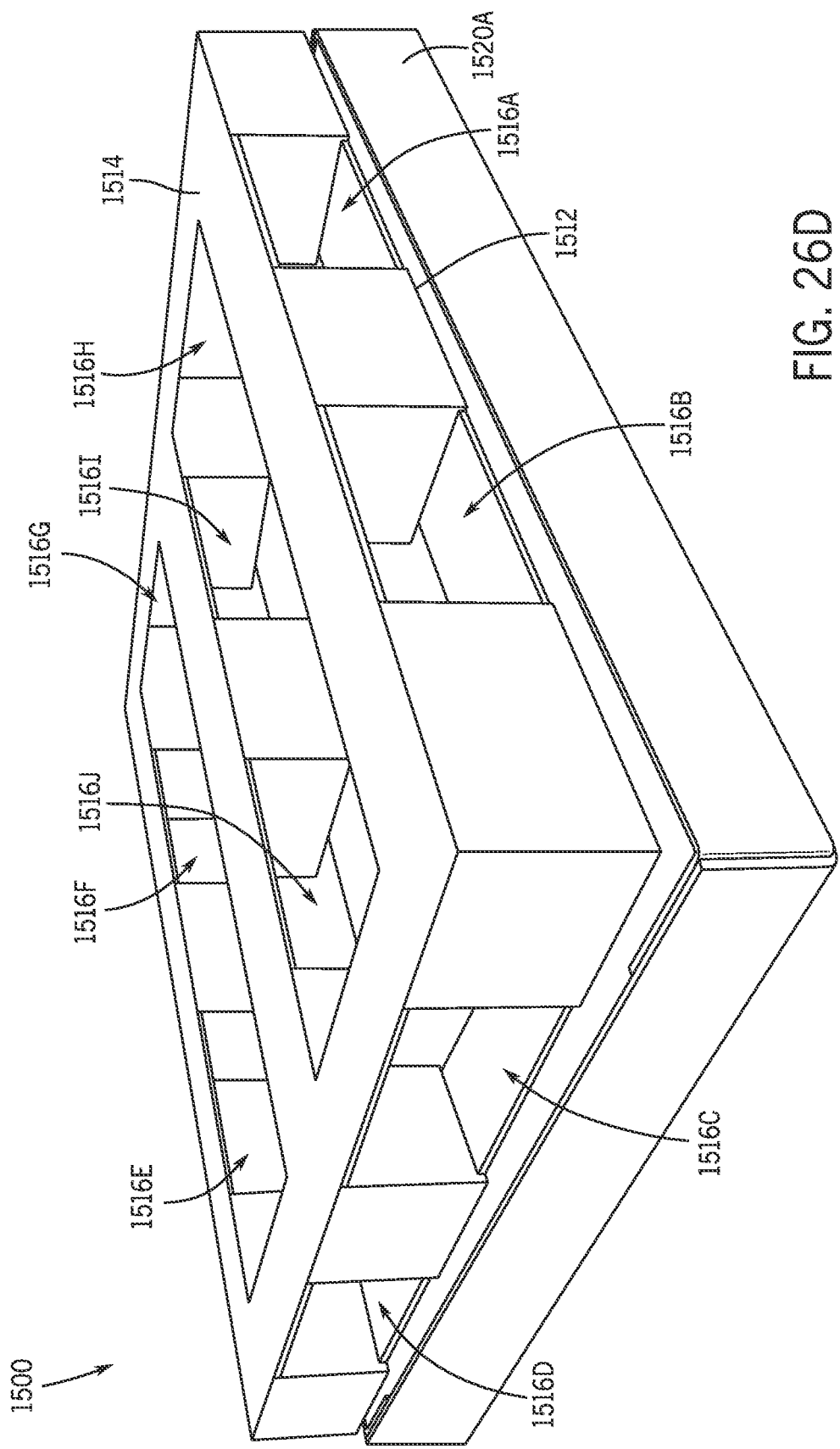
FIG. 26D illustrates a perspective view of a pallet.

In accordance with various embodiments, as illustrated in FIG. 26D, the pallet 1505 can be comprised of a flat, elevated top surface 1514 for supporting a load, such as goods, containers, or packages, a sufficient distance above the ground or floor (i.e., a surface that bottom surface 1512 is positioned on) so that the prongs or tines of a forklift can be inserted under the top surface in order to move the pallet with the entire load thereon from place to place. The pallet can include one or more apertures 1516A-J for receiving the prongs of the forklift, pallet jack, or the like. Traditionally, most pallets have been made from pieces of wood, specifically soft wood, assembled with metal fasteners such as nails or screws. Such pallets are usable in the packaging kit 1500 discussed herein. In some embodiments, the pallet 1505 is formed from foldable materials, such as corrugated cardboard, paperboard, plastic, or the like. In these embodiments, the components of the pallet 1505 are typically formed from substantially flat blanks of material that are cut and/or perforated into a desired shape and then folded or pivoted at strategic locations to define the components of the pallet 1505 (e.g., to define the top surface 1514, the one or more apertures 1516A-J, sidewalls, and/or interior support members, among others, of the pallet 1505). To provide a sufficient rigidity and/or strength to the pallet 1505 to support a load thereon a sufficient distance above the ground or floor, portions of the pallet 1505 may interlock together and/or may be secured together via adhesive, glue, and/or fasteners, among others. In one embodiment, the pallet 1505 may be a foldable corrugated material that is glued together into a desired shape. The pallet 1505 may include one or more structural enhancing features that are secured to the pallet 1505 to provide additional structural strength or reinforcement as needed. Preferably, the pallet 1505 is made from material same or similar to the other kit components such as the base 1520A, the side walls 1530, and joint supports 1540 (examples include corrugated materials such as cardboard, paperboard, plastics, or the like). However, as indicated below, each of the components can be formed from entirely different materials, same materials, or any variation thereof. Examples of pallets that may be used with the packaging kit include those shown in FIGS. 1-20 and described above (e.g., pallet 100, pallet 500, or pallet 900). Additional pallets that may be used can be found in U.S. Provisional Patent Application No. 62/323,486, U.S. Design patent No. 767,849, U.S. Design patent application No. 29/588,036, U.S. Design patent application No. 29/590,099, U.S. Pat. Nos. 7,234,402, and 7,980,184, among others, all of which are incorporated herein by reference in their entireties.

One benefit of having disconnected wall portions 1530A-D is shown in FIG. 27. In an embodiment with disconnected wall portions 1530A-D, the container 1510 can be formed using only three out of four of the walls. This leaves an opening in the container 1510 that can simplify loading or unloading. For example, if the container 1510 is being stored on a large rack that inhibits access to the top, one wall can be removed allowing for access to the container 1510 without using the top. Thus the container 1510 can be filled or emptied with access to the top restricted. It also eliminates the need to reach all the way down to the bottom of the container 1510 when placing items in carefully.

In accordance with various embodiments, and illustrated in FIGS. 27A-27C a packaging system assembly method includes providing a packaging system collapsed into a single package approximately pallet sized. (1600). The collapsed package can expand into a cubic container with length and width approximately the size of the pallet 1505 and the height any desirable size suitable to collapse into the pallet size package but preferably from about 2 to 4 feet in height. The packaging kit may contain the following: the cap 1520B, the base 1520A, four side walls 1530A-D, a pallet 1505, coupling members 1540A-D, and optionally adhesive (e.g., double-sided tape.) The base 1520A may be placed upside down such that the bottom surface faces up. (1700). In embodiments where the coupler 1550 is an adhesive, the adhesive may be placed on the bottom surface. For example, the bottom surface may include four printed squares to locate the adhesive. (1800). The pallet 1505 may be placed upside down on base 1520A. Again the bottom surface of the base 1520A may include printed guide lines for lining up the sides of the pallet 1505 with the base 1520A. (1900). The adhesive may then be applied to the pallet 1505 along one side of the pallet 1505 (e.g., a liner from the double-sided tape may be removed to expose the adhesive along one side). (2000). The pallet 1505 may be aligned with the black outline on the base 1520A. (2100). The pallet 1505 may be held above the base 1520A to align. Once aligned, the pallet 1505 may be placed down on the exposed double-sided tape to attach the pallet 1505 to the base 1520A along at least one side. (2200). The pallet 1505 may be rotated to the opposite side and lifted away from the base 1520A to expose the double-sided tape on the opposite side. (2300). While the pallet 1505 is being lifted away from the base 1520A, the plastic covering the double-sided tape on both corners may be removed to expose the adhesive along the opposite side. (2400). The pallet 1505 may be placed down on the newly-exposed double-sided tape (e.g., by pressing firmly) to attach the pallet 1505 to the base 1520A along all sides. (2500).

In embodiments where the coupler 1550 is defined as part of the base 1520A, the coupler 1550 may be coupled to the pallet 1505, such as via insertion of tabs 1052 of the coupler 1550 within a portion (e.g., within slots 1054 defined within a sidewall portion) of the pallet 1505. (See FIGS. 27 and 28.) For example, the tabs 1052 of the coupler 1550 may be inserted within the locking receptacles 456 defined in the wall supports 611, 1011 (e.g., in the first flap member 611c) of the pallet 500 or 900. In embodiments described herein, the coupling engagement between the base 1520A and the pallet 1505 limits relative movement between the pallet 1505 and the base 1520A, such as by limiting axial and/or transverse movement of the base 1520A relative to the pallet 1505.

Once the pallet 1505 is attached or coupled to the base 1520A, the pallet 1505 and base 1520A may be turned over as a single unit and place on the floor. (2600). The joint supports 1540 may be folded at a 90-degree angle. (2700). The corners may then be placed in the base 1520A. The corners may be held in position while placing each side wall 1530 in the base 1520A. The tab 1542 may be folded over into the notch 1532 to secure the joint support 1540 to the side wall 1530. (2800). Additional side walls may be placed into respective corners and secured using respective tabs. (2900). The third side wall 1530 may be assembled in similar fashion. (3000). At this point, the container 1510 may be filled with goods. (3100). Once the items are loaded into the container 1510, the final side wall 1530 may be slid down from the top into place. (3200). The joint supports 1540 on both sides of the final side wall 1530 may be used to secure the final side wall 1530 in place in a similar fashion as described above (e.g., via the tabs 1542 and notches 1532). The cap 1520B may be placed on top of the four side walls 1530 to close the container 1510. (3300). Once the cap 1520B is on, the user can secure the container 1510 with nylon strapping, stretch wrap, or security tape, among others. (3400). After the pallet 1505 is secured, the pallet 1505 can be moved by fork lift or pallet jack. (3500).

Figure 33A:
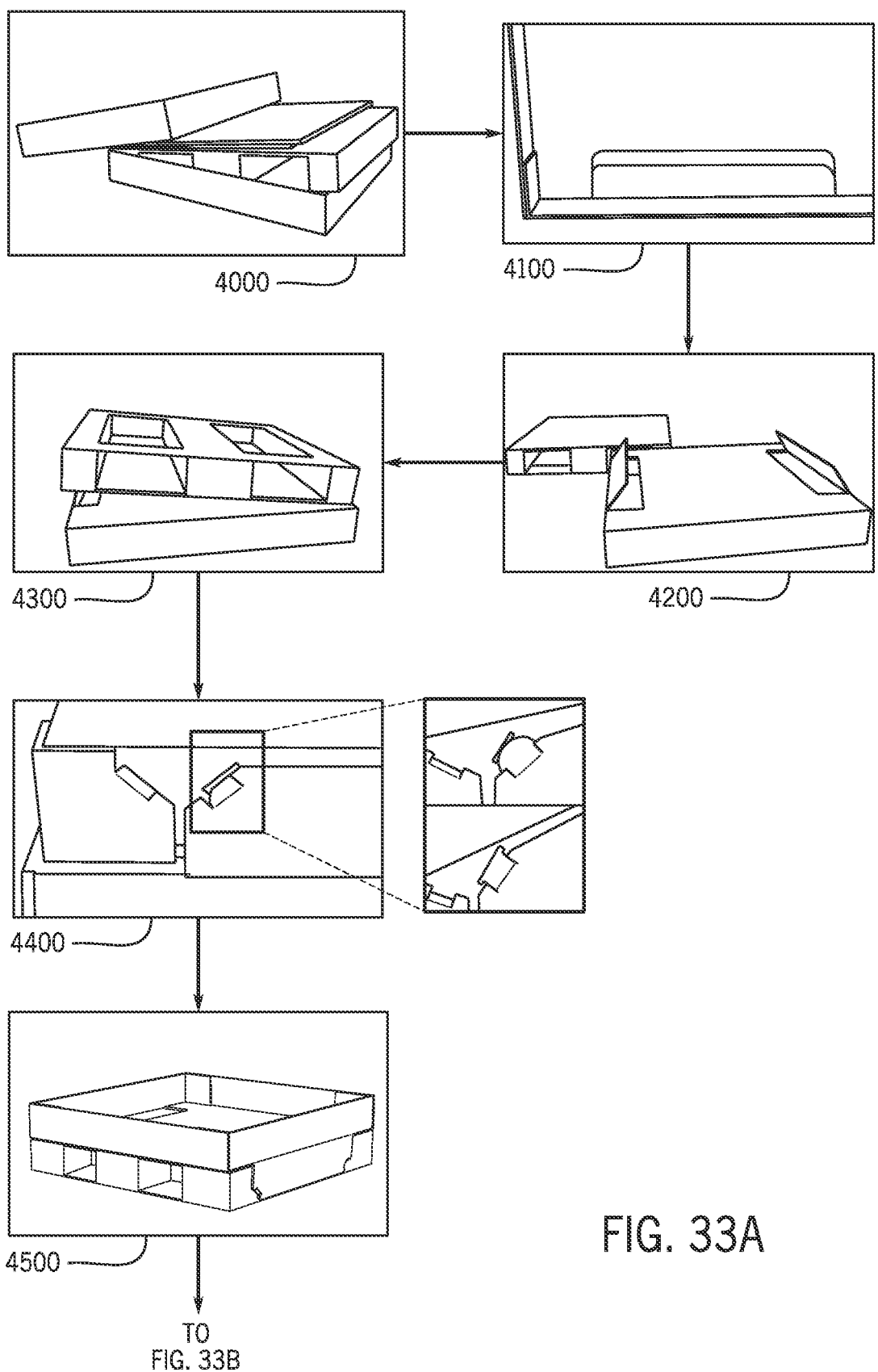
FIGS. 33A and 33B illustrate a flow diagram of an additional method of assembling a packing system.
Figure 33B:
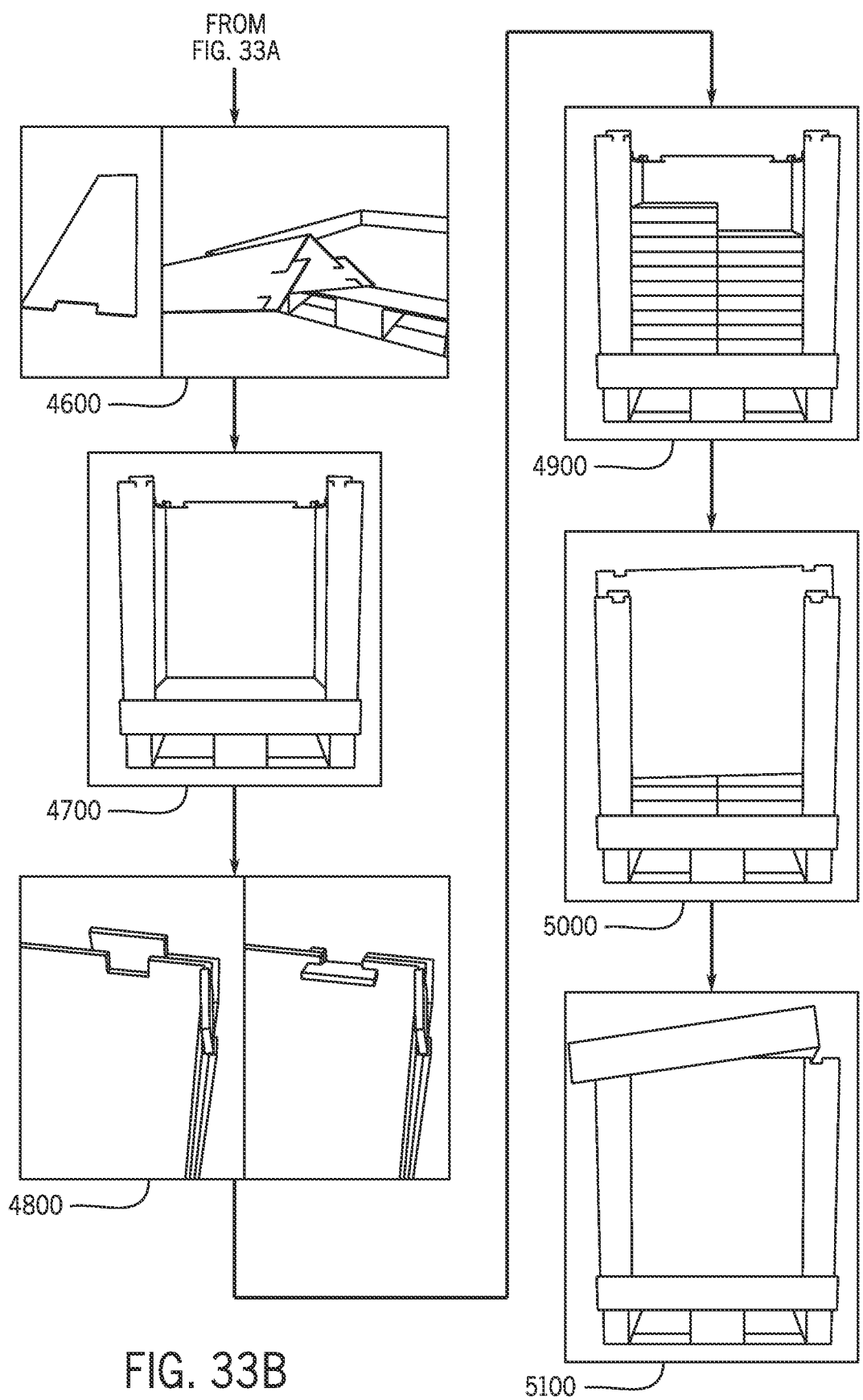

FIGS. 33A and 33B illustrate an additional method of assembling a packaging system. The method includes providing the pallet 1505, the base 1520A, a plurality of disconnected side walls 1530, and a plurality of joint supports 1540 (see block 4000). The various components may be provided within a single collapsed package defined by the base 1520A nested within the cap 1520B. As described above, the collapsed package can expand into a cubic container 1510 coupled to the pallet 1505. To expand the collapsed package, the various components may be unpacked from the base 1520A.

Once unpacked, the method includes folding at least one coupler 1550 downwardly away from the bottom panel 1524 of the base 1520A (see block 4100). The base 1520A is then placed upside down on a support surface (see block 4200). The method then includes placing the pallet 1505 upside down on the base 1520A, such as between opposing couplers 1550 (see block 4300). To secure the base 1520A to the pallet 1505, the tabs 1052 of each coupler 1550 are then inserted within the slots 1054 defined within the pallet 1505 (see block 4400). The pallet 1505 and base 1520A may thereafter be turned over as a single unit and placed on a support surface (see block 4500).

The joint supports 1540 are then folded to a 90-degree angle (see block 4600). The joint supports 1540 may then be placed in the base 1520A and held in place while placing at least three side walls 1530 in the base 1520A to at least partially form the container 1510 (see block 4700). To secure the side walls 1530 and joint supports 1540 together, the method includes folding the tabs 1542 of the joint supports 1540 into the notches 1532 of the sidewalls 1530 (see block 4800). Once the joint supports 1540 are secured to at least three side walls 1530, the container 1510 is filled with goods (see block 4900). Once the container 1510 is filled with goods, the container 1510 may be closed. For example, in embodiments where only three side walls 1530 were initially attached to the joint supports 1540, the final side wall 1530 may be slid into place and secured to adjacent joint supports 1540 (see block 5000). The cap 1520B may then be placed on top of the side walls 1530 to close the container 1510 (see block 5100). Depending on the particular application, the container 1510 may be secured with nylon strapping, stretch wrap, or security tape, among others.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method of assembling a pallet, the method comprising:
   folding a first flap of a support column along a perimeter of an interior surface of the support column, such that the first flap extends perpendicularly from the interior surface of the support column when folded, wherein the first flap is pivotably connected to the perimeter of the interior surface;
   folding a center wall of a first edge support structure of the support column along the perimeter of the interior surface of the support column, such that the center wall extends perpendicularly from the interior surface of the support column when folded, wherein the center wall is integrally formed with the interior surface along an edge of the perimeter:
   folding an edge flap of the first edge support structure relative to the center wall to engage the first flap, such that the edge flap extends perpendicularly from the center wall when folded;
   gluing the edge flap of the first edge support structure to the first flap; and
   coupling the support column to at least one of a bottom member or a top member of the pallet.

2. The method of claim 1, wherein the first edge support structure comprises a second edge flap.

3. The method of claim 1, wherein the first flap is connected to an edge of the interior surface.

4. The method of claim 2, wherein the second edge flap is glued to another sidewall extending from the perimeter of the interior surface of the support column.

5. The method of claim 1, further comprising:
   folding a second flap of the support column along the perimeter of the interior surface of the support column, such that the second flap extends perpendicularly to the interior surface of the support column when folded, wherein the second flap is pivotably connected to the perimeter of the interior surface;
   folding a center wall of a second edge support structure of the support column along the perimeter of the interior surface of the support column, such that the center wall of the second edge support structure extends perpendicularly from the interior surface of the support column when folded, wherein the center wall of the second edge support structure is integrally formed with the interior surface along an edge of the perimeter:
   folding an edge flap of the second edge support structure relative to the center wall of the second edge support structure to engage the third flap, such that the edge flap of the second edge support structure extends perpendicularly from the center wall of the second edge support structure; and
   gluing the edge flap of the second edge support structure to the second flap.

6. The method of claim 1, further comprising:
   folding one or more flaps of a first one of a top or bottom member of the pallet to engage the support column; and
   gluing the one or more flaps of the first one of the top or bottom member of the pallet to the support column.

7. The method of claim 6, further comprising:
   folding one or more flaps of a second one of the top or bottom member of the pallet to engage at least one of the support column or the first one of the top or bottom member of the pallet; and
   gluing the one or more flaps of the second one of the top or bottom member of the pallet to the at least one of the support column or the first one of the top or bottom member of the pallet.

8. The method of claim 7, wherein the first one of the top or bottom member of the pallet is folded to define the bottom member of the pallet, and wherein the second one of the top or bottom member of the pallet is folded to define the top member of the pallet.

9. A method of defining a support column for a pallet, the method comprising:
   folding a first flap relative to an interior surface of the support column, the first flap pivotably connected to a perimeter of the interior surface of the support column and extending perpendicularly from the interior surface of the support column when folded;
   folding a first sidewall relative to the interior surface of the support column to define a first edge support structure, the first edge support structure comprising a center wall and a first edge flap, the center wall integrally formed with the interior surface of the support column and extending perpendicularly from the interior surface of the support column when folded, the first edge flap extending perpendicularly from the center wall to engage the first flap when folded; and
   gluing the edge flap to the first flap.

10. The method of claim 9, wherein the first flap, first sidewall, and interior surface are formed from a single blank of foldable material having foldable or pivotable connections between one another.

11. The method of claim 9, wherein the first edge support structure comprises a second edge flap extending perpendicularly from the center wall when folded, the first edge flap and the second edge flap extending from opposite sides of the center wall.

12. The method of claim 9, further comprising:
folding a second flap relative to the interior surface of the support column, the second flap pivotably connected to the perimeter of the interior surface of the support column;
folding a second sidewall relative to the interior surface of the support column to define a second edge support structure, the second edge support structure comprising a second center wall and a second edge flap, the second center wall integrally formed with the interior surface of the support column and extending perpendicularly from the interior surface of the support column when folded, the second edge flap extending perpendicularly from the second center wall to engage the second flap when folded; and
gluing the second edge flap to the second flap.

13. A method of assembling a pallet, the method comprising:
defining a support column from a first blank, the defining the support column comprising:
folding a first flap relative to an interior surface of the support column, the first flap pivotably connected to a perimeter of the interior surface of the support column and extending perpendicularly from the interior surface of the support column when folded;
folding a first sidewall relative to the interior surface of the support column, the first sidewall defining a first edge support structure comprising a center wall and a first edge flap, the center wall integrally formed with the interior surface of the support column and extending perpendicularly from the interior surface of the support column when folded, the first edge flap extending perpendicularly from the center wall to engage the first flap when folded; and
gluing the edge flap to the first flap; and
coupling the support column to at least one of a bottom member or a top member of the pallet.

14. The method of claim 13, wherein the first sidewall comprises a second edge flap extending perpendicularly from the center wall when folded.

15. The method of claim 14, wherein the first flap is connected to an edge of the interior surface of the support column.

16. The method of claim 14, wherein the second edge flap is glued to a second flap extending perpendicularly from the interior surface of the support column.

17. The method of claim 13, wherein the defining the support column comprises:
folding a second flap relative to the interior surface of the support column;
folding a second sidewall relative to the interior surface of the support column, the second sidewall defining a second edge support structure comprising a second center wall and a second edge flap, the second center wall integrally formed with the interior surface of the support column and extending perpendicularly from the interior surface of the support column when folded, the second edge flap extending perpendicularly from the second center wall to engage the second flap when folded; and
gluing the second edge flap to the second flap or the first sidewall.

18. The method of claim 13, further comprising:
defining a first member from a second blank;
folding one or more flaps of the first member to engage the support column; and
gluing the one or more flaps of the first member to the support column.

19. The method of claim 18, further comprising:
defining a second member from a third blank;
folding one or more flaps of the second member to engage at least one of the support column or the first member; and
gluing the one or more flaps of the second member to the at least one of the support column or the first member.

20. The method of claim 19, wherein the first member is the bottom member of the pallet, and wherein the second member is the top member of the pallet.

* * * * *